United States Patent [19]
Flores et al.

[11] Patent Number: 6,073,109
[45] Date of Patent: Jun. 6, 2000

[54] COMPUTERIZED METHOD AND SYSTEM FOR MANAGING BUSINESS PROCESSES USING LINKED WORKFLOWS

[75] Inventors: Fernando Flores, Berkeley; Chauncey F. Bell, III; Pablo A. Flores, both of Alameda; Rodrigo F. Flores, Berkeley, all of Calif.; Raul Medina-Mora Icaza, Mexico City, Mexico; John A. McAfee, Kensington, Calif.; Manuel Jasso Nuñez, Alameda, Calif.; Thomas G. Buchler, Berkeley, Calif.; Thomas E. White, Monte Sereno, Calif.; Russell G. Redenbaugh, Philadelphia, Pa.; Juan Ludlow Saldivar, Mexico City, Mexico; Terry A. Winograd, Stanford, Calif.; Robert P. Dunham, Pleasanton, Calif.; Harry K. T. Wong, Danville, Calif.; Roy I. Gift, San Anselmo, Calif.

[73] Assignee: Action Technologies, Inc., Alameda, Calif.

[21] Appl. No.: 08/764,131

[22] Filed: Dec. 12, 1996

Related U.S. Application Data

[63] Continuation of application No. 08/624,206, Apr. 3, 1996, abandoned, which is a continuation of application No. 08/014,796, Feb. 8, 1993, abandoned.

[51] Int. Cl.[7] .................................................. G06F 15/173
[52] U.S. Cl. .......................... 705/8; 707/10; 395/200.33; 395/200.35; 395/200.49
[58] Field of Search ..................................... 395/209, 228, 395/377, 200.33, 200.35, 200.49; 707/10, 3; 705/8

[56] References Cited

U.S. PATENT DOCUMENTS

| | | | |
|---|---|---|---|
| 4,484,289 | 11/1984 | Hemond | 364/478 |
| 4,503,499 | 3/1985 | Mason | 395/650 |
| 5,040,142 | 8/1991 | Mori | 395/275 |
| 5,301,320 | 4/1994 | McAtee et al. | 395/650 |
| 5,535,322 | 7/1996 | Hecht | 395/155 |
| 5,581,691 | 12/1996 | Hsu et al. | 395/182.13 |
| 5,630,069 | 5/1997 | Flores et al. | 705/7 |
| 5,734,837 | 3/1998 | Flores et al. | 705/7 |
| 5,826,239 | 10/1998 | Du et al. | 705/8 |

OTHER PUBLICATIONS

Computer Society Office Automation Symposium, Gaithersburg, MD, Apr. 27–29, 1987, Institute of Electrical and Electronics Engineers, pp. 226–233, XP000370992; W. Fisher et al: "FileNet: A Distributed System Supporting WorkFlo; A Flexible Office Procedures Control Language".

*Primary Examiner*—Jean R. Homere
*Attorney, Agent, or Firm*—Blakely Sokoloff Taylor & Zafman

[57] ABSTRACT

A system for analyzing and structuring business processes implemented in software to provides businesses with tools to manage business processes. The system i) notifies the user that he or she has a step to begin or to complete; ii) provides the user with the proper tools to complete a task; iii) provides the user with the proper information to complete a task; iv) allows the user to see where a task fits in the overall process; v) manages proper reminders, alerts, and follow-ups to keep the process moving; vi) automates certain standard procedures; vii) integrates with the organization's existing business systems; and viii) provides application program interfaces that allow developers to develop applications that are workflow-enabled. The system utilizes a workflow server including a transactions manager and a database.

19 Claims, 6 Drawing Sheets

COMPUTERIZED METHOD AND SYSTEM FOR MANAGING BUSINESS PROCESSES USING LINKED WORKFLOWS

This is a continuation of application Ser. No. 08/624,206 filed Apr. 3, 1996, now abandoned which is a continuation of application Ser. No. 08/014,796 filed Feb. 8, 1993, now abandoned.

BRIEF SUMMARY OF THE INVENTION

Businesses are demanding new systems that directly support the management of business processes, systems that bring order and coordination to the flow of work. They are seeking to automate that part of office-work that has been impervious to conventional data processing and information processing systems, which were now designed for business process management and are not well-suited to help with it.

The present invention is a system for analyzing and structuring business processes that, when implemented in software, provides businesses with the tools they need to manage business processes efficiently and cost-effectively.

The invention can be applied to all business processes from simple applications, such as intelligent forms routing, to sophisticated mission-critical enterprise-wide systems that integrate all marketing, production, and customer fulfillment processes.

The resulting system enables users of the system to take coordinated action quickly and to manage processes painlessly. The results are increased productivity, reduced cycle time and hence, improved customer satisfaction.

Workflow-enabled systems facilitate business processes. To do so, a workflow management system performs eight key functions:

Notifies the user that he or she has a step to begin or to complete.

Provides the user with the proper tools to complete a task.

Provides the user with the proper information to complete a task.

Allows the user to see where a task fits in the overall process.

Manages the proper reminders, alerts, and follow-ups to keep the process moving.

Automates certain standard procedures.

Integrates with the organization's existing business systems.

Provides simple application program interfaces (APIs) that allow developers to develop new custom applications that are workflow-enabled.

The workflow system's architecture is designed to fit within a variety of computer systems, collecting around itself not only specific applications, Beut also system enhancements and utilities from users and third-party developers. In addition, the architecture is designed to allow for interoperability among different applications and across diverse platforms.

A fundamental concept of a workflow system is that any business process can be interpreted as a sequence of basic transactions called workflows. Every workflow has a customer, a performer, and conditions of satisfaction. The customer and performer are roles that participants can take in workflows. In addition, each workflow can have observers.

In a workflow, the customer is the person for the sake of whom the work is done, either because they made a request or accepted an offer. It is customers who are responsible for evaluating performed work and determining whether this work meets their conditions of satisfaction.

The performer is the person who is responsible for completing the work and for declaring to the customer when the work is done.

Requests and Offers are the two basic types of workflows. There are other workflow types such as Question, Inform and Note that are simplified derivations of Request and Offer. The conditions of satisfaction specify the work to be performed by the performer. In a request, the customer specifies the conditions of satisfaction, and in an offer the performer specifies them. (Then, of course, the two can enter into negotiation about the work to be done.)

For example, given the sentence:

"John asked Frank to prepare the report and deliver it by noon on Friday,"

John is the customer for this workflow, Frank is the performer, and the conditions of satisfaction are "prepare the report and deliver it by noon on Friday." Further, Because John asked for the report rather than Frank offering it, this workflow is of the type Request.

Given the sentence:

"John proposed to prepare the report and deliver it by noon on Friday for Frank,"

John is the performer for this workflow, Frank is the customer, and the conditions of satisfaction are still "prepare the report and deliver it by noon on Friday." Further because John proposed the report rather than Frank asking for it, this workflow is of the type Offer.

Observers of workflows take no direct action; they usually observe for management or training purposes.

Business process maps display the workflows as loops, and display the relevant information about each workflow—the customer, the performer, the conditions of satisfaction and the cycle time. FIG. 1 is a business process man having a primary workflow 11, conditional workflows 13 and 15, a conditional link 17, parallel workflows 19 and 21, serial workflows 23 and 25. In a workflow system according to the present invention, associated with each workflow: are various parameters such as roles, cycle time, conditions of satisfaction or associate semantics to the links that imply automated action or provide the framework for application building, all of which are necessary to create a useful business process representation. Each workflow has four phases. The first phase is called the proposal phase during which a request is made of the prospective performer by a customer or an offer to a customer is made by a prospective performer. The second phase is called the agreement phase during which the offer is accepted by the customer or the request is agreed to by the performer and conditions of satisfaction are identified. Of course, during the agreement phase the original conditions of satisfaction can be negotiated by the customer and performer until an agreement is reached. The third phase is called the performance phase during which the performer undertakes to meet the agreed to or accepted conditions of satisfaction. When the performer believes that the conditions of satisfaction have been met, the performer declares completion. The last phase is the satisfaction phase during which the customer determines whether or not the conditions of satisfaction have been met by the performer, and if so, declares satisfaction.

In U.S. Ser. No. 07/600,144 filed Oct. 17, 1990, now U.S. Pat. No. 5,216,603, and U.S. Ser. No. 07/368,179 filed Jun. 19, 1989, now U.S. Pat. No. 5,208,748, both owned by Action Technologies, Inc., the assignee of the present application, methods and systems For managing workflows, called conversations in the referenced applications, are described. However, the teachings in the cited references are limited to single workflows no capability for mapping business processes made up of a number of workflows linked together. In U.S. Ser. No. 08/005,236 filed Jan. 15, 1993, now U.S. Pat. No. 5,630,069, a method and apparatus are disclosed for creating and modifying business process maps which is a desirable but not necessary component of the invented system. This component is referred to as the workflow analyst.

DETAILED DESCRIPTION OF THE INVENTION

Overview

Figure 1:
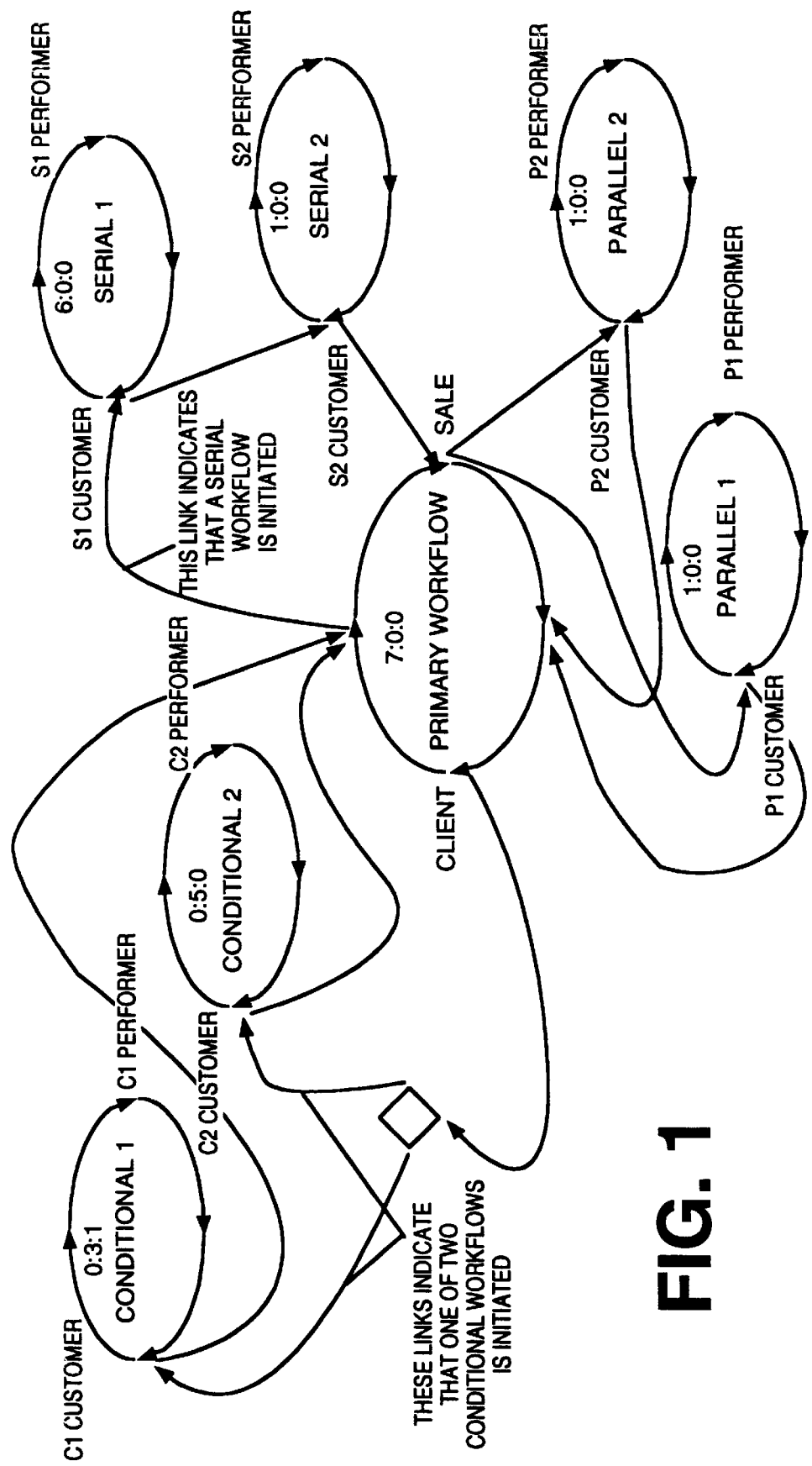
FIG. 1 is pictorial representation of a business process, i.e., a set of linked workflows.

The present invention is a method and apparatus which is used to enable application developers to generate workflow enabled applications that request services from the workflow server. These applications are used by users to act and participate in business processes and enable managers to observe and query the status of workflows and business processes.

Definitions

In describing the invention, the following terms with their indicated definitions are used:

Act
  Basic linguistic occurrence by which people intervene in moving a workflow towards completion.
Agreement
  The outcome of the negotiation phase, in which two parties come to a common agreement of the conditions of satisfaction.
Business Process
  A network of workflows linked together that represent the recurrent process by which an organization performs and completes work, delivers products and services and satisfies customers.
Business Process Map
  This is a graphical representation of business process, which shows its workflows and their relationship.
Primary workflow
  This is the first workflow which is initiated when a business process is initiated. Its condition of satisfaction represent the condition of satisfaction of the business process.
Conditional Link
  A link that indicates that only one of a group of workflows will be triggered based on some condition.
Conditions of Satisfaction
  Conditions declared by or agreed to by a customer. The fulfillment of which is the purpose of a workflow.
Customer
  The role in a workflow who takes a request or accepts and offer.
Customer Satisfaction
  The objective of a workflow, the accomplishment of which is declared by the customer when the conditions of satisfaction in the workflow have been fulfilled.
Cycle time
  A measure of the time from initiation to successful completion of a workflow phase, a complete workflow or a business process.
Exception flow
  The path in the business process workflow man which is followed if a customer cancels or a performer revokes or declines.
Link
  A defined dependency between two workflows and the mechanism by which dependencies between workflows is established.
Loops (Workflow)
  A workflow is represented graphically my an elliptical loop with arrows shown in a clockwise direction wherein each quadrant of the ellipse signifies different phases of the workflow.
Normal flow
  This is the path followed in a business prowess map when workflows complete with customer satisfaction.
Observer
  A role in a workflow who cannot perform acts in the workflow, but is informed of acts in the workflow, and has access to the information and data associated with the workflow.
Offer
  The act by which the performer can initiate a workflow, specifying conditions of satisfaction that he is willing to satisfy for a customer.
Organization roles
  Named positions in an organization who are authorized to make certain requests, agreements, take certain actions, set certain policies, and make certain decisions. The kind of roles will be accountant, office manager, etc.
Performer
  One of the principal roles in a workflow: the role that commits to complete the conditions of satisfaction.
Phase
  A characterization of the status of a workflow based on the acts that have happened and the acts that are permitted. Each workflow has four phases namely, the proposal phase the agreement phase, the performance phase and the satisfaction phase
Request
  A customer does this act to initiate a workflow and declare conditions of satisfaction.
Trigger
  An action in a workflow which causes an action in some other workflow.
Triggered
  Action in a workflow based on certain conditions/status in some other workflow.
Workflow
  A structured set of acts between customers and performers organized to satisfy a customer's conditions of satisfaction.

Workflow Activation
  A triggered action that enables the customer or performer of the workflow to take the initial act of the workflow.
Workflow Initiation
  An act of request or offer initiates a workflow.
Workflow Roles
  The association of participants in the workflows that take the acts in workflows; three roles are distinguished in workflows: customer, performer, and observer.
Workflow Type
  This indicates whether the workflow is of request, offer or note type.

Services Provided By A Workflow System

The following describes the services provided by a workflow system. These services are provided to applications via calls to the workflow server APIs. These workflow server APIs provide the main mechanism to interface and get access to the services provided by the server. In an alternate embodiment, these services can be provided via updates to the workflow server databases rather than via calls to the workflow server APIs.

Transactions Services

Transaction services are those related to initiating and acting in workflows by users and agents. These services are provided to workflow enabled applications via the transaction API. Alternatively, the services may be provided to workflow enabled applications through updates to the workflow transaction database. These services are also provided through the functions of the workflow language specified in the definition of workflows.

The services provided are as follows:

a) Initiate a Workflow

Through this function, an application requests the server to start a new workflow. For example, if a user fills an expense report form, when it is saved, the resulting record or document represents the initiation of a workflow, the application will use this service to start the workflow.

For example, in a workflow enabled application in the Lotus Notes environment (available and Lotus Corporation), users initiate a new business process by composing a NOTES form in the transactions database. Users initiate workflows by editing and selecting options in forms. In other environments users fill in proper forms and the applications request the services via calls to the Transactions API.

b) Act in a Workflow

Through this function, an application can take action on an existing workflow. For example, a manager's approval of an expense report indicates the fact the manager took an act in the workflow.

c) Workflow status and available acts

The workflow server updates and maintains the status of the workflow after each act is taken in a workflow. The server also updates the corresponding database records to reflect status and the available acts for the customer and performer such that users can see the workflow status and the available acts (given their role in the workflow) when they open the workflow transaction record of the transactions database or when they request such status from the server through one of the transactions API functions.

d) Bind and read process specific data (bound data)

Through this function, an application binds application specific data to a workflow transaction. That is, this function allows applications to read and modify the process specific data (bound data) that the workflow server keeps in the workflow transaction document. The specification of the bound data (field names and their data types) are defined through definition services. This data is directly accessible to the application through transactions database forms. The server modifies the form specification to provide different display attributes of fields in forms depending on the status of a workflow.

e) Workflows with pending actions

Users can request to see a list of workflows with pending actions of the ongoing business process, given the role that the user has in the different workflows of the process. In the NOTES environment implementation, these lists are available through a set of views of the transaction database.

f) Available Business Process

These appear as a functional capability of a workflow enabled application. The workflow server reports the available business processes that a workflow: enabled application can initiate.

Definition Services

Definition services are those related to defining the elements of a business process and its workflows and workflow links.

a) Define a Business Process

Using the workflow application builder (or other design application that uses the workflow: definitions API which is the way the application builder interacts with the workflow server), users can define the workflows and links that constitute a business process. In this connection, references herein to the workflow application builder should be understood as a reference to any design application which defines the workflows, links, conditional links and workflow language scripts that constitute a business process. The details for accessing the services provided by the server so that a suitable design application can be constructed should be apparent to persons skilled in the art based upon the descriptions contained herein.

b) Define a workflow

Using the workflow application builder (or other design application), users can define the structure of particular workflows that belong to the business process being defined through a set of structure definitions (specification of records of the workflow definitions database) and enable the application builder (or other design application) to create, modify and delete definition documents in the database.

Using the workflow application builder (or other design application), users can specify the:
    business processes
    links and workflows and all their elements
    conditional links between workflows
    bound data
    follow-up and reminder specification
    automated action to be taken by the server Names and Routing Services Names and routing services are those related to defining organizational roles and identities. The names and routing services allow an authorized user to create, modify and delete names and routing records in the names/routing database. These records contain the organizational roles and identities of the organization serviced by the server. They also contain the routing information for each identity that allows the server to queue notifications and reports for the proper STF processor. These services are specified through the user interface of the application builder or other design application that uses the names/routings API of the workflow server.

a) Define organization roles

Using the workflow application builder (or other design application) and a set of APIs from the workflow library, users can define roles used in the organization where the workflow system is implemented.

b) Define identities

Using the workflow application builder (or other design application) and a set of workflow definitions APIs from the workflow library, users can define identities in the organization where the workflow system is implemented.

STF Processing Services

The STF processing services are provided by the server to STF processors (described below) through an STF queue database. The database contains records of pending notifications and reports to be given to specific users in applications that the STF processors service. STF processors process and delete these records once they are processed.

Configuration Services

The configuration services are provided to the system administrator through a specific configuration database. Through a workflow server manager which is a user interface that uses the server administration API, the system administrator can define the network configuration of the system, the version of the servers, register STF processors, define the authorized users, specify the log database and the level of logging required.

Scheduling Services

The scheduling services allow an authorized user to create, modify and delete records of scheduled business processes. These records specify the date/time when the server must initiate a business process as well as the recurrence in which this initiation should happen. These services are specified through the user interface in the application builder.

External Interfaces

External interfaces provide services that are used by end-user applications, the workflow application builder, the workflow reporter and the STF processors. Some of these services, such as configuration services, are provided through specific user interfaces; others are provided by the workflow APIs. In an environment like NOTES (available from Lotus Corporation), where the client interfaces interact with the databases directly, client workflow-enabled applications access the databases directly to obtain workflow services. They do not use a programmatic API; instead they read and write workflow structures that are interpreted by the workflow server. In other environments workflow-enabled applications access the workflow services through the workflow APIs.

Network Architecture

The workflow server component of a workflow system is designed to be installed at a single site, managing a single set of databases. It can manage one or many business processes, and, as noted above, each business process can contain one or many workflows.

The workflow server is configured through a configuration database. When the workflow server starts, it begins to monitor and update the workflow databases as appropriate. Each workflow server can monitor multiple definitions, transactions, or scheduling databases, as specified in the configuration database.

In the NOTES environment distributed access to business process databases is achieved through the replication mechanisms of NOTES.

The transactions database managed by the workflow server can be replicated through the standard mechanisms of NOTES. In this way, distributed access for viewing and changing business process status is achieved.

A business process is designed in such a way that all the workflows that are part of the business process are stored and managed in a single NOTES (or other workflow enabled application) database. This database is then managed by a single workflow server for agent processing and workflow language interpretation.

As a stand-alone server in the Micrsoft Windows environment, a special version of the workflow server having a restricted functionality of services allows users of workflow-enabled applications to take action and rove workflows to completion, but does not include the services of automated agents or of execution of workflow language scripts.

Components of a Workflow System

Figure 2:
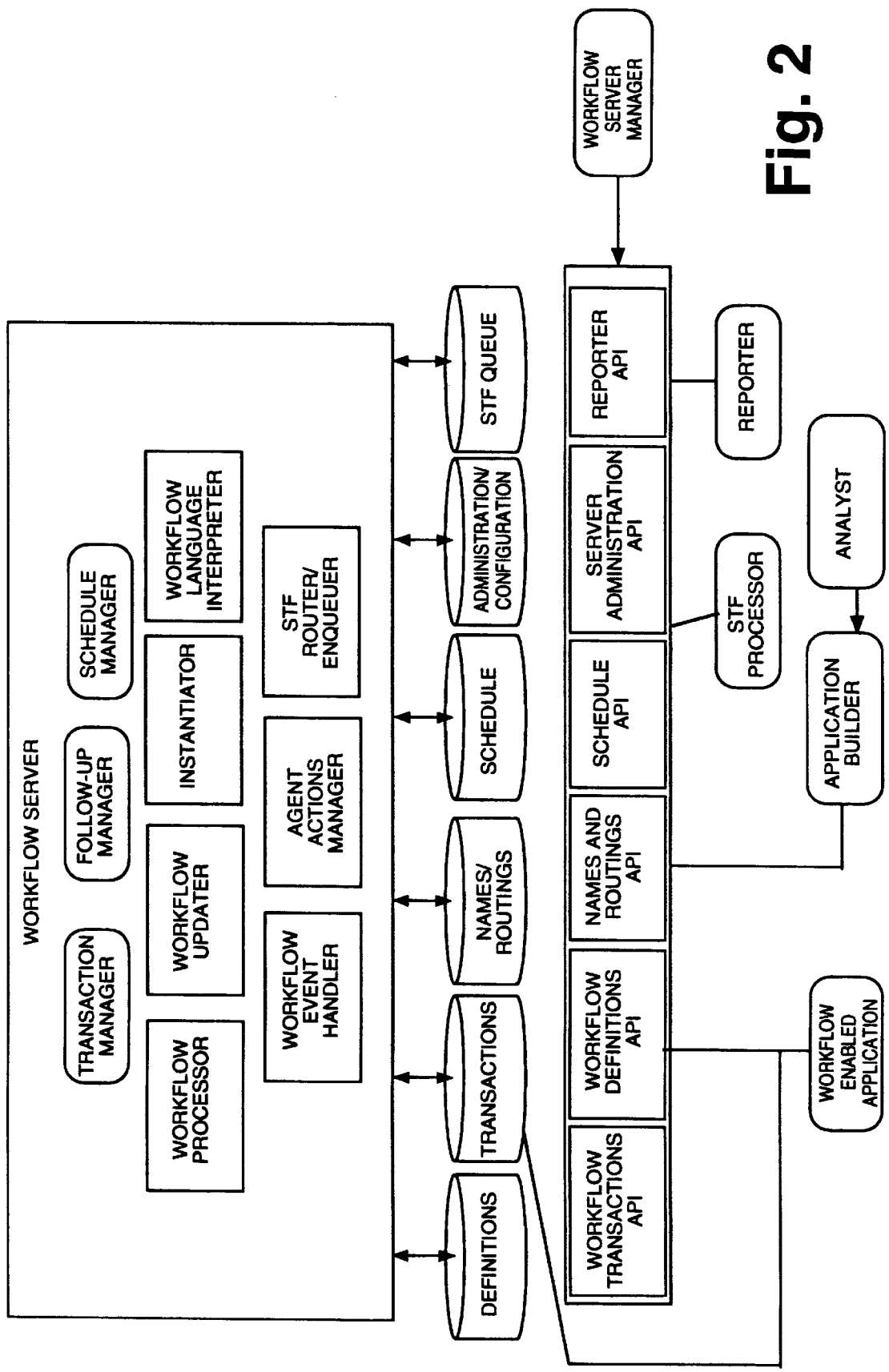
FIG. 2 is a block overview diagram of a complete workflow system.
Figure 3:
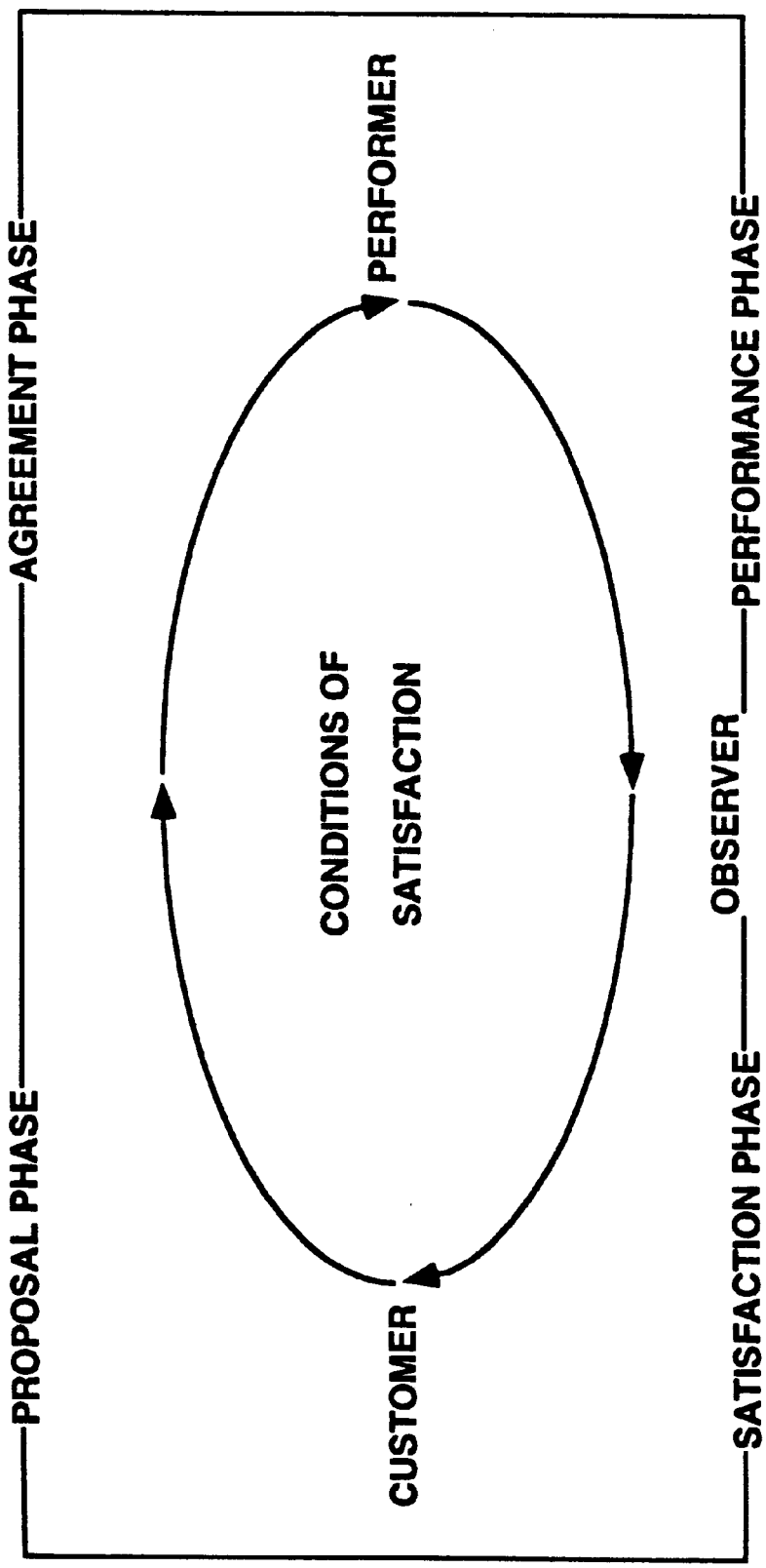
FIG. 3 is pictorial representation showing the phases of a single workflow.

A workflow system incorporates the following components which are shown in FIG. 2, a workflow server and databases, application program interfaces (APIs) and workflow server manager. In addition, a complete workflow system of the type in which the present invention may be utilized includes an application builder, analyst, standard transaction format (STF) processors, workflow enabled applications and reporter components. The application builder, analyst, standard transaction format (STF) processors, workflow enabled applications and reporter components, while useful components of a complete workflow system, do not form part of the present invention and details concerning such components are set forth herein only as needed for an understanding of the invention.

The following is a brief overview description of the workflow server, databases, APIs and workflow server manager which is followed by a detailed description of these components. Details concerning the remaining components are provided only as needed for a complete understanding of the invention. In the preferred embodiment as set forth below, the invented system is implemented using the Model, View, Class (MVC) paradigm of object oriented programming.

Workflow Server

The workflow server is the center of a workflow system. The workflow system concentrates workflow operations in the workflow server rather than in the end user applications. By using this client/server design, applications do not need to have the intelligence about workflows as part of their design. Application developers can concentrate on their particular application development not having to worry about workflow logic and overhead because such functionality is handled at the server.

FIG. 2 shows the major components of the workflow server in relation to other components of a workflow system. These components are referred to as processes and modules.

All work done by the server is performed by one of four processes which are referred to as the transaction manager, follow-up manager, date/time schedule manager and STF schedule manager. Processes are software components or tasks that are architected to run as separate entities from each other. The workflow server controls the four basic processes based upon workflow system server administration data in a configuration database in the following manner. First, it determines what STF processors need to run and spawns those processes. Second, it determines when to run the transaction manager and spawms that process. Third, it determines when to run the follow-up manager and spacers that process.

These processes may be separate executables or simply separate tasks within the body of the workflow system server.

Workflow server modules are software components that provide a specific type of functionality. Modules are used by the above processes and also among themselves.

Organizationally the modules can be thought of as separate libraries. These modules are the workflow processor, workflow updater, the workflow instantiator, the workflow language interpreter, the workflow event handler, the agent actions manager, and the STF router/enqueuer manager.

Databases

The workflow system utilizes the following databases:

Definitions Database

The definitions database contains records of the definitions of the organizations, business processes, workflows, roles, and acts. These records contain the instructions of what needs to be done in a workflow in a given instance. These records are used by the workflow updater and workflow processor to determine new workflow states and available actions.

Transactions Database

The transaction database contains records of the enactment of workflows. Each time a workflow is initiated or an action taken within a workflow, a corresponding record is made in the transactions database. These records include the workflow instances, the action transactions, the current incompletions, and the relationships between different workflows.

Names/Routings Database

The Names/Routings database contains records of the roles and identities of the organization where the workflow system is installed. It records the existing organizational roles, the current identities and the authorizations to act in one or more roles.

Schedule Database

The schedule database stores the date and time when a business process must be initiated. The date/time schedule manager reads this database.

Administration/Configuration Database

This database stores information needed by the workflow server to operate.

STF Queue Database

This database stores the records of notifications to be sent to users that interact with the workflow system through an STF processor interface.

Workflow APIs

The workflow APIs provide a programming interface to access the services of the workflow server. Workflow enabled applications, STF processors (described below) and the application builder are all developed using these APIs. APIs of the invented system are as follows: transaction API, definitions API, reporter API, names and routings API, schedule API and administration API.

Workflow Server Manager

The workflow server manager is a component of the workflow system that provides a user interface for specific services of the workflow server such as:
Server Management
Authorization Maintenance
Business Process Maintenance
Workflow Maintenance
STF Processor Maintenance
Configuration
Transaction Log Maintenance
Business Process Scheduling and Organizational Calendar The WSM uses the workflow APIs to implement the functions and services it provides to users. Through the use of the WSM, a user selects the scheduling function which provides the user interface to specify the recurrent scheduling of business processes as well as the specification of the organizational calendar as specified by the schedule manager.

Workflow Application Builder

The workflow application builder is a Graphical User Interface (GUI) application that allows a business process designer to specify the business process design with its network of workflows. The application builder, in turn, creates or edits the workflow definitions databases that define the business process and that will be used by the workflow server. The functions performed by the workflow application builder can alternatively be performed by a design application that uses the workflow definitions API of the workflow server.

Workflow Analyst

The workflow analyst is a GUI application that allows a business process analyst to specify the map of business processes with its network of workflows. Its output is readable by the application builder or equivalent which will update the definitions database of the server. Details concerning the workflow analyst may be found in co-pending U.S. Ser. No. 08/005,236 filed Jan. 15, 1993, now U.S. Pat. No. 5,630,069.

Workflow Reporter

The workflow reporter is a GUT application that provides an interface to the transaction databases through the workflow reporter API of the system. It allows the observation of the status of current transactions as well as the history and performance of past transactions. Further details concerning the workflow reporter are not needed for a complete understanding of the present invention. Alternatively, such reports can be provided by an application that uses the workflow reporter API.

STF Processors

An additional set of mechanisms for developing workflow-enabled applications are provided in a workflow system through the definition of a standard transaction format (STF). This format defines the semantics for accessing the workflow services through different types of interfaces: messaging, databases and inter-process communication.

For each one of these types of interfaces there is a syntactic definition that specifies the specific format for the representation of the workflow data and the process specific data in that medium. This syntax definition constitutes an STF API that a particular application will then use.

The communication and interface between workflow-enabled applications that do not use the workflow; APIs and the server is provided by STF processors. These STF processors map and translate between a workflow-enabled application's data format and the workflow APIs data elements.

STF processors provide a layer for integration of many different protocols and technologies. STF processors can be constructed for any message transport environment protocol, database technology, and inter-process communication protocol.

The interface from STF processors to the server is accomplished through the work-flow APIs. From the point of view of workflow services, the STF processors appear to the server as additional applications.

A standard transaction format (STF) processor is an application whose job is to interface external systems to the workflow system. There is one STF processor for each different type of system that interfaces to the workflow system.

Workflow-Enabled Applications

A workflow-enabled application interfaces to the server via the workflow APIs or via direct access to the transactions database of the workflow server, or via the use of an STF processor which can use different interfacing mechanisms such as messaging, database or inter-process communication.

DESIGN AND IMPLEMENTATION DESCRIPTION

A. WORKFLOW SERVER

The workflow server is a set of processes, modules, databases and APIs as set forth above. The following is a description for implementing the processes, modules, databases and APIs of the workflow server. Also described is a workflow server manager which provides a user interface for specific services of the workflow server.

Processes

Transaction Manager (TM)

The TM starts all the actions that must happen when there is a change in the transactions database. The TM is the driver for processing requests made by users through workflow-enabled applications. The transaction manager determines what changes in the transaction database have occurred. Records that have changed in the database are detected by the TM. The transaction manager manages a transaction queue and services queued transactions in FIFO order. Transactions may be entered directly by a user via forms available in workflow-enabled applications, which use the workflow transactions APIs to request the services of the workflow server, or they may be requested via an STF Processor.

A workflow record that has changed, falls into one of several different categories. It may be:

A request for initiation of a new business process;

A request for initiation of a new workflow within a business process; or

A request for an act within a workflow.

Each of the different types is dealt with differently.

Figure 4A:
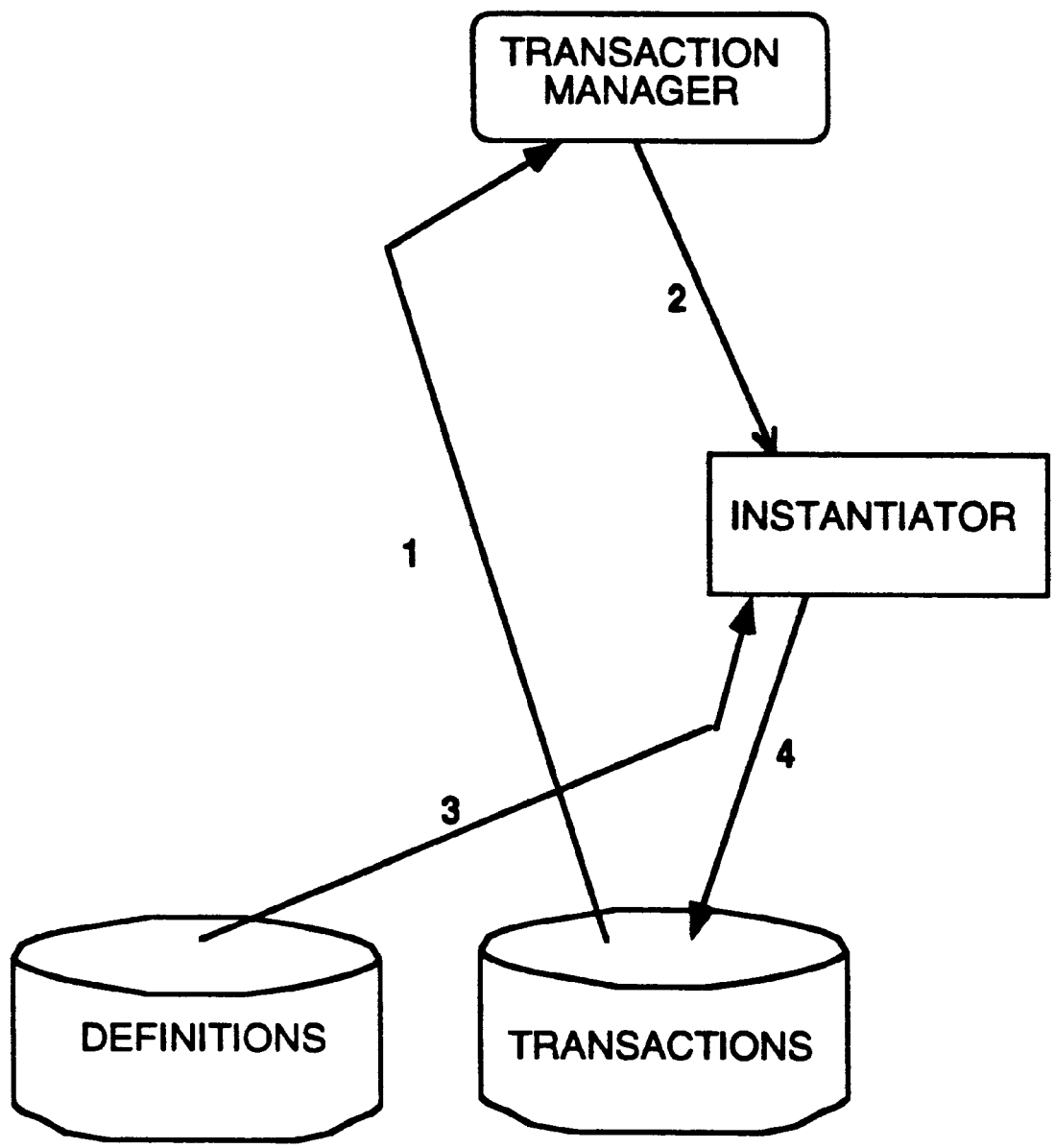
FIG. 4a is a transaction manager control flow when it detects the initiation of a new business process or workflow.

When there is a business process or workflow initiation FIG. 4a shows the control flow of the transaction manager when it detects the initiation of a new business process or workflow. In this case the transactions database will contain the record for the business process or the workflow being initiated.

In Flow #1 the transaction manager detects the initiation of a business process or workflow in the transactions database.

In Flow #2 the transaction manager calls the Instantiator Module, which will instantiate the workflow records based on the definition of the business process.

In Flow #3 the instantiator reads the definition of the business process or workflow from the definitions database.

In Flow #4 the Instantiator creates all the new transaction records for the corresponding workflow or the business process.

Figure 4B:
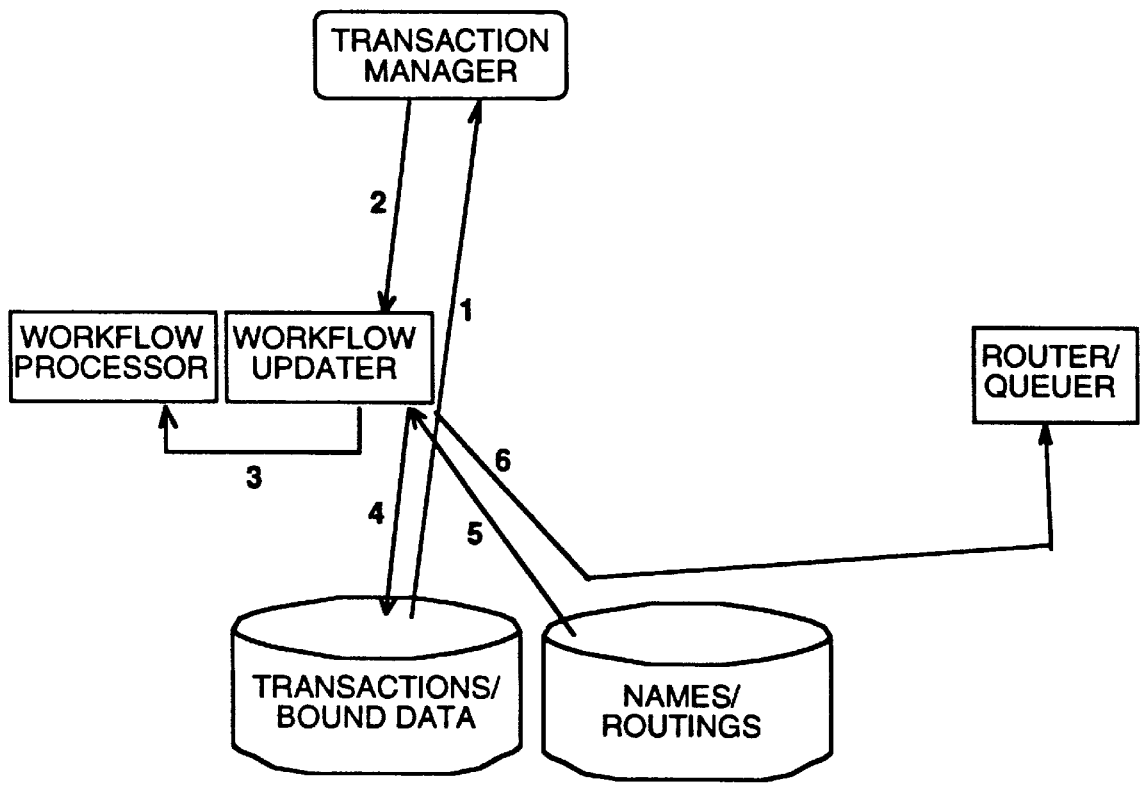
FIG. 4b is a transaction manager control flow when it detects a change in the transactions database that indicates that a user (or an agent) has taken an act in a workflow.

FIG. 4b shows the control flow of the transaction manager when it detects a change in the transactions database that indicates that a user (or an agent) has taken an act in a workflow.

In Flow #1 the transaction manager detects the workflow act being taken in the transactions database.

In Flow #2 the transaction manager calls the workflow updater to begin processing this newly undated transaction record.

In Flow #3 the workflow processor calculates next available acts, new incompletions, etc.

In Flow #4 the next available actions, incompletions, etc. are written to the transaction records.

In Flow #5 the workflow updater checks the names database to see if one of the identities participating in the workflow being processed needs to be notified via an STF processor.

In Flow #6 if an identity has been identified in Flow #5 that needs to be notified via an STF processor, then the transaction is queued in the STF queue database.

Figure 4C:
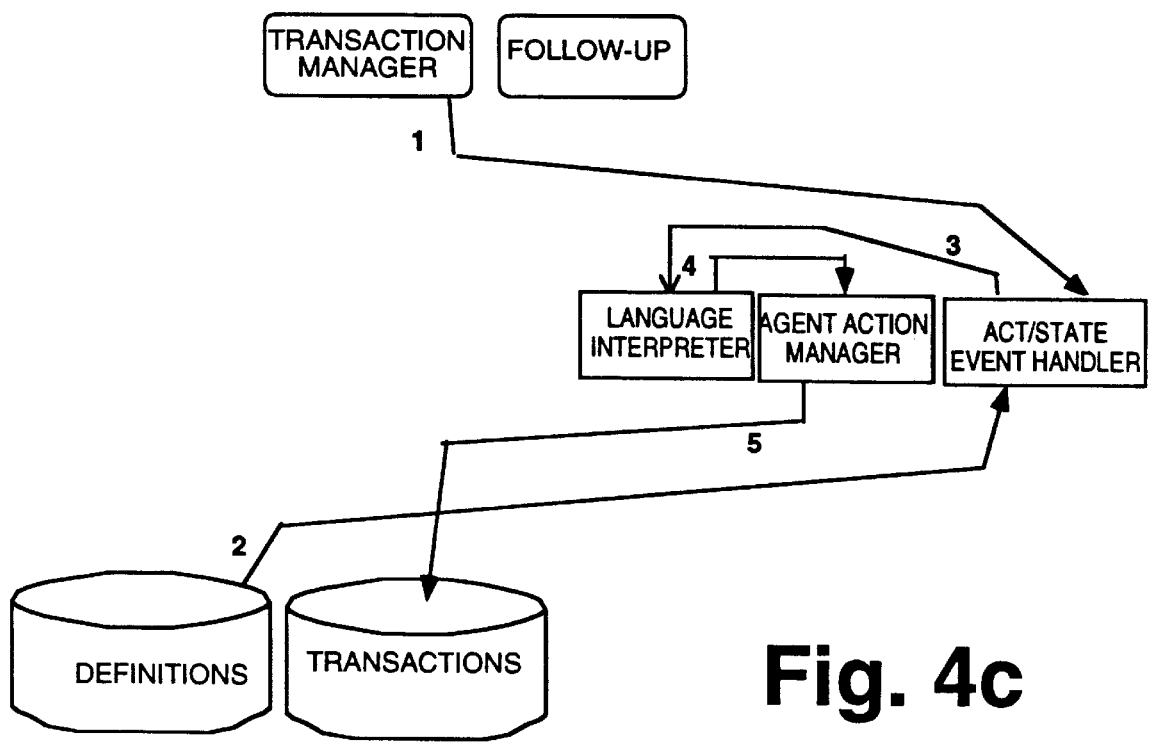
FIG. 4c is a transaction manager control flow when it processes the workflow events of a workflow.

FIG. 4c shows the control flow of the transaction manager when it processes the act and state events, which are also referred to herein as workflow events, of a workflow. In the definitions database, each workflow definition includes workflow language segments (scripts) that are associated with each act and state of the workflow.

In Flow #1 the transaction manager invokes the workflow event handler indicating the workflow, act and state that should be processed.

In Flow #2 the workflow event handler reads the script for the act from the definitions database.

In Flow #3 the workflow event handler invokes the workflow language interpreter to process the script.

In Flow #4 If the script indicated that an action needs to be taken, the workflow language interpreter calls the agent actions manager to take the workflow act on behalf of the user.

In Flow #5 the agent actions manager updates the transactions database to reflect that an act has been taken.

The workflow event handler then repeats Flow #2, but in this case reads the script for the state of the workflow. The process continues to Flow #3 with respect to the state.

The workflow event handler repeats Flow #2 and Flow #3 for the script that corresponds to the current state of the primary workflow of the business process.

In the preferred embodiment, the transaction manager is implemented as follows. The transaction manager identifies changes that have taken place in the workflow transaction database and invokes the proper server modules to provide the services that have been requested or that those changes represent. The transaction manager queues and services incoming transactions by instantiating a transaction-type-specific object.

The date/time the transaction was entered is given along with its type and id. This date/time field is used to do FIFO (first in-first out)queue retrievals. The earliest date/time will always be retrieved first.

ITXID is the id of a transaction in the Transaction Database. These ids are txtype dependent and can be used to access transactions directly from the database.

The following is a description in pseudo-code for implementing the transaction manager process. This implementation is described in terms of a MAIN function or routine which includes a call to a loop (MainLoop) which executes continuously.

MAIN

The MAIN function connects to the Virtual Database (VDB), performs the primary activity of the transaction manager and disconnects from the Virtual Database.

The primary activity of the transaction manager is checking the workflow transactions database for requests to process. It performs this primary activity by a call to the function MainLoop.

In case of an error, the MAIN function performs a write to an error log, giving the error code and the message. The flow of the MAIN function is as follow:

1. Connect to the Virtual Database.
2. If connection is successful write a message to a log provided by the workflow server manager described below.
3. If connection is not successful, write a message to the log and return.
4. Call function MainLoop.
5. Disconnect from the Virtual Database.
6. If disconnection is successful write a message to the log.

7. If disconnection is not successful, write a message to the log and return.

MainLoop

This function performs the primary activity of the transaction manager. In an unconditional loop, it checks if any message has been sent from the workflow server manager (WSM) and processes it. It then performs the main activity of checking for workflow requests and invokes either the workflow updater or the agent/action manager.

1. Check for any message for the transaction manager from the WSM. To retrieve messages, the method bfnGetMessage of class MESSAGEQ is called. In case of any error, the error is written into the log file.
2. Depending on the message, the message is processed differently, according to steps 3 and 4 below.
3. If the message is to terminate the transaction manager, the function is terminated.
4. If the message is to indicate that the configuration has changed then do the following:
5. The new configuration is retrieved using method bfnGetConfigInfo of class CONFIGINFO. The new configuration is returned in a structure that contains all the configuration information. In case of error in retrieving the configuration information, the error is written in the log file.
6. The configuration database specifies the polling interval and the log verbosity options. The polling interval is the time the transaction manager sleeps between processing cycles. The log verbosity option specifies the amount of information that gets written into the log file. The function AWSWriteToLog is used to log activities into the log file.
7. Invoke workflow updater.
8. Invoke the agent actions manager.
9. Sleep for a time interval of duration PollInterval.
10. Proceed to step 1.

Follow Up Manager

The follow-up manager runs periodically, scheduled per workflow server administration tables in the administration/configuration database. It can run asychronously to the transaction manager. It determines when notifications, either follow up or reminders, are to be sent and sends them.

The follow-up manager detects transactions in which a participant has an overdue commitment and, depending or the workflow definition stored in the definitions database, will execute a script, send a mail message, or take other actions that are defined. The follow-up manager interacts with a Workflow Incompletion Transaction class which is part of the transaction database, which furnishes follow up and reminder times, in order to select workflows requiring notification.

Follow up is specified in the workflow definition, this specification is done through the application builder or equivalent. For each workflow, a follow up specification can be made for each one of the roles of the workflow as follows:
Specify when the follow-up will be done
   First and last valid times
   Recurrence interval
   Holidays on which not to follow-up (Optional)
   Days of week on which to follow-up (Optional)
   Time ranges in which to follow-up (Optional)
   How many times to follow-up before stopping
Specify incompletions to be followed up on
   Customer response due
   Performer response due
   Performer fulfillment due
Specify the type of check
   Will be coming due (reminder) and how soon
   Is past due (follow-up) by how much
Specify what to do for the follow-up In each workflow transaction, the current incompletions for each role are kept as indexed records. In addition to the date for the incompletion, the record will contain a field for the next date and time for follow up as well as the next date and time for reminder. The records will be indexed on these two date fields as well. The follow-up manager works off these incompletion records.

The follow-up manager checks if the first follow-up or reminder date/time is due "now" and that "now" is not a restricted date/time according to the organizational calendar, and if so, retrieves the workflow language script and passes it to the Workflow Language Interpreter for processing. The follow-up manager deals appropriately with the case that the server has been down and processes all entries that are past due.

The following is a description in pseudo-code for implementing the follow-up manager process. This implementation is described in terms of a MAIN function or routine which includes a call to a loop (MainLoop) which executes continuously.

MAIN

The MAIN function connects to the Virtual Database (VDB), performs the primary activity of the follow-up manager and then disconnects from the VDB.

The primary activity of the follow-up manager is checking for overdue commitments and then sending reminders or follow-up messages. It performs this primary activity by a call to the function MainLoop.

In case of an error, the MAIN function performs a write to an error log, giving the error code and the message. The flow of the MAIN function is as follow:

1. Connect to the Virtual Database.
2. If connection is successful write a message to the log.
3. If connection is not successful, write a message to the log and return.
4. Call function MainLoop.
5. Disconnect from the Virtual Database.
6. If disconnection is successful write a message to the log.
7. If disconnection is not successful, write a message to the log and return.

MainLoop

This function performs the primary activity of the follow-up manager. In an unconditional loop, it checks if any message has been sent from the workflow server manager (WSM) using the workflow administration API, and processes it. It then checks for commitments due and sends follow-up and reminder messages if required. The flow of MainLoop is as follows:

1. Check for any message for the follow up manager from the (WSM). To retrieve messages, the method bfnGetMessage of class MESSAGEQ is called. In case of any error, the error is written into the log file.
2. Depending on the message, the message is processed differently, according to steps 3 and 4 below.
3. If the message is to terminate the follow-up manager, the function is terminated.
4. If the message is to indicate that the configuration has changed, then do the following:
5. The new configuration is retrieved using method bfnGetConfigInfo of class CONFIGINFO. The new configuration is returned in a structure that contains all configuration information. In case of error in retrieving the configuration information, the error is written to the log file.

6. The configuration database specifies the polling interval and the log verbosity options. The polling interval is the time the follow-up manager sleep between processing cycles. The log verbosity option specifies the amount of information that gets written into the log file.

7. The function FollowUp is called to perform the main activity of the follow-up manager.

8. Sleep for a time interval of duration PollInterval.

9. Proceed to step 1.

FollowUp

The FollowUp function scans the Incompletions table of the transactions database and determines which incompletions are due for reminder or follow-up. The processing is done in two passes, one for reminders and the other for follow-ups.

1. Set a flag to indicate if it is a reminder or follow-up pass.

2. Get the current time. This time will be the basis for selecting incompletions which are due. If the incompletions are prior to the current date then the incompletion is processed. In case of error in getting the current time, log an error and return.

3. Using methods of class TXWFINCOMPLETION from the transactions database, the incompletions due for processing are retrieved. Methods bfnGetFirstIncompletion and bfnGetNextIncompletion retrieve the incompletions that are due.

4. If an incompletion is due (reminder or follow-up), methods of class TXWFINCOMPLETION are called to get the Business Process Id (lBPTid), the Workflow Id (lWFTid) and the Incompletion type(IncId). The following methods are used:

| Value | Methods |
|---|---|
| BPTid | lfnGetBPTid |
| WFTid | lfnGetWFTid |
| IncId | fnGetIncId |

5. The workflow associated with the incompletion is retrieved from the VDB. An instance of the class TXWFINSTANCE is created. The lBPTid and the lWFTid are passed as parameters.

6. Depending on the incompletion, the workflow participant is determined. The logic for determining the workflow participant is as follows:

| Notification Type | Incompletion Type | Workflow Role |
|---|---|---|
| Reminder | Customer His Completion | Performer |
| Follow-up | Customer His Response | Performer |
| Follow-up | Customer His Completion | Performer |
| Follow-up | Performer His Response | Customer |

7. Check if the Identity needs notification. The Identity attributes are retrieved from the VDB. These are stored in table NRDFIDENTITY. If the Notification flag is set then the follow-up/reminder information is sent to the workflow participant. The notification information is retrieved using method bfnGetNotify.

8. If notification is required, then retrieve the STF Processor Id, by using method lfnGetSTFProcId of class NRDFIDENTITY. The notification is placed in the STF queue of this STF processor.

9. The notification event is determined by the following table:

| Incompletion Type | Event Type |
|---|---|
| Customer His Completion | Performer Completion coming due |
| Customer His Response | Performer Response past due |
| Customer His Completion | Performer Completion past due |
| Performer His Response | Customer Response past due |

10. Get the time when the incompletion was due i.e. the Completion Time (this is not to be confused with he completion time of the workflow).

11. Get the reminder or follow-up time, i.e. the time this notification was due. (Note: It is important to distinguish between incompletion due time and reminder and follow-up due time).

12. Dispatch notification. The notification is placed in the STF Queue. Method bfnPutEvent of class TXSTFQUEUE places the notification.

13. Determine when the next notification is to be sent. Get the workflow notification definition. This contains recurring information. The next follow-up time is determined and written to the incompletion table via method vfnPutFollowUpTime.

14. Get the next incompletion to be processed. If present, proceed to step 4.

15. Return, processing is complete.

Date/Time Schedule Manager

The date/time schedule manager detects events which are to be executed at a particular time. The scheduled events are kept in the schedule database. The events are placed in the database by the workflow server manager user interface via calls to the schedule API and are processed by the schedule manager. The scheduled events are kept in the database in chronologically increasing order.

A schedule database entry specifies when the event will be done as well as the first and last valid times for the entry, indicating the first time it should happen and when it should stop happening. If the first and last valid times are the same, the schedule entry is executed once.

A recurrence interval for a schedule entry is "how often" the schedule entry is executed. Recurrence intervals may be every X minutes, every hour, every day, every month, the third Thursday of every month, and so forth.

An organizational calendar is connected to the schedule manager, so that entries may be tagged to not happen on specific days (such as weekends or holidays like Labor Day).

The schedule entry may be filtered to happen only on particular days of the week (such as Monday through Friday).

The schedule entry may be filtered to happen only during particular time intervals (such as any time between 8–12 or 1–5)

The first thing that the schedule manager does in a cycle is to find events that are due now (or which are past due). This is done by finding those with a time-out time that is less than "now".

For each of the found entries, the schedule manager then brings the time-out forward to "now", even if it is currently set in the past. This function should deal properly with the case when the server has been down.

For each of the found entries, the schedule manager then passes the business process initiation script to the Workflow Language Interpreter for processing.

After the schedule entry is processed, the schedule manager updates the schedule entry record for the next time out based on the parameter set for it. If the entry needs not be executed again, it is then removed from the schedule database.

The following is a description in pseudo-code for implementing the schedule manager process. This implementation is described in terms of a MAIN function or routine which includes a call to a loop (MainLoop) which executes continuously.

MAIN

The MAIN function connects to the Virtual Database (VDB), performs the primary activity of the Scheduler and disconnects from the Virtual Database.

The primary activity of the schedule manager is to find business processes that are scheduled for initiation and start them.

In case of an error the MAIN function performs a write to an error log, giving the error code and the message. The flow of the MAIN function is as follow:

1. Connect to the Virtual Database.
2. If connection is successful write an message to the log.
3. If connection is not successful, write a message to the log and return.
4. Call function MainLoop.
5. Disconnect from the Virtual Database.
6. If disconnection is successful write an message to the log
7. If disconnection is not successful, write a message to the log and return.

MAINLOOP

This function performs the primary activity of the schedule manager. In an unconditional loop, it checks if any message has been sent from the workflow server manager (WSM) using the workflow administration API, and processes it. It then performs the main activity of scheduling business processes at the scheduled time.

1. Check for any message for the schedule manager from the WSM. To retrieve messages, the method bfnGetMessage of class MESSAGE is called. In case of any error, the error is written into the log file.
2. Depending on the message, the message is processed differently, according to steps 3 and 4 below.
3. If the message is to terminate the schedule manager, the function is terminated.
4. If the message is to indicate that the configuration has changed then do the following:
5. The new configuration is retrieved using method bfnGetConfigInfo of class CONFIGINFO. The new configuration is returned in a structure that contains all configuration information. In case of error in retrieving the configuration information, the error is written in the log file.
6. The configuration constitutes the polling interval and the log verbosity options. The polling interval is the time the Scheduler sleeps between processing cycles. The log verbosity option specifies the amount of information that get written into the log file.
7. The function Scheduler is called, this performs the main activity of the schedule manager.
8. Sleep for a time interval of duration PollInterval.
9. Proceed to step 1.

Scheduler

The Scheduler function scans the scheduler table of the schedule database and determines which business processes are ready to be scheduled.

1. Get the current time. This tine will the basis for selecting business processes which are due to be started. If the initiate time of the business process is after the current date then the business process is initiated.
2. Using methods of class SCBPSCHEDULE the business processes due for initiating are retrieved. Methods bfnGetFirstIncompletion and bfnGetNextIncompletion retrieve the business processes that are due.
3. Get the Business Process Definition Id (BPDid). Use method lfnGetBPDid of class SCBPSCHEDULE.
4. Get the Business Process Definition. Create an instance of class DFBP for definition id BPDid.
5. Get the Business Process Name. Use method vfnGetBPName of class DFBP.
6. Initiate the business process. Transactions API call AWSTINITBP is called. The Business Process Name is a parameter to this call.
7. Determine the next ti-Le the Business Process needs to be scheduled. The Recurring Offset is retrieved using methods lfnGetRecTime of class SCBPSCHEDULE.
8. If the Recurring Offset is specified, the next initiate time is computed by adding the recurring offset to the current initiate time.
9. If the Recurring Offset is not specified, the scheduling entry is deleted from the table.
10. Get next Business Process to be initiated. If present proceed to step 3.
11. Return, processing is complete.

Modules

Workflow Processor

The workflow processor is the brain of the workflow system. The workflow processor is analogous to the central processor unit (CPU) in a computer. Both processors receive inputs in the form of events, and both carry out logic computations. The CPU embodies a logic processor, while the workflow processor embodies the logic of workflows with phases, cycle times, actions and roles. It contains the structures and Finite State Machines (FSMs) that specify the acts and actions that are available. This module is database independent, and provides an API through which the rest of the system interfaces with it. It is furnished with in-memory structures providing complete act/state data of a workflow, from which it derives updated status information returned via these structures. The workflow processor embodies the logic of workflows with phases, actions, roles and dates of completion and reply.

The basic logic of the workflow server is very similar to that used by a human manager. It asks:

What actions have happened and not happened?

That data has changed? and

What amount of time has elapsed?

The workflow updater module of the workflow server asks the workflow processor:

What are the available acts for the customer and performer given the current state and the type of the workflow?

Given an act, what is the new state of the workflow and what incompletions change?

The workflow processor then answers with the state of the workflow and gives the answer to the workflow updater which updates databases, and changes the state of the workflow.

These tasks would be impossibly complex if the number of states were large and the possible actions infinite. The present invention addresses this problem by defining a business model that intelligently defines a few conditions and actions as building blocks, but from which thousands of permutations can be constructed.

A complete description of a suitable workflow processor which may be used in a workflow server may be found in U.S. Ser. No. 600,144 filed Oct. 17, 1990 and U.S. Ser. No. 07/368,179 filed Jun. 19, 1989, both owned by Action Technologies, Inc., the assignee of the present application.

Workflow Updater

The workflow updater module processes requests made by users via API calls, changes to the transaction database or by agent actions. This module processes workflow transactions that have been modified, updating then with the new workflow status information returned by the workflow processor.

The workflow updater module updates the bound data in the business process, based on the data that was provided as part of the act that is being taken. If other scopes are defined for a workflow, then the bound data is updated in the scope of the workflow in which the act was taken.

The workflow updater calls the workflow processor passing to it the workflow identification, the act being taken, the workflow role that is taking the act and the current state. The workflow processor returns to the workflow updater the new state of the workflow, the incompletion transitions what incompletions need to be set, and which ones need to be removed), the set of available acts for each one of the workflow roles and the times that can/must be specified by the users when taking each one of these available acts.

The workflow updater maintains and updates the workflow transaction database. It uses the workflow; processor to determine the status of workflows and the set of possible actions for each one of the roles.

The workflow updater processes an act taken by a workflow participant i.e., the Customer or Performer. This act could have been taken through a call to the proper transactions API function, through a direct modification of the transactions database or by the agent actions manager upon request of the workflow language interpreter. When an act is taken, it is recorded in a act taken database record of the transactions database. The server sequentially processes all acts. The following is a description in pseudo-code for implementing the workflow updater module.

1. Use AWSWriteToLog method of the Translog class of the Administration database to log the act taking activity.
2. Check whether there are acts to take by calling method bpnGetFirstInQueue of class TxWFActs in the VDB.
3. Check if the act is a valid act and the act is present in the list of available acts for an workflow participant by invoking method bfnCheckValidAct of class TwxFActs in the VDB.
4. Find out the current state, WF type, WF role, and the Act by invoking respectively the methods fnGetWFState, fnGetWFType, fnGetWFRole, and fnGetAct of class TxWFActs in the VDB.
5. Check with the workflow processor to determine if the act taken is consistent with the current state of the workflow and the role of the act taker (Customer/Performer) by invoking method bfnCheckValidAct of the class TxwFActs.
6. Determine the new state of the workflow by calling the workflow processor.
7. Compute the new set of incompletions by by calling the workflow processor.
8. Compute the new set of acts and the date prompts for the customer and performer using function AWSTAvailableActs of the workflow processor. If any acts are disabled then those are removed form this new set of acts using the method bfnIsDisabled of class DFWFDisabledActs of the VDB.
9. Invoke the workflow event handler to interpret the scripts associated with the act, state, and the primary workflow.
10. Send notifications the workflow participants informing the completion of the act by invoking the STF Router/Enqueuer.

Classes and the methods invoked by the workflow updater module:

| Methods | Class | Action |
| --- | --- | --- |
| bfnCheckValidActs | TxWFActs | check if act is in Available Acts Table |
| lfnGetCompletionTime | TxWFInstance | From VDB retrieve the Completion time |
| lfnGetIncompletionTime | TxWFActs | From VDB retrieve the Incompletion Time |
| AWSTAvailableActs | | compute available acts for both customer and performer. |

Workflow Instantiator

The workflow instantiator module is called by the transaction manager when it detects a request to initiate an instance of a business process or a workflow. The workflow instantiator instantiates business process and workflow records into the transactions database. This module creates workflow transaction records as specified in business process definitions whenever a workflow is initiated.

If the transaction manager detects a change in the transactions database that indicates a request for initiation of a new business process, the instantiator reads the business process definition and creates the transaction records for the business process and for the primary workflow of the business process according to the definition.

If the transaction manager detects a change in the transactions database that indicates a request for initiation of a new workflow, the instantiator reads the workflow definition and creates the transaction record for the workflow according to the definition.

The instantiator also performs the role to identity mapping so that the roles that are specified in the workflow definition get mapped to the proper identities in the transaction record of the workflow.

The following is a description of the steps for implementing the workflow instantiator module.

The instantiator creates an instance of a business process. It makes a copy of the definition.

1. Check the length of the Business Process Name (szBPName) is within limits. If beyond limits, return error.
2. Validate the Instantiator Identity. Check if the name length is within limits.
3. Check if Instantiator Identity is a valid user and registered. Method InquireAuthorization from class AuthMaint is used to determine if the user is valid and registered. This function accesses the Names/Routings database for validation, it calls the constructor of class NRDFIDENTITY.

4. Check if the Instantiator Identity is authorized to instantiate business processes. It checks the authorities table in the names/routings database to check if this identity is authorized to instantiate business processes. The authorization method InquireAuthorization from class AuthMaint is called to determine the authorization.
5. If the Customer name is specified, check if the name length is within limits.
6. It the Customer name is specified, check that this nave is valid and registered method InguireAuthorization from class AuthMaint is used to determine if the user is valid and registered. This function accesses the Names/Routings database for validation, it calls the constructor of class NRDFIDENTITY.
7. If the Performer name is specified, check if the name length is within limits.
8. If the Performer name is specified, check that this name is valid and registered. Method InguireAuthorization from class AuthMaint is used to determine if the user is valid and registered. This function accesses the Names/Routing databases for validation, it calls the constructor of class NRDFIDENTITY.
9. If the Completion date is specified, check if the date string length is within limits.
10. If the Completion date is specified, convert the date string to long format.
11. If the Reply date is specified, check if the date string length is within limits.
12. If the Reply date is specified, convert the date string to long format.
13. If the Initiate date is specified, check if the date string length is within limits.
14. If the Initiate date is specified, convert the date string to long format.
15. If Completion and Reply dates are specified, the Reply date should be before the Completion date.
16. If the Initiate date, if specified, it should be the earliest of all specified dates.
17. Create an instance of this business process. The constructor for class TXBPINSTANCE is called for this purpose.
18. The central workflow instance is created. The constructor for class TXWFINSTANCE is called for this purpose.
19. Check for each organization role to identity any mapping which is specified at the time of initiation which overrides the mapping specified in the definition of the workflow, that the organization role and identity do exist. To verify that the organization role is present, the constructor for class NRDFORGROLE is called. To verify that the identity is present, the constructor for class NRDFIDENTITY is called.
20. Store the organization role in classes TXBPASSIGN and TXWFASSIGN from the transaction database classes to identity overrides. The constructors are called for these two classes.
21. Return status.

Workflow Language Interpreter

Workflow definitions are stored in the definitions database. Included in these workflow definitions are conditions under which workflows become active and inactive, and the conditions under which the workflow server should take specified actions. These conditions and instructions are expressed in the workflow language.

The workflow language interpreter interprets workflow language scripts. These scripts or workflow language segments contain workflow commands, such as the initiation or taking an act in a workflow. These scripts are part of the business process definition. These scripts are automatically generated by the application builder or equivalent design application.

The following is a description of the steps and syntax for implementing the workflow language interpreter module.

The workflow language interpreter interprets both user defined and system generated scripts, and performs the corresponding function defined in the script. The user can perform the following functions on a workflow. The workflow language interpreter interprets user-defined as well as system generated scripts, and performs tests, functions, and assignments as presented in either kind of script. The syntax and capability of the ActionWorkflow scripting language are the same for the two kinds of scripts and is described as follows:

Language Syntax

A statement of the language is either an If Statement, an Action Statement or an Assignment Statement. An If Statement is either:

```
If <boolean expression> statement 1 . . . statement n
endif
    or
If <boolean expression> statement 1 . . . statement s
else statement s+1 . . . statement n endif
where <boolean expression> is:
    TRUE
    FALSE
    <boolean expression> AND <boolean expression>
    <boolean expression> OR <boolean expression>
    <bound data name> OPERATION <numeric term>
    ISINSTATE (workflow name, state name)
    ISNOTINSTATE (workflow name, state name)
where OPERATION is
    equal to
    not equal to
    greater than
    greater than or equal to
    less than
    less than or equal to
An Action Statement is either:
    INITIATE workflow name,
    ACTIVATE workflow name, or
    ACT workflow name, act name
An Assignment Statement is either:
    <bound data name> = <bound data name>
        or
    <bound data name> = <numeric term>
```

2. Capability

The above-described syntax enables a script writer to start workflows, to act in workflows, to change bound data associated with a workflow, to test sound data associated with a workflow and conditional upon the results follow one or another distinctly different course of action.

The workflow language interpreter can be divided into the following functional modules:

1. The Lexical Analyzer which defines the Workflow Language grammar.
2. The Parser which parses the workflow scripts and invokes the corresponding semantic routines associated with the commands in the script.

The main implementation details are as follows:
1. The workflow event manager calls the workflow language interpreter and passes to it the Business Process Transaction ID, the Workflow Transaction ID, and the Script Type to be executed.
2. Using this information the workflow language interpreter retrieves the appropriate workflow script from the definitions database using method bfnGetScriptName of the class DFWFActState.
3. For the command Instantiate, the instantiator is invoked.
4. For the command Activate, the workflow updater is invoked.
5. For the command TakeAnAct, the workflow updater is invoked.
6. For external functions, the workflow language interpreter invokes the external function passing the specified parameters.

Workflow Event Handler

The workflow event handler is called by the transaction manager to process the actions associated to acts and states in the workflow definition which are specified for a given workflow when an action is taken or a state reached in the workflow. It accomplishes this my reading the business process definition and by reading the workflow status information of the workflow transaction.

The workflow event handler also locks in the definitions database for the workflow language scripts associated with acts and states of the workflow. The workflow event handler retrieves the language script corresponding to the act that was taken and passes the script to the workflow language interpreter for processing. The workflow event handler retrieves the language script corresponding to the state of the workflow and passes the script to the workflow language interpreter for processing. Then the workflow event handler retrieves the appropriate scripts associated with the states of the connecting workflows and passes the to the workflow language interpreter. Finally the workflow event handler retrieves the language script for the primary workflow of the business process for the current state of that workflow and passes that script to the workflow language interpreter for processing.

The following is a description of the steps for implementing the workflow event handler module. The workflow event handler invokes the method AWSScriptToExecute of the workflow language interpreter to execute the following scripts associated with a workflow:
1. The system generated act script
2. The user generated act script
3. The system generated state script
4. The user generated state script
5. The system generated state script of all the connected workflows
6. The user generated state script of all the connected workflows
7. The system generated state script of the primary workflow
8. The user generated state script of the primary workflow To implement steps 7 and 8, the method bfnIsCentralWF of class obTxWFINSTANCE is used to determine the Current WF is the primary workflow. Method obWFInstance is used to obtain the primary workflow.

Agent Actions Manager

The agent actions manager module executes the commands specified in a script. These include Initiate, Act, Follow-up as well as external functions. In this form the agent action manager is taking workflow acts by an "agent" on behalf of some role in the workflow. The commands that the "agents" execute are specified through the workflow language.

The following is a description of the steps for implementing the agent actions manager module.

The agent actions manager is invoked by the workflow language interpreter when it finds a workflow action or external function to be performed in a workflow language script. If the workflow needs to be instantiated the instantiation is done by the workflow instantiator module. After instantiation a flag is set to indicate if activation or initiation is required. The agent action manager scans for all workflows which have this flag set and processes them. The process is described below.

1. Log the activity using the method AWSWriteToLog.
2. Obtain the current date and time.
3. Get the next workflow to act on by using method TxWINSTANCE of class TXWFINSTANCE, which is the act to take queue.
4. If the workflow to be processed is the primary workflow then change the Business Process status to "IN__PROGRESS". The methods to use are bfnIsCentralWF and bFnSetBPStatus.
5. If the Customer, Performer and Observer(s) are not specified, then pick up defaults and assign all the workflow participants. The methods to use are lfnGetCustId, lfnGetPerfId, lfnPutCustId and lfnPutPerId.
6. Specify the default Reply and Completion time using methods lfnGetReplayDate and lfnGetCompletionTime of class TxWFINSTANCE. If these times not present, obtain them through the definition defaults by using methods bfnGetCycleTimes of class DFWFCYCLETIMES in the VDB. Assign the default using the methods bfnPutReplyDate and bfpPutCompletionTime of class TxWFINSTANCE.
7. Set up environment for first act to be taken. The act is dependent on the workflow type, request act in a workflow of type request and offer act in a workflow of type offer.
8. Make an entry in the Available Acts Table using method bfnPutAct of the class obAvlActs.
9. Take the first act if the workflow is to be Initiated. The act to be taken is placed in the act to process queue using method obTxWFacts of class TXWDACTS. Log the message using AWSLogMessage.
10. The flag is reset to indicate that the processing is complete using method bfnResetInstantiate of class obTxWFINSTANCE.

Methods and Modules invoked by Agent Actions Manager Module

| Methods | Class | Action |
| --- | --- | --- |
| lfnGetBPTid | TxBPINSTANCE | get the BP Transaction Id |
| lfnGetWFTid | TxWFINSTANCE | get the WF Transaction Id |
| bfnSetBPStatus | TxBPINSTANCE | set the status of BP instance |
| lfnGetPerfId | | get the performer Id |
| lfnGetCustId | | get the customer Id |
| lfnGetCompletionTime | TxWFNSTANCE | get cycle time of the WF |
| TxWFActs | | queue the act to be taken |

STF Router/Enqueuer

The STF Router/Enqueuer module is called by the workflow updater to determine if the workflow currently being processed has a participant who must be notified in this workflow via an STF Processor. The router queues such transactions in the STF queue database for the appropriate STF processor to process.

The following is a description of the steps for implementing the STF router/enqueuer module.

1. The STF router/enqueuer first retrieves the BP and WF definition given the current WF transaction instance by using the methods TXBPINSTANCE and obTxWFINSTANCE of classes TXBPINSTANCE and TXWFINSTANCE.
2. Using the BP and WF Ids, the follow-up definition is retrieved from the definitions database using method DFWFollowUp of class DFWFFOLLUP. If no notification required, just return.
3. Get the notification status by using method NRDfIdentity of class NRDFIDENTITY. If there is no need to do notification, just return. This is achieved through the method bfnGetNotify of class NRDfIdentity in the VDB.
4. Get the STFProcId using method lfnGetSTFProcId of class NRDfIdentity.
5. Write the Notification event in the STF queue database using method bfnPutEvent of class TxSTFQUEUE. The date and time is computed.

Databases

Virtual Database

The present invention utilizes a Virtual Database for implementing the databases used by the system. The Virtual Database (VDB) is designed to be a collection of classes and methods. "Virtual" because it is DBMS independent. The VDB contains all the necessary storage structures to support the operations of the Workflow Server. More importantly, it defines a collection of methods for the manipulation of these structures and their instances. The basic domain as well as the classes for workflow definitions, transactions, schedules, names and routing, STF queue and server administration and configuration are described below. These classes define the attributes and methods for the data manipulation supporting the Workflow Server.

Basic Domain Classes

The basic domain classes used in the server are listed here in alphabetic order.

act

--- act = { request, offer, decline-request, agree, declare-complete, declare-satisfaction, cancel, revoke, accept-offer, decline-offer, counter-offer, accept-counter-offer, decline-counter-offer, counter-with-request, declare-dissatisfaction, question, answer, inform, open-speculation, continue-speculation, revise-offer, revise-request, follow-up, note, comment, initiate, activate, cancel-new-request, revoke-new-promise, revoke-new-offer, commit-to-commit, interim-report, delegate, accept-delegation, decline-delegation, cancel-delegation, declare-complete-delegation, declare-satisfaction-delegation, revoke-delegation, start-with-promise, accept-starting-promise, decline-starting-promise }

--- bpstatus bpstatus={inprogress, completed, aborted, suspended} configuration configuration={option1, option2, ... } datetime

Time is a built-in domain in the Virtual Database. Its counter part in the underlying DBMS will provide the actual implementation.

datetimeoffset

Datetimeoffset is a unit of time. Its value can range from seconds, days, weeks, and months, but is expressed in seconds.

incompletion

The various incompletions that need to be managed for the Customer and Performer in terms of Completions and Responses.

incompletion={CMC, CMR, CHC, CHR, PMC, PMR, PHC, PHR}

1st letter—C for Customer, P for Performer

2nd letter—M for My, H for His

3rd letter—C for Completion, R for Response notification

This domain class specifies the events which require notification.

notification={PerformerResponsePastDue, PerformerCompletionPastDue, PerformerCompletionComingDue, CustomerReponsePastDue, Act} objecttype objecttype={BP, WF, STFProcessor} privileges privileges={create, delete, modify, activate, schedule, assign privileges} state

--- state = { request/offer, inactive, initial(after activation) agreement, completion, satisfaction, counter, decline, cancel revoke }

--- string

String is defined to be a character string which varying length.

txstatus

Status of the a transaction.

txstatus={pending, inprogress, complete} txtype

List of various types of transactions processed by the server.

--- txtype = { initbp, initwf, actinwf, bindappdata, getbounddata, getbounddatafieldattributes, status, availableacts, querywf, availablebp, acthistory, notificationstring }

--- wfrole wfrole={customer, performer, observer } wftype wftype={request, offer, note}

Definitions Database

DFBP

This class contains the Business Process (BP) definitions which includes information such as the BP Name, the BP Version, The person (ID) who created the BP, The date when this information was last modified, The Server ID which is the Home Server of this BP and the natre of the file which contains the mapping of this BP.

| Attributes : | |
|---|---|
| IDEN | lBPDid |
| CHAR | szBPName [BPNAME_LEN] |
| INT | iVersion |
| IDEN | lBPAdmin |
| LONG | lLastModDate |
| IDEN | lHomeServerId |
| CHAR | szBPmap [BLOBNAME_LEN] |

| Methods : | |
|---|---|
| DFBP | The Constructor of this Class: Depending on its first parameter it returns the first record from the table which matches the predicate, or creates a new Business Process in the Table with the given parameters, or creates a new version of an existing Business Process with the given parameters |
| BOOL bfnDelete | Deletes the record whose parameters matches the DFBP class attributes |
| IDEN lfnGetBPDid | Returns the BPDid of the BP in context to the Class attributes |
| INT ifnGetversion | Returns the BP Version of the BP in context to the Class attributes |
| IDEN lfnGetLastModDate | Returns the Date when the BP Definition was last modified in context to the Class attributes |
| BOOL bfnPutBPMap | Creates/Appends to the Map file of the BP, the data in memory. |
| BOOL bfnGetBPMap | Retrieves the specified number of bytes from the Map file. |
| BOOL bfnNumListBP | Returns the Number of BPs for which there exists a Transaction in the Tx Database |
| BOOL bfnListBP | Returns the List of BPs for which there exists a Transaction in the Tx Database |
| BOOL bfnListDFBP | Returns the list of all BPs defined in the Definitions Database. |
| VOID vfnGetBPName | Returns the BP Name of the BP in context to the Class attributes |

DFWF

This class contains the Workflow definitions which include information such as the a Name, the WFDid, the BPDid to which this workflow belongs, the type of workflow (primary or non primary), the default IDs of the customer and performer for this WF, the Repeat IF adn factor in case of repetitive WFs, the form names and the Conditions of satisfaction

| Attributes : | |
|---|---|
| IDEN | lBPDid |
| IDEN | lWFDid |
| BOOL | bCentralWFFlag |
| CHAR | szWFName[WFNAME_LEN] |
| WFTYPE | WFType |
| IDEN | lCusOrgRole |
| IDEN | lPerOrgRole |
| INT | iRepeatFieldId |
| INT | iRepeatFieldFactor |
| CHAR | szCustFormName[FORMNAME_LEN] |
| CHAR | szPerFormName[FORMNAME_LEN] |
| CHAR | szObsFormName[FORMNAME_LEN] |
| CHAR | szInitFormName[FORMNAME_LEN] |
| CHAR | szCOS[COS_LEN] |

| Methods : | |
|---|---|
| DFWF | Constructor of this class which depending on its first parameter it returns the first record from the table which matches the predicate or creates a new Workflow Definition in the Table with the given parameters |
| BOOL bfnModify | Modifies the Workflow Definition of an existing workflow (in context of the Class attributes) in the Table with the given parameters |
| BOOL bfnModifyForms | Modifies the form names of an existing workflow (in context of the Class attributes) in the Table with the given form names |
| BOOL bfnPutCOS | Appends/ Creates the conditions of satisfactions of an existing workflow (in context of the Class attributes) in the Table with the given COS |
| BOOL bfnGetCOS | Retrieves the Conditions of Satisfaction of an existing workflow (in context of the Class attributes) |
| IDEN lfnGetWFDid | Returns the WFDId of an existing workflow (in context of the Class attributes) |
| WFTYPE fnGetWFType | Returns the WF type of an existing workflow (in context of the Class attributes) |
| IDEN lfnGetCustOrgRole | Returns the customer ID of an existing workflow (in context of the Class attributes) |
| IDEN lfnGetPerfOrgRole | Returns the performer ID of an existing workflow (in context of the Class attributes) |

DFWFOBS

This class contains the workflow observer definitions which includes information such as the WFDid, the BPDid to which this workflow belongs, the Observer ID for the WF.

| Attributes : | |
|---|---|
| IDEN | lBPDid |
| IDEN | lWFDid |
| IDEN | lObserver |

| Methods : | |
|---|---|
| DFWFOBS | The constructor for this Class, which depending on its first parameter it: creates a new Workflow Observer Definition in the Table with the given parameters, or returns the first record from the table which matches the predicate |
| BOOL bfnDelete | Deletes the record whose parameters matches the DFWFOBS class attributes |
| BOOL bfnGetWFObsList | Returns the List of Observers defined for the workflow (in context of the Class |

|                   | Attributes)                                                                                                       |
| ----------------- | ----------------------------------------------------------------------------------------------------------------- |
| INT nfnGetWFObsCount | Returns the Number of Observers defined for the workflow (in context of the Class Attributes)                  |

DFBPCONTAINER
This class contains the Business Process Container Information (the Container ID for a particular BP).

| Attributes : | |
| --- | --- |
| IDEN | lBPDid |
| IDEN | lContainerId |

| Methods : | |
| --- | --- |
| DFBPCONTAINER | Creates a new Container Definition for a BP with the given parameters (in context of the Class Attributes) It also inserts a record in another table (DFCONTAINER) with the Container ID and the number of fields |
| IDEN lfnGetContainerId | Returns the Container ID (in context of the Class Attributes) |

DFFIELD
This class contains the Container Field Information which includes the Container ID to which the field belongs, the Field ID, the data type of the field, its maximum length, its attributes, and its initial Value.

| Attributes : | |
| --- | --- |
| IDEN | lContainerId |
| IDEN | lFieldId |
| INT | iDataType |
| INT | iMaxLen |
| ATTRIBUTES | Attr |
| CHAR | szInitVal[INIT_VAL_LEN] |

| Methods : | |
| --- | --- |
| DFFIELD | Creates a new Container field record with the given parameters. It also inserts a record in another table (DFBDFIELDLIST) with the BPDid, the Field ID and the field name. |

DFLINK
This class contains the Workflow Link Information which includes the BPDid to which this LINK belongs, the ID of the workflow from which the LINK starts, whether the link starts from an act or from a state, the act/state IDs from which the Link starts and at which link ends, and the Destination State ID.

| Attributes : | |
| --- | --- |
| IDEN | lBPDid |
| IDEN | lFromWFid |
| BOOL | bFromActOrState |
| IDEN | lFromActOrStateId |
| IDEN | lToWFid |
| BOOL | bToActOrState |
| STATE | ToState |

| Methods : | |
| --- | --- |
| DFLINK | The Constructor for this Class that creates a new Link record with the given parameters. Using WFName WFID is first got from DFWF |
| BOOL bfnGetWFLinks | Returns all the links to a given WFID |

DFBPASSIGN
This class contains all the Identity to Organization role mappings at the Business process level.

| Attributes : | |
| --- | --- |
| IDEN | lBPDid |
| IDEN | lIdentityId |
| IDEN | lOrgRole |

| Methods : | |
| --- | --- |
| DFBPASSIGN | The constructor of this class that depending on its first parameters creates a new BP assignment in a given BPDid with the given parameters or returns the first record from the table which matches the predicate |
| IDEN lfnGetIdentity | Returns the Identity ID (in context of the Class attributes) |

DFWFASSIGN
This class contains all the Identity to Organization role mappings at the Workflow level.

| Attributes : | |
| --- | --- |
| IDEN | lBPDid |
| IDEN | lWFDid |
| IDEN | lIdentityId |
| IDEN | lOrgRole |
| WFROLE | WFRole |

| Methods : | |
| --- | --- |
| DFWFASSIGN | The constructor of this class that depending on its first parameter it creates a new workflow assigninent in a given WFDid and BPDid with the given parameters or returns the first record from the table which matches the predicate |
| IDEN lfnGetIdentity | Returns the Identity ID (in context of the Class attributes) |

DFBPNOTIFICATION

This class contains all notification string information at BP Level.

| Attributes : | |
|---|---|
| IDEN | lBPDid |
| NOTIFICATION | NEvent |
| CHAR | szNstring[NSTRING_LEN] |

| Methods : | |
|---|---|
| DFBPNOTIFICATION | This is the constructor for this class that creates a new BP notification for a given BPDid |
| BOOL bfnGetEventString | Returns the BP notification string of an event in a BP |

DFWFNOTIFICATION

This class contains all notification string information at workflow level

| Attributes : | |
|---|---|
| IDEN | lBPDid |
| IDEN | lWFDid |
| NOTIFICATION | NEvent |
| CHAR | szNstring[NSTRING_LEN] |

| Methods : | |
|---|---|
| DFWFNOTIFICATION | This is the constructor for this class that creates a new workflow notification for a given WFDid and BPDid |
| BOOL bfnGetEventString | Returns the workflow notification string of an event at workflow level. |

DFWCYCLETIMES

This class contains all the Cycle times defined for a workflow.

| Attributes : | |
|---|---|
| IDEN | lBPDid |
| IDEN | lWFDid |
| LONG | lTime1 |
| LONG | lTime2 |
| LONG | lTime3 |
| LONG | lTime4 |

| Methods : | |
|---|---|
| DFWFCYCLETIMES | This is the constructor for this class that creates a new record with the given cycle times for a given WFDid and BPDid |
| BOOL bfnGetCycleTimes | Returns the cycle times (in context of the Class Attributes) |
| DFWFCYCLETIMES | Returns the first record from the table which matches the predicate |
| IDEN lfnGetWFDid | Returns the WFDid (in context of the Class Attributes) |

DFWFDISABLEDACTS

This Class contains information of all the Disabled Acts.

| Attributes : | |
|---|---|
| IDEN | lBPDid |
| IDEN | lWFDid |
| WFROLE | WFRole |
| ACT | ActId |

| Methods : | |
|---|---|
| DFWFDISABLEDACTS | This is the constructor for this class that creates a new record with the given WFrole and ActId for a given WFDid and BPDid |
| BOOL bfnIsDisabled | Returns whether a particular Act for a particular WFRole in a given workflow is disabled or not. |

DFWFACTSTATE

This contains all the definitions of the workflow acts and States (their names and IDs) for all business processes and their workflows.

| Attributes : | |
|---|---|
| IDEN | lBPDid |
| IDEN | lWFDid |
| BOOL | bActOrState |
| INT | ActOrState |
| CHAR | szUserDefName[USERDEF_STRING_LEN] |
| CHAR | szGenScript[BLOBNAME_LEN] |
| CHAR | szUserScript[BLOBNAME_LEN] |

| Private Methods : | |
|---|---|
| BOOL bfnIsAvail | Returns whether an Act/state is Available for a given Workflow. |
| BOOL bfnGetScriptName | Returns the Script Name given the BP and WF DIds the Act/State and the type of script (User Defined or System Generated) required. |

| Methods : | |
|---|---|
| DFWFACTSTATE | This is the Constructor for this Class that creates a new record with the given Act/State , and user defined name for a given WFDid and BPDid |
| BOOL bfnPutScript | Inserts the given Script into a blob file |
| DFWFACTSTATE | Returns the first record from the table which matches the predicate |
| BOOL bfnGetWFScript | Returns the required data from the script file (In context of the Class Attributes) given the Script Type |

DFWFCONTAINER

This class contains the Workflow Container Information (the Container ID for a particular workflow in a given BP).

| Attributes : | |
|---|---|
| IDEN | lBPDid |
| IDEN | lWFDid |
| IDEN | lContainerId |

| Methods : | |
|---|---|
| DFWFCONTAINER | Creates a new Container Definition for a workflow with the given parameters (in context of the Class Attributes) |
| IDEN lfnGetContainerId | Returns the Container ID (in context of the Class Attributes) |

DFWFACTSTATEBDREF
This Class contains the workflow Act/State Bound Data reference information.

| Attributes : | |
|---|---|
| IDEN | lBPDid |
| IDEN | lWFDid |
| BOOL | bActOrState |
| INT | ActOrStateId |
| WFROLE | WFRole |
| IDEN | lContainerId |

| Methods : | |
|---|---|
| DFWFACTSTATEBDREF | The Constructor for this Class that inserts a record with the with the given parameters |
| IDEN lfnGetContainerId | Returns the Container ID (in context of the Class Attributes) |
| BOOL bfnGetFieldAttrList | Returns the list of Field Attributes for the given conditions (parameter values) |
| BOOL bfnGetNumFieldAttrList | Returns the number of Field Attributes for the given conditions (parameter values) |

DFWFFOLLOWUP
This class contains all the Follow-up information of a workflow.

| Attributes : | |
|---|---|
| IDEN | lBPDid |
| IDEN | lWFDid |
| BOOL | bPRFUFlag |
| BOOL | bPRFURecur |
| LONG | lPRFUOffset |
| INT | iPRFUCount |
| BOOL | bPCFUFlag |
| BOOL | bPCFURecur |
| LONG | lPCFUOffset |
| INT | iPCFUCount |
| BOOL | bCRFUFlag |
| BOOL | bCRFURecur |
| LONG | lCRFUOffset |
| INT | lCRFUCount |
| BOOL | bPCRemFlag |
| LONG | lPCRemOffset |
| BOOL | bActNotifyFlag |

-continued

| Methods : | |
|---|---|
| DFWFFOLLOWUP | The constructor of this class that depending on its first parameter inserts a record in the FollowUp Table with the Given parameters or returns the first record from the table which matches the predicate |
| BOOL bfnGetPerfRespInfo | Returns the Performer Response Information (in context of the Class Attributes) |
| BOOL bfnGetPerfCompInfo | Returns the performer Completion Information (in context of the Class Attributes) |
| BOOL bfnGetCustRespInfo | Returns the Customer Response Information (in context of the Class Attributes) |
| BOOL bfnGetPerfRemInfo | Returns the Performer Reminder Information (in context of the Class Attributes) |
| BOOL bfnGetActNotifyFlag | Returns the Notify flag (in context of the Class Attributes) |

DFBDFIELDLIST

| Attributes : | |
|---|---|
| IDEN | lBPDid |
| char | szFieldName[FIELDNAME_LEN] |
| IDEN | lFieldId |

Methods
  No Methods

Transactions Database

TXBPINSTANCE

This Class contains information of all instances of Business Process Transactions. This information consists of the Transaction ID of the Business Process (BPTid), the Business Process definition ID (BPDid), the BP Status and whether the BP Instance is active or not.

| Attributes : | |
|---|---|
| IDEN | lBPTid |
| IDEN | lBPDid |
| BOOL | bIsActive |
| BPSTATUS | BPStatus |

| Methods : | |
|---|---|
| TXBPINSTANCE | The Constructor for this Class that returns the first record from the table which matches the predicate |
| CreateInstance | Creates an instance of the given BP in the Transactions Database table (TXBPINSTANCE) bIsActive will still be FALSE |
| BOOL bfnActivate | Changes the Status (bIsActive) of the current BP (In context to the Class Attributes) from FALSE to TRUE |
| BOOL bfnSetBpStatus | Sets the BPStatus to the given status ID(In context to the Class Attributes) |

| | |
|---|---|
| IDEN lfnGetBpDid | Returns the BPDid of the Business Process Instance (In context to the Class Attributes) |
| IDEN lfnGetBpTid | Returns the BPTid of the Business Process Instance (In context to the Class Attributes) |
| BOOL bfnNumListBP | Returns the number of BPs that have been Instantiated |
| BOOL bfnListBP | Returns a list of all BPs that have been Instantiated to memory or to the file specified |
| BOOL bfnDelete | Deletes the BP transaction (specified by the class attributes) from the table. |
| BOOL bfnAbort | Sets the BPStatus to ABORT (In context to the Class Attributes) (Further Actions are yet to be defined) |
| BOOL bfnSuspend | Sets the BPStatus to SUSPEND (In context to the Class Attributes) (Further Actions are yet to be defined) |
| BOOL bfnNumListQueryQF | Returns the number of BP Instances (instantiated between the specified start date and the end dates)for the given Identity, having the specified Organization Role, (If bPending is TRUE then only those BPs are included where Acts are pending) |
| BOOL bfnListQueryWF | Returns a list of all BP Instances (instantiated between the specified start date and the end dates)for the given Identity, having the specified Organization Role, (If bPending is TRUE then only those BPs are included where Acts are pending) |

TXBPASSIGN

This class contains all the Identity to Organization role mappings at the BP level for BP Transaction. These mappings if present override the corresponding DFBPASSIGN mapping for a given BPDid for that particular instance of the BP (BPTid).

Attributes :

| | |
|---|---|
| IDEN | lBPTid |
| IDEN | lOrgRole |
| IDEN | lIdentityId |

Methods :

| | |
|---|---|
| TXBPASSIGN | The constructor of this class that depending on its first parameter creates a new BP assignment in a given BPTid with the given parameters or returns the first record from the table which matches the predicate |
| IDEN lfnGetIdentity | Returns the Identity ID (in context of the Class attributes) |

TXWFINSTANCE

This Class contains information of all instantiated Workflows. This information consists of the Transaction ITDs of the Workflow (WFTid) and the Business Process (BPTid) to which it belongs, whether it is a Primary workflow or not, the Workflow definition ID (WFDid), the reply, completion and initiate date, the present State, the Customer and Performer for this workflow Instance, the conditions of satisfaction for this workflow and whether this workflow instance has been instantiated or not Attributes:

| | |
|---|---|
| IDEN | lBPTid |
| IDEN | lWFTid |
| BOOL | bCentralWFFlag |
| IDEN | lWFDid |
| DATETIMET | lReplyDate |
| DATETIMET | lCompletionTime |
| DATETIMET | lInitiateTime |
| STATE | StateId |
| IDEN | lCustId |
| IDEN | lPerfId |
| BOOL | bCOSFlag |
| CHAR | szCondOfSatisfn[BLOBNAME_LEN] |
| BOOL | bInstantiate |

Methods:

| | |
|---|---|
| TXWFINSTANCE | The Constructor for this Class that returns the first record from the table which matches the predicate |
| BOOL bfnInstantiateCentralWF | Creates an Instance of the Primary workflow of a BP Instance, given the BPDid and BPTid with the given parameters. For the given BPDid, the workflow with CWF Flag TRUE is fetched from the DFWF table to create this CWF instance. A new WFTid for this workflow Instance is returned |
| BOOL bfnCreateInstance | Creates an Instance of the non Primary workflow of a BP Instance, given the BPDid and BPTid with the given parameters. A new WFTid for this workflow Instance is returned |
| BOOL bfnSetState | Sets the STATE of the given workflow Instance to the state specified. |
| BOOL bfnGetInstantiate | Returns the Status of the Instantiate flag for the given workflow Instance (In context of the Class Attributes). This indicates if the specified workflow instance has been instantiated or not. |
| BOOL bfnModify | Modifies the specified parameters in the WFInstance (In context of the Class Attributes) and returns the WFTid |
| IDEN lfnGetCustId | Returns the Customer ID for the given workflow Instance (In context of the Class Attributes) |
| IDEN lfnGetPerfId | Returns the Performer ID for the given workflow Instance (In context of the Class Attributes) |
| BOOL bfnGetStateName | Returns the User Defined State Name corresponding to the current state of the workflow Instance. (In context of the Class Attributes). |
| BOOL bfnGetFormName | Returns the form name (corresponding to the WFRole) of the workflow Instance. (In context of the Class Attributes) |

-continued

| | | |
|---|---|---|
| BOOL bfnIsCentralWF | Returns TRUE if the current WF is a primary WF | |
| IDEN lfnGetBPTid | Returns the BPTid for the given workflow Instance (In context of the Class Attributes) | |
| IDEN lfnGetWFTid | Returns the WFTid for the given workflow Instance (In context of the Class Attributes) | |
| BOOL bfnResetInstantiate | Sets the Instantiate Flag to FALSE | |
| IDEN lfnGetWFDid | Returns the WFDid for the given workflow Instance (In context of the Class Attributes) | |
| STATE ifnGetState | Returns the current State of the given workflow Instance (In context of the Class Attributes. | |
| BOOL bfnGetPending | Return whether or not an act is pending for this Workflow Instance | |
| BOOL bfnPutCOS | Creates/Appends to the Blob file of the workflow Instance, the COS data in memory | |
| BOOL bfnGetCOS | If the COSFlag is TRUE it retrieves the specified number of bytes from the Blob file of this workflow Instance containing the Conditions of Satisfaction else the COS is retrieved from the workflow Definitions table | |
| BOOL bfnPutCustId | Modifies the Customer ID for this WF Instance to the given ID(in context of the Class attributes) | |
| BOOL bfnPutPerfId | Modifies the Performer ID for this WF Instance to the given ID(in context of the Class attributes) | |
| LONG lfnGetReplyDate | Returns the Reply date for this workflow Instance(in context of the Class attributes) | |
| LONG lfnGetCompletionTime | Returns the Completion date for this workflow Instance(in context of the Class attributes) | |
| BOOL bfnPutReplyDate | Modifies the Reply date for this WF Instance to the given date(in context of the Class attributes) | |
| BOOL bfnPutCompletionTime | Modifies the Completion date for this WF Instance to the given date(in context of the Class attributes) | |
| BOOL bfnGetCOSFlag | Returns the COS Flag for this workflow Instance(in context of the Class attributes) | |
| BOOL bfnPutCOSFlag | Modifies the COS Flag for this WF Instance to the given value(in context of the Class attributes) | |

TXWFOBS

This class contains the Workflow Observer Transactions information which includes information such as the WFTid, the BP Instance (BPTid) to which this workflow belongs, and the Observer ID for the workflow instance.

| Attributes : private: | |
|---|---|
| IDEN | lBPTid |
| IDEN | lWFTid |
| IDEN | lObserver |

| Methods : | |
|---|---|
| TXWFOBS | The constructor of this class that depending on its first parameter it creates a new Workflow Observer Transaction in the Table with the given parameters or returns the first record from the table which matches the predicate |

TXWFASSIGN

This class contains all the Identity to Organization role mappings at the Workflow level for Workflow Instances.

| Attributes : private: | |
|---|---|
| IDEN | lBPTid |
| IDEN | lWFTid |
| IDEN | lOrgRole |
| IDEN | lIdentityId |
| WFROLE | WFRole |

| Methods : | |
|---|---|
| TXWFASSIGN | The constructor of this class that depending on its first parameter returns the first record from the table which matches the predicate or creates a new workflow assignment in a given WF Instance (WFTid) for a BP Instance (BPTid) with the given parameters |
| WFROLE fnGetWFRole | Returns the WFRole (in context of the Class attributes) |
| IDEN lfnGetIdentity | Returns the Identity ID (in context of the Class attributes) |

TXWFINCOMPLETION

This class contains the Incompletions information for all Instantiated workflow

| Attributes: | |
|---|---|
| IDEN | lBPTid |
| IDEN | lWFTid |
| INCOMPLETION | IncId |
| LONG | lCompletionTime |
| LONG | lFollowUpTime |
| LONG | lReminderTime |
| LONG | lCount |

| Methods: | |
|---|---|
| TXWFINCOMPLETION | The Constructor for this class that returns the first record from the table which matches the predicate or inserts a new workflow |

| | -continued |
|---|---|
| IDEN lfnGetBPTid | Incompletion for a given workflow Instance (WFTid) for a BP Instance (BPTid) with the given parameters<br>Returns the BPTid for the workflow Instance (in context of the Class attributes) |
| IDEN lfnGetWFTid | Returns the WFTid for the workflow Instance (in context of the Class attributes) |
| INCOMPLETION fnGetIncId | Returns the Incompletion ID for the WF Instance (in context of the Class attributes) |
| DATETIMET lfnGetCompletionTime | Returns the Completion Time for the WF Instance (in context of the Class attributes) |
| VOID vfnPutCompletionTime | Modifies the Completion time for this workflow Instance to the given time(in context of the Class attributes) |
| DATETIMET lfnGetFollowUpTime | Returns the FollowUp Time for the WF Instance (in context of the Class attributes) |
| VOID vfnPutFollowUpTime | Modifies the follow up time for this workflow Instance to the given time(in context of the Class attributes) |
| DATETIMET lfnGetReminderTime | Returns the Reminder Time for the workflow Instance (in context of the Class attributes) |
| VOID vfnPutReminderTime | Modifies the Reminder Time for this workflow Instance to the given time(in context of the Class attributes) |
| BOOL bfnGetFirstIncompletion | Returns TRUE if a record for the given reminder/followup prior to the given time is available and the Incompletion information is made available in the Class Attributes. |
| BOOL bfnGetNextIncompletion | Returns TRUE if the next record for the given reminder/followup prior to the given time is available and the Incompletion information is made available in the Class Attributes. |
| LONG lfnGetCount | Returns the Count (number of incompletions) for the workflow Instance (in context of the Class attributes) |
| VOID vfnIncCount | Increments the count. |

TXWFAVAILACTS

This class contains information of available acts for a Workflow Instance.

| Attributes : | |
|---|---|
| IDEN | lBPTid |
| IDEN | lWFTid |
| WFROLE | WFRole |
| ACT | Act |
| BOOL | bReplyFlag |
| BOOL | bCompletionFlag |

| Methods : | |
|---|---|
| TXWFAVAILACTS | The constructor for this Class that returns the first record from the table which matches the predicate or inserts a new Available Act for a given workflow Instance (WFTid) for a BP Instance (BPTid) with the given parameters |
| BOOL bfnNumAvailActs | Returns the number of Acts available for a given WFRole in a WFInstance. The Impure Flag indicates whether an Act is waiting to be processed by the Transaction Manager |
| BOOL bfnList | Returns the list of Acts available for a given WFRole in a WFInstance. The Impure Flag indicates whether an Act is waiting to be processed by the Transaction Manager |
| BOOL bfnDeleteAllActs | Deletes all the Acts for a given workflow instance from the Available Acts table |
| BOOL bfnGetReplyFlag | Returns the value of the Reply Flag for the WF Instance (in context of the Class attributes) |
| BOOL bfnGetCompletionFlag | Returns the Completion Flag for the workflow Instance (in context of the Class attributes) |

TXWFACTS

This class contains information of Acts that are to be taken (Queue) in all Workflow instances.(Acts taken by the client but not yet processed by the Server).

| Attributes: | |
|---|---|
| IDEN | lTxId |
| BOOL | bSTFFlag |
| IDEN | lBPTid |
| IDEN | lWFTid |
| ACT | Actid |
| WFROLE | WFRole |
| LONG | lReplyTime |
| LONG | lCompletionTime |
| IDEN | lWho |
| DATETIMET | lWhenRegistered |
| DATETIMET | lWhenTaken |
| BOOL | bProcessed |
| LONG | lReturnCode |

| Methods: | |
|---|---|
| TXWFACTS | The Constructor for this Class that or inserts a new WF Act into the table (ActId) for a given WF Instance (WFTid) in a BP Instance (BPTid) with the given parameters or inserts a new WF Act into the table (ActId) for a given WF Instance (WFTid) in a BP Instance (BPTid) with the given parameters. It also inserts a record in the table |

-continued

| | |
|---|---|
| IDEN lfnGetTxId | TXSTFADDINFO or returns the first record from the table which matches the predicate returns the Tx ID for the Act that has to be taken (in context of the Class attributes) |
| BOOL bfnGetReturns | Returns the parameters STFProcId, ReturnCode from the current Class attribute values. It also returns STFTxID and UserId (from TXSTFADDINFO) |
| VOID vfnPutRetValue | Modifies the Return Code. |
| BOOL bfnGetFirstInQueue | Returns the first Act (to be processed) from the Queue) |
| VOID vfnActComplete | Updates the bProcessed flag to TRUE |
| BOOL bfnCheckValidAct | Checks if the given Act is valid for the WFRole |
| IDEN lfnGetBPTid | Returns the BPTid to which this Act belongs (in context of the Class attributes) |
| IDEN lfnGetWFTid | Returns the WFTid to which this Act belongs (in context of the Class attributes) |
| ACT fnGetAct | Returns the Actid of this Act belongs (in context of the Class attributes) |
| WFROLE fnGetWFRole | Returns the WFRole taking this Act (in context of the Class attributes) |
| STATE fnGetWFState | Returns the State of this Act (in context of the Class attributes) |
| WFTYPE fnGetWFType | Returns the WFType (got from DFWF) of the workflow to which this Act belongs(in context of the Class attributes) |
| DATETIMET lfnGetIncompletionTime | Returns the completion/reply time for the given Incompletion |
| DATETIMET lfnGetCompletionTime | Returns the completion time (in context of the Class attributes) |
| DATETIMET lfnGetReplyTime | Returns the reply time (in context of the Class attributes) |
| BOOL bfnNumListActTaken | Returns the Number of acts present in the Queue for the given BPTid and WFTid |
| BOOL bfnListActTaken | Returns the list of acts present in the Queue for the given BPTid and WFTid to memory or a specified file |

TXSTFADDINFO

This class contains additional information for all transactions which come via the STF Processor

| Attributes: | |
|---|---|
| IDEN | lTxid |
| IDEN | lSTFProcId |
| IDEN | lSTFTxId |
| IDEN | lUserId |

TXSTFQUEUE

This class contains information of all outgoing Transactions via the STF Processor.

| Attributes: | |
|---|---|
| IDEN | lSTFProcessor |
| IDEN | lBPTid |
| IDEN | lWFTid |
| NOTIFICATION | NEvent |
| IDEN | lUserId |
| DATETIMET | lCompletionTime |
| DATETIMET | lNotificationTime |
| DATETIMET | lWhenRegistered |
| DATETIMET | lWhenRead |
| IDEN | lTxId |

| Methods: | |
|---|---|
| TXSTFQUEUE | The Constructor for this class |
| BOOL bfnGetEvent | returns the earliest Message Record (When Registered has the earliest date, and WhenRead is 0) from the STF Queue for the given STF Processor |
| BOOL bfnSetReadTime | Sets the WhenRead DateTime field to the given Value (In context to the Class Attributes) |
| BOOL bfnPutEvent | Inserts a record into the STFQueue with the given parameters (Sets WhenRead to 0 and WhenRegistered to the Current Time). |

TXBPBD

This class contains BP level Bound Data field IDs and values related to all BP Instances

| Attributes: | |
|---|---|
| IDEN | lBPTid |
| IDEN | lFieldId |
| CHAR | szValue [INIT_VAL_LEN] |

| Methods: | |
|---|---|
| TXBPBD | The constructor of this class that depending on its first parameter that inserts a Record in the TXBPBD table for the given BP Transaction with BPTid and FieldId (which is obtained from DFFIELDLIST using the Field Name) and the field value or returns all the Bound Data fields (associated with the given BP Instance, BPTid). to specified file/memory or returns the number of Bound Data fields associated with the given BP Instance (BPTid) |

TXWFBD

This class contains workflow level Bound Data field IDs and values related to all instantiated WFs in BP Instances

| Attributes: | |
|---|---|
| IDEN | lBPTid |
| IDEN | lWFTid |
| IDEN | lFieldId |
| CHAR | szValue[INIT_VAL_LEN] |

-continued

Methods:

| | |
|---|---|
| TXWFBD | The constructor of this class that depending on its first parameter inserts a record in the TXWFBD table for the given WF Instance (WFTid) in the specified BP Transaction with WFTid, BPTid, FieldId (which is obtained from DFFIELDLIST using the Field Name) and the field value or returns the number of Bound Data fields associated with the given WF Instance in the specified BP Transaction (BPTid) returns all the Bound Data fields (associated with the given WF Instance in the specified BP Transaction(BPTid)). to specified file/memory |

Global Method:

| | |
|---|---|
| BOOL bfnIsPure | This method returns TRUE if there are no acts pending in the TXWFACTS Queue for the given WF Instance in the specified BP Transaction. If there are acts in the Queue then it returns FALSE. |

Names and Routings Database

DFSTFPROC

This class contains information of all STF Processors including their IDs, names and network addresses.

Attributes:

| | |
|---|---|
| IDEN | lSTFProcId |
| CHAR | szSTFProcName[STFPROCNAME_LEN] |
| CHAR | szNetAddress[NETADDRESS_LEN] |

Methods:

| | |
|---|---|
| DFSTFPROC | The Constructor for this Class that returns the first record from the table which matches the predicate or inserts a Record in the DFSTFPROC table for the given STF Processor Name and Network Address it generates the STFProcId and returns it |
| BOOL bfnGetSTFProcName | Returns the STF Processor Name (in context of the Class attributes) |
| BOOL bfnGetNetAddress | Returns the Network Address of the STF Processor (in context of the Class attributes) |
| BOOL bfnDelete | Deletes the record from the DFSTFPROC table whose values are in context of the class attributes. |
| BOOL bfnListSTFProcs | Returns information of all STF Processors in a set of Structures. |

NRDFORGROLE

This Class contains the Organization Role ID to Organization Role Name mapping.

Attributes:

| | |
|---|---|
| IDEN | lOrgRole |
| CHAR | szOrgName[ORGROLE_LEN] |

Methods:

| | |
|---|---|
| NRDFORGROLE | The Constructor for this Class that returns the first record from the table which matches the predicate or inserts a Record in the NRDFORGROLE table containing the OrgRole ID and the corresponding Name |
| IDEN lfnGetOrgRole | Returns the OrgRole ID (in context of the Class attributes) |
| BOOL bfnDelete | Deletes the record from the NRDFORGROLE table whose values are in context of the class attributes. |

NRDFIDENTITY

This class contains information related to all the Identities including their Name, Network Address, Postal Address, Phone/Fax and other information.

Attributes:

| | |
|---|---|
| IDEN | lIdentityId |
| CHAR | szIdentityName[IDENTITY_LEN] |
| CHAR | szNetAddress[NETADDRESS_LEN] |
| CHAR | szPostalAddress[POSTALADDRESS_LEN] |
| CHAR | szPhone[PHONE_LEN] |
| CHAR | szFax[PHONE_LEN] |
| CHAR | szDepartment[DEPARTMENT_LEN] |
| CHAR | szTitle[TITLE_LEN] |
| CHAR | szLocation[LOCATION_LEN] |
| CHAR | szComment[COMMENT_LEN] |
| BOOL | bNotify |
| IDEN | lSTFProcId |

Methods:

| | |
|---|---|
| NRDFIDENTITY | The Constructor for this class that returns the first record from the table which matches the predicate or inserts a Record in the NRDFIDENTITY table containing the IdentityId, the corresponding Identity name, and other Identity information obtained from the given parameters |
| BOOL bfnDelete | Deletes the record from the NRDFIDENTITY table whose values are in context of the class attributes. |
| BOOL bfnGetNotify | Returns the Notify Status (in context of the Class attributes). Notify Status will be TRUE if the Identity wants a Notification of an event. |
| IDEN lfnGetSTFProcId | Returns the STF Processor ID (in context of the Class attributes). If the Identity is not an STF Processor then 0 is returned. |

-continued

| | |
|---|---|
| IDEN lfnGetIdentityId | Returns the Identity ID (in context of the Class attributes). |
| BOOL bfnGetIdenNameList | Returns information of all Identities in a set of Structures. |

NRDFGROUP

This class contains all the GroupId to Group Name mapping.

| Attributes: | |
|---|---|
| IDEN | lGroupId |
| CHAR | szGroupName[GROUPNAME_LEN] |

| Methods: | |
|---|---|
| NRDFGROUP | The Constructor for this class that returns the first record from the table which matches the predicate or inserts a Record in the NRDFGROUP table containing the GroupId, and the corresponding Group name |
| BOOL bfnDelete | Deletes the record from the NRDFGROUP table whose values are in context of the class attributes. |
| IDEN lfnGetGroupId | Returns the Group ID (in context of the Class attributes). |

NRDFGROUPASSIGN

This class contains all the GroupId to IdentityId mapping.

| Attributes: | |
|---|---|
| IDEN | lGroupId |
| IDEN | lIdentityId |

| Methods: | |
|---|---|
| NRDFGROUPASSIGN | The Constructor for this class that returns the first record from the table which matches the predicate or inserts a Record in the NRDFGROUPASSIGN table containing the GroupId, and the Identity Id |
| BOOL bfnDelete | Deletes the record from the NRDFGROUPASSIGN table whose values are in context of the class attributes. |
| BOOL bfnNumListGroup | Returns the number of Groups which contain the given IdentityId as a member |
| BOOL bfnListGroup | Returns information of all Groups which contain the given IdentityId as a member, to file or memory as specified |
| BOOL bfnNumListIden | Returns the number of Identities in the specified GroupID |
| BOOL bfnListIden | Returns information of all Identities which belong to the specified group, to file or memory as specified |

NRDFGROUPROLEASSIGN

| Attributes: | |
|---|---|
| IDEN | lGroupId |
| IDEN | lOrgRole |

| Methods: | |
|---|---|
| NRDFGROUPROLEASSIGN | The Constructor for this class that returns the first record from the table which matches the predicate or inserts a record in the NRDFGROUP-ROLEASSIGN table containing the GroupId, and the Organization Role |
| BOOL bfnDelete | Deletes the record from the NRDFGROUP-ROLEASSIGN table whose values are in context of the class attributes. |
| BOOL bfnNumListRole | Returns the number of Groups which contain the given Organization Role as a member |
| BOOL bfnListRole | Returns information of all Groups which contain the given Organization Role as a member, to file or memory as specified |
| BOOL bfnNumListGroup | Returns the number of Organization Roles in the specified GroupID |
| BOOL bfnListGroup | Returns information of all Organization Roles which belong to the specified group, to file or memory as specified |

NRDFIDENROLEASSIGN

This class contains all the IdentityId Organization Role mapping.

| Attributes: | |
|---|---|
| IDEN | lIdentityId |
| IDEN | lOrgRole |

| Methods: | |
|---|---|
| NRDFIDENROLEASSIGN | The Constructor for this class that returns the first record from the table which matches the predicate or inserts a Record in the NRDFIDEN-ROLEASSIGN table containing the IdentityId, and the Organization Role |
| BOOL bfnDelete | Deletes the record from the NRDFIDEN-ROLEASSIGN table whose values are in context of the class attributes. |
| BOOL bfnNumListRole | Returns the number of Org. Roles which contain the given IdentityId as the Identity Id |
| BOOL bfnListRole | Returns information of all Org. Roles which contain the given IdentityId as the Identity ID, to file or memory as specified |
| BOOL bfnNumListIdentity | Returns the number of Identities with the specified Org. Role |

| | |
|---|---|
| BOOL bfnListIdentity | Returns information of all Identities with the specified Org. Role, to file or memory as specified |

Schedule Database

This class contains all the Business Process schedule information including time when it has to be next initiated and the Recurring period of that BP

SCBPSCHEDULE

Attributes:

| | |
|---|---|
| IDEN | lBPDid |
| DATETIMET | lInitTime |
| DATETIMET | lRecPeriod |

Methods:

| | |
|---|---|
| SCBPSCHEDULE | The Constructor for this class that inserts a Record in the SCBPSCHEDULE table for the given STF Processor Name and Network Address It generates the STFProcId and returns it or returns the first record from the table which matches the predicate |
| BOOL bfnDelete | Deletes the record from the SCBPSCHEDULE table whose values are in context of the class attributes. |
| DATETIMET lfnGetInitTime | Returns the Initiation Time of the BP (in context of the Class attributes) |
| DATETIMET lfnGetRecTime | Returns the Recurring period of the BP (in context of the Class attributes) |
| IDEN lfnGetBPDid | Returns the BP ID (in context of the Class attributes) |
| VOID vfnPutInitTime | Updates the Initiation Time for the BP with the specified time (in context of the Class attributes) |
| BOOL bfnGetFirstBPSchedule | Returns the first BP scheduled to be Initiated (Where the InitTime is less than the specified time) (the Class attributes are updated) |
| BOOL bfnGetNextBPSchedule | Returns the next BP scheduled to be Initiated (Where the InitTime is less than the specified time) (the Class attributes are updated) |

AWSAUTH

This class contains information related to each Identities database access privileges.

Attributes:

| | |
|---|---|
| IDEN | lIdentityId |
| OBJECT_TYPE | ObjectId |
| PRIVILEGES | Privilege |

Methods:

| | |
|---|---|
| BOOL Grant | Updates the privileges of the specified Identity to the given set of Privileges |
| BOOL Revoke | Revokes the specified privileges from the specified Identity |
| BOOL InquireAuth | Returns the Privileges of the specified Identity |

CONFIGINFO

This Class contains the configuration information of a particular installation including the path and file name of the Logfile, the interval of the Server polling, the path of the Blob file and the maximum number of BP instances.

Attributes:

| | |
|---|---|
| CHAR | szLogFilePath[LOGFILEPATH_LEN] |
| CHAR | szLogFileName[LOGFILENAME_LEN] |
| INT | iPollInterval |
| CHAR | szBlobFilePath[BLOBFILEPATH_LEN] |
| INT | iMaxBPInst |
| LOGOPTIONS | LogOpts |

Methods:

| | |
|---|---|
| BOOL bfnSetConfigInfo | Sets the configuration of an installation to the specified values |
| BOOL bfnGetConfigInfo | Returns the Configuration of the Installation. |

ERRMSG

Contains the Error code to error Number mapping.

Attributes:

| | |
|---|---|
| INT | lErrNo |
| LONG | lErrCode |

Methods:

| | |
|---|---|
| ERRMSG | The Constructor for this Class |
| BOOL bfnPutErrNo | Inserts a record with an ErrNo and the corresponding ErrCode, |
| INT ifnGetErrNo | Gets the ErrNo corresponding to the specified ErrCode. |

MESSAGEQ

This Class contains the Message Queue which is used by the components of the Server for internal communication.

Attributes:

| | |
|---|---|
| PROCESS | Sender |
| PROCESS | Recipient |
| MESSAGE | Message |
| LONG | lParam1 |
| LONG | lParam2 |
| LONG | lParam3 |
| LONG | lParam4 |
| CHAR | szParam[PARAM_LEN] |

| | |
|---|---|
| DATETIMET Methods | lWhenPosted |
| MESSAGEQ | The Constructor for this class |
| BOOL bfnPostMessage | Puts the given message into the Message Queue with the specified Sender and Recipient fields |
| BOOL bfnGetMessage | Gets the first message marked to the specified recipient from the Message Queue. |
| BOOL bfnFlushMessage | Deletes all messages from the Message Queue. |

Administration and Configuration Database

Server Management

```
ServerMgmt
    Attributes
        lServerId         identifier
        szServerName      string[sz_servername]
    Methods
        Start Server
        StopServer        /* The method
                          StopServer should find
                          all BPs that have the
                          server as Home & issue
                          warning to the current
                          users */
        Login
        Logout
        ListLoginActvities
```
User Maintenance
```
UserMaint
    Attributes
        UserId            ref(Identity) or ref(Group)
        LoginName         string
        Password          string
    Methods
        AddNewUser
        RemoveUser
        ModifyUserInfo
```
Authorization Maintenance
```
Object
Attributes
        ObjectId          ref(BP) or ref(WF) or
                          ref (STFProcessor)
        ObjectType        objecttype
AuthMaint
    Attributes
        User              ref(User)
        ObjectId          ref(Object)
        Privilege         privilege
        GrantOption       bool
    Methods
        Grant
        Revoke
        InquireAuthorization
```
Business Process Maintenance
```
BPMaint
    Methods
        AbortBP
        DeleteBP
        SuspendBP
        ResumeBP
        ArchiveBP
        ListAvailBPs
        ListActiveBPs
        DeleteBPDefinition
```

Administration and Configuration Database

Workflow Maintenance

```
WFMaint
    Methods
        ListAllWF
```
STF Processor Maintenance
```
STFMaint
    Methods
        RegisterSTFProc
        DeregisterSTFProc
```
Backup and Restore
```
Backup
    Attributes
        BPId          string    /* Business Process
                                name is NULL, implies
                                backup/restore entire
                                DB */
        BackupDate    time
        BackupTime    time
        BackupMedia   enum
    Methods
        Backup
        Restore
```
Database Management
```
DBMgmt
    Methods
        CheckDatabase
        IndexDatabase
        ReorganizeDatabase
```
Configuration
```
Config
    Attributes
        MaxUserCount  int
        MaxOpenBPs    int
        Version       string
    Methods
        SetConfiguration
        GetConfiguration
```

STF Queue Database

STF Additional Information Class

The server as a service stores additional fields required by STF processors. The STF Processor Id, the STF Transaction Id and the UserId are stored.

TxSTFAddlInfo

The STF Queue database is implemented through two classes TXSTFADDINFO and TXSTFQUEUE which are desribed with other classes of the transaction database.

B. WORKFLOW APIs

Workflow Transactions API

This section describes the functions performed by the transactions API. A description of each function is set forth followed by the syntax of a call to the function, with specification of each parameter passed to the function. From this information, a suitable code segment can be written to implement the function.

AWSTINITBP

Description

This function creates a new instance of a previously defined Business Process (BP). The BP Name is passed and a BP Id is returned. This Id will be required for all subsequent calls to this API. This call also activates the Primary workflow. To create this instance of the Business Process the Name specified for the IdentityName must be authorized. Optionally the mapping of Organization Role Names to Identity Names may be provided. This overrides the default mapping (if any).

Syntax
VOID FAR PASCAL AWSTINITBP(STRING szBPName,
  STRING szInitiatorName, STRING szCustomerName,
  STRING szPerformerName, DATETIMESTRING
  szCompletionDate, DATETIMESTRING
  szResponseDate, DATETIMESTRING szInitiateDate,
  INT iCount, LPORG2ID lpOIPtr, LPIDEN lpBPTid,
  STRING szCWFName, LPERRCODE lpError)

Parameters

| Name | Type | Description |
| --- | --- | --- |
| szBPName | STRING | Business Process Name. This BP must have previously been defined and the name known to the server. |
| szInitiatorName | STRING | Name of the person or identity initiating the business process. The identity must be authorized to activate the business process. |
| szCustomerName | STRING | Customer Identity Name. |
| szPerformerName | STRING | Performer Identity Name. |
| szCompletionDate | DATETIMESTRING | The date by which the Primary workflow must be completed. |
| szResponseDate | DATETIMESTRING | The date by which negotiation must be complete. |
| szInitiateDate | DATETIMESTRING | The Date when this workflow is to be initiated by the server. If this date is not specified then the Business Process is initiated immediately. |
| iCount | INT | The number of Organization Role to Identity mapping entities. |
| lpOIPtr | LPORG2ID | Pointer to an array of structures which contains the mapping of Organization Role to Identities. In the structure ORG2ID, the application must set the GLOBAL or LOCAL flag to identify whether the ORG2ID overriding is at BP level or at WF level. |
| lpBPTid | LPIDEN | returns BPTid. |
| szCWFName | STRING | returns the name of Primary Workflow. |
| lpError | LPERRCODE | Error Code. |

The function returns the Business Process Instance Id, BPTid and Primary WF name, szCWFName.

AWSTINITWF

Description

The business process this workflow belongs to must have been instantiated. The application must supply the Business Processes' Business Process Transaction Id. The Identity Names of the Customer and Performer are optional if defaults have been specified. The dates for completion and reply are optional. If these dates are NULL values, the defaults specified by the workflow's definition (if any) will be used. The Initiate date is optionally specified only for the Primary workflow to initiate it at a later date. Optionally the mapping of Organization Roles to Identity Names may be passed. These override the default mapping if any.

Syntax
VOID FAR PASCAL AWSTINITWF(BPTID lBPTid,
  STRING szWFName, STRING szInitiatorName,
  STRING szCustomerName, STRING szPerformerName,
  DATETIMESTRING szCompletionDate,
  DATETIMESTRING szResponseDate,
  DATETIMESTRING szInitiateDate, INT iCount,
  LPORG2ID lpOIPtr, LPERRCODE lpError)

Parameters

| Name | Type | Description |
| --- | --- | --- |
| lBPTid | BPTID | Business Process Transaction Id. The Id of a previously instantiated BP. |
| szWFName | STRING | The name of the workflow to be initiated. The primary workflow can be initiated prior to an initiation date specified in the AWSINITBP function, or a previously specified initiation date changed using this function by specifying the name of the primary workflow. If the specified workflow is not the primary workflow, then the Business Process this workflow belongs to must have already been initiated. |
| szInitiatorName | STRING | The Identity Name of the person initiating the workflow. The workflow will be initiated only if the identity has the authorization. |
| szCustomerName | STRING | The Identity Name of the person who is the Customer for this workflow. |
| szPerformerName | STRING | The Identity Name of the person, who is the Performer for this workflow. |
| szCompletionDate | DATETIMESTRING | The date by which this workflow must be completed. |
| szResponseDate | DATETIMESTRING | The date by which negotiation must be complete. |
| szInitiateDate | DATETIMESTRING | The Date when this workflow is to be initiated by the server. If this date is not specified then the workflow is initiated immediately. This date can be specified only for the Primary workflow. |
| iCount | INT | The number of Organization Role to Identity mapping entities. |
| lpOIPtr | LPORG2ID | Pointer to an array of structures which contains a mapping of Organization Role to Identity Names. |
| lpError | LPERRCODE | Error Code. |

Return Value
  None

AWSTACTINWF

Description

This function instructs the workflow server to perform the act specified in the specified workflow of a specific business process. The Business Process Transaction ID and Workflow Name must be specified. The identity performing the act must be specified. The server records the act to be taken and updates the workflow. The server may take an unspecified time to take the act because of the queuing of the acts to be taken. If the client application issues a query when the act is pending, the application will receive status values which are not updated and this will be indicated by CLEAR or PENDING flag of the query APIS.
Syntax
VOID FAR PASCAL AWSTACTINWF (STRING szSTFProcName, STRING szSTFTxName, STRING szSTFUserName, BPTID lBPTid, STRING szWFName, ACT Act, DATETIMESTRING szCompletionDate, DATETIMESTRING szReplyDate, STRING szParticipantName, LPIDEN lpTxId, LPERRCODE lpError)

| Parameters | | |
|---|---|---|
| Name | Type | Description |
| szSTFProcName | STRING | Only the transaction calls made via STF Processor will pass this. Workflow applications which directly use this call should set this field to NULL. |
| szSTFTxName | STRING | Only the transaction calls made via STF Processor will pass this. Workflow applications which directly use this call should set this field to NULL. |
| szSTFUserName | STRING | Only the transaction calls made via STF Processor will pass this. Workflow applications which directly use this call should set this field to NULL. |
| lBPTid | BPTID | Business Process Transaction Id. The Id of a previously instantiated BP. |
| szWFName | STRING | The Transaction Id of the workflow in which to take the act. |
| Act | ACT | The act to take, e.g., Request, Agree, etc. |
| szCompletionDate | DATETIMESTRING | Completion date can be optionally specified whenever permitted or recommended has to be specified for all Customer/Performer Counter Acts. |
| lReplyDate | DATETIMESTRING | Reply date has to be specified for the following acts: Customer/Performer Counters, Declare Completion and Declare dissatisfaction. |
| szInitiatorName | STRING | Identity of the person requesting the act. |
| lpTxid | LPIDEN | Unique Transaction Id returned by the API. This Id is used to inquire about the status of taking the Act. |
| lpError | LPERRCODE | Error code returned by the server. |

Return Value
The unique transaction Id generated by the server is returned. The application calling the transaction API, AWSTACTINWF can use this Id to inquire about the status of the Act. The API call to be used is AWSTACTSTATUSQUERY.
AWSTACTSTATUSQUERY
Description
This function gets the status of the Act requested by the AWEA via the transaction API call AWSTACTINWF. The Status indicates whether the act was taken successfully or an error occurred. In case of an error, a diagnostic error code will be returned.

Syntax
VOID FAR PASCAL AWSTACTSTATUSQUERY (IDEN lTxId, STRING szSTFProcName, STRING szSTFTxName, STRING szSTFUserName, LPERRCODE lpError)

| Parameters | | |
|---|---|---|
| Name | Type | Description |
| lTxid | IDEN | Unique Transaction Id returned by the API - AWSTACTINWF. This Id is to be used to identify the Act being inquired about. |
| szSTFProcName | STRING | Only the transaction calls made via STF Processor will get back the corresponding Id. Workflow applications which directly use the Transaction API can ignore this parameter. |
| szSTFTxName | STRING | Only the transaction calls made via STF Processor will get back the corresponding Id. Workflow applications which directly use the Transaction API can ignore this parameter. |
| szSTFUserName | STRING | Only the transaction calls made via STF Processor will get back the corresponding Id. Workflow applications which directly use the Transaction API can ignore this parameter. |
| lpError | LPERRCODE | Error code returned by the server. This indicates whether the Act was taken successfully or an error occurred. |

Return Value
In case the call is made by a workflow application via an STF Processor, then the szSTFProcName, szSTFTxName and the szUserName are returned along with Error (which indicates the status of the Act). If the call is made by an application directly, then the Application needs to check only the error code.
AWSTBINDAPPDATA
Description
Binds data to a business process or workflow instance. Application data can be attached or bound to a business process or workflow. Later this information can be retrieved. The data field name and data value are supplied. Data type is specified at definition time. Any number of data items may be bound. When data is bound to the business process, the workflow name is specified by NULL.
Syntax
VOID FAR PASCAL AWSTBINDAPPDATA (BPTID lBPTid, STRING szWFName, STRING szParticipantName, INT iFields, LPTXBDFIELDSTRUCT lpTxBDFieldStructPtr, LPERRCODE lpError)

| Parameters | | |
|---|---|---|
| Name | Type | Description |
| lBPTid | BPTID | Business Process Transaction Id. The |

-continued

| Parameters | | |
|---|---|---|
| Name | Type | Description |
| szWFName | STRING | Id of a previously instantiated BP. The name of the workflow in which to bind the data. The workflow name is specified as NULL if data is to be bound to the business process. |
| szParticipantName | STRING | Identity of the person requesting binding of application data. |
| iFields | INT | The number of fields to bind with the workflow |
| lpTxBDFieldStructPtr | LPTXBDFIELDSTRUCT | A pointer to a array of structures containing the field name, type, size and the field value. The structure BDFIELDSTRUCT contains an element of type ATTRIBUTES. This parameter will be ignored by the API. |
| lpError | LPERRCODE | Error code returned by the server. |

Return Value

Data is bound to the workflow.

AWSTGETAPPDATA

Description

A set of data fields and values are returned corresponding to the data fields bound to a workflow instance. The number of fields and for each field the field name, type and its value are returned.

Syntax

VOID FAR PASCAL AWSTGETAPPDATA (BPTID lBPTid, STRING szWFName, STRING szFormName, WFROLE WFRole, STRING szParticipantName, LPINT lpiFieldsPtr, BOOL bFileOrMemory, LPADFIELDSTRUCT lpADFieldStructPtr, STRING szFileName, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The name of the workflow from which to retrieve bound data. The workflow name should be set to "GLOBALBPDATA" to retrieve business process bound data. |
| szFormName | STRING | The form name is returned. This was stored along with the bound data. |

-continued

| Parameters | | |
|---|---|---|
| Name | Type | Description |
| WFRole | WFROLE | The WFRole of the participant. This need only be specified if the participant has more than one role in the workflow. |
| szParticipantName | STRING | The name of the person or identity requesting Application Data associated with the workflow. |
| lpiFieldsPtr | LPINT | The number of bound data field to be retrieved. |
| bFileOrMemory | BOOL | Flag to indicate File or Memory mode of receipt of data from the API. |
| lpBDFieldStructPtr | LPBDFIELDSTRUCT | A pointer to an array of structures, where the field name, type and the field values are returned. The structure ADFIELDSTRUCT contains an element of type ATTRIBUTES. This parameter is to be ignored by the Application. The API returns the list of attributes if bFileOrMemory is ITS_MEMORY. Application Data fields defined as HIDDEN for the particular WFRole, requesting Participant, and current workflow state are returned as NULL strings. |
| szFileName | STRING | File name where the API should deposit the results of the call if the flag bFileOrMemory is ITS_FILE. |
| lpError | LPERRCODE | Error code returned by the server. |

Return Value lpiFields contains the number of fields retrieved. BDFieldStruct contains the field name, field type and field value for all the fields retrieved.

AWSTGETAPPDATAFIELDATTRIBUTES

Description

This functions returns the list of application data field names and their attributes for a specified act or state for a specific workflow of a Business Process. The attributes returned are Read-Only, Editable and Hidden. These attributes are Boolean.

Syntax

VOID FAR PASCAL AWSTGETAPPDATAFIELDATTRIBUTES(BPTID lBPTid, STRING szWFName, BOOL bActORState, ACTSTATE ActOrState, STRING szFormName, STRING szParticipantName, WFROLE WFRole, LPINT lpiFields, LPFLDNAMEATTR lpFldNameAttr, BOOL bFileOrMemory, STRING szFileName, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The Transaction Id of the workflow from which to retrieve field attributes of the bound data. |
| bActOrState | BOOL | Boolean flag to indicate the type of the ACTSTATE parameter. |
| ActOrState | ACTSTATE | The field attributes specified for this act or state are returned. |
| szFormName | STRING | The form name is returned. This was stored along with the bound data. |
| szParticipantName | STRING | The name of the person or identity requesting Field Attributes of the Application Data associated with the workflow. |
| WFRole | WFROLE | The workflow role of the identity. |
| lpiFieldsPtr | LPINT | The number of bound data fields for which the attributes are returned. |
| lpWFMomentBDField | LPWFMOMENTBDFIE-LDSTRUCT | A pointer to a array of structures containing the field name and field attributes. |
| bFileOrMemory | BOOL | Flag to indicate File or Memory mode of receipt of data from the API. |
| szFileName | STRING | File name where the API should deposit the results of the call if the flag bFileOrMemory is ITS_FILE. |
| lpError | LPERRCODE | Error code returned by the server. |

Return Value lpiFieldPtr is updated with the number of fields for which the field attribute is returned.

FieldStruct contains the field attributes for the specified act.

AWSTSTATUS

Description

This function returns status of the workflow instance for a specific participant. The state of the workflow, the current incompletions with the dates, etc. Information is returned in the STATUS structure.

Syntax

VOID FAR PASCAL AWSTSTATUS(BPTID lBPTid, STRING szWFName, STRING szParticipantName, WFROLE WFRole, LPINT lpcurrent, LPSTATUS lpStatusPtr, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The workflow name whose status is desired |
| szParticipantName | STRING | The status of the workflow is returned with respect to this Identity. |
| WFRole | WFROLE | The WFRole of the participant. This field is only required if the participant is both customer and performer. |
| lpCurrent | LPINT | The current status - CLEAR i.e.:, no Acts in the queue waiting to be serviced or PENDING i.e.., some acts are in the queue yet to be serviced. |
| lpStatusPtr | LPSTATUS | The STATUS structure contains the Status String and various Completion and Reply dates. These dates depend on the role of the Identity. |
| lpError | LPERRCODE | Error code returned by the server. |

Return Value

Structure Status contains the status of the specified workflow.

Element Status.StatusString contains the string describing the current state of the workflow.

The following Completion and Reply dates are returned:

| Customer | Performer |
|---|---|
| Completion requested | Completion due |
| Reply due to Performer | Reply due to Customer |
| Completion due by Performer | Completion requested by Customer |
| Reply due by Performer | Reply due by Customer |

Not all dates are returned, depending on the present state of the workflow the relevant dates are returned.

AWSTAVAILABLEACTS

Description

Returns a structure that contains the list of available acts in the specified workflow for the role that the participant has in the workflow.

Syntax

VOID FAR PASCAL AWSTAVAILABLEACTS(BPTID lBPTid, STRING szWFName, WFROLE WFRole, STRING szParticipantName, BOOL cDialog, BOOL bFileOrMemory, LPINT lpiCountPtr, STRING szFileName, LPACTINFO ActPtr, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The name of the workflow whose status is desired |
| WFRole | WFROLE | The workflow role of the identity. This field is only required if the |

-continued

| Parameters | | |
|---|---|---|
| Name | Type | Description |
| szParticipantName | STRING | participant is both customer and performer in the workflow. The name of the person or identity for which the list of available acts is returned. |
| cDialog | BOOL | If cDialog is TRUE, then a dialog box is presented to the user to select a specific act. In this case, the list of available actions returned by this function will be the selected one. If cDialog is FALSE, then no dialog box is presented and all available acts are returned. |
| bFileOrMemory | BOOL | Flag to indicate File or Memory mode of receipt of data from the API. |
| lpiCountPtr | LPINT | Number of acts returned in the structure |
| szFileName | STRING | File name where the API should deposit the results of the call if the flag bFileOrMemory is ITS_FILE. |
| lpActPtr | LPACTINFO | A pointer to an array of structures which contains the list of acts, i.e., Act Names, user-defined names for the acts. |
| lpError | LPERRCODE | Error code returned by the server. |

Return Value lpiCountPtr is updated with the number of possible acts the Identity can take in the current workflow. The structure array passed is filled with the Acts Names and user-defined names.

AWSTQUERYWF

Description

This function returns the list of workflows that the named person or identity has as a specific Organization Role. The list of workflows is selected from the set of instantiated business processes that have the same business process name. The workflow status for each workflow is returned.

Syntax

VOID FAR PASCAL AWSTQUERYWF(STRING szParticipantName, STRING szOrgRole, WFROLE WFRole, STRING szBPName, DATETIMESTRING szStartDate, DATETIMESTRING szEndDate, BOOL bpending, BOOL cDialog, BOOL bFileOrMemory, LPINT lpiCount, STRING szFileName, LPWFSNAPSHOT lpWFSnapShot, LPERRCODE lpError)

| Parameters | | |
|---|---|---|
| Name | Type | Description |
| szParticipantName | STRING | The participant for which the list of workflows is returned. |
| szOrgRole | STRING | The organization role of the participant. Only workflows that have this specific OrgRole are selected. If OrgRole is specified as NULL then all workflows are selected regardless of the role. |

-continued

| Parameters | | |
|---|---|---|
| Name | Type | Description |
| WFRole | WFROLE | The workflow role of the identity. This field is only required if the participant is both customer and performer or is an observer in the workflow. |
| szBPName | STRING | The workflows are selected only for the specified BPName. If BPName is NULL, then relevant workflows are selected regardless of the business process. |
| szStartDate, szEndDate | DATETIMESTRING | These dates specify a date range of due dates for which the list is constructed. If StartDate is NULL then the list includes all relevant workflows. |
| bPending | BOOL | If Pending is TRUE then the list workflows includes only those workflows where action is pending. The workflows which needs to be initiated are also included. Otherwise it includes workflows where action is not pending. |
| cDialog | BOOL | If cDialog is TRUE, then a dialog box is presented to the user to select a specific workflow. In this case, the list of workflows returned by this function will be the selected one. If cDialog is FALSE, then no dialog box is presented and all available workflows are returned. |
| bFileOrMemory | BOOL | Flag to indicate File or Memory mode of receipt of data from the API. |
| szFileName | STRING | File name where the API should deposit the results of the call if the flag bFileOrMemory is ITS_FILE. |
| lpiCount | LPINT | Returns the count of workflows selected. |
| lpWFSnapShot | LPWFSNAPSHOT | Pointer to a list of selected workflows. Each workflow includes Business Process name & Id, Workflow name, Customer, Performer, Completion and Reply Dates, Status and Form name |
| lpError | LPERRCODE | Error code returned by the server. |

Return Value lpiCount, the number of workflows in the list.

lpWFList points to a list of WFLIST structures.

The structure returns several dates depending on role of the Identity.

| Customer | Performer |
|---|---|
| Completion requested | Completion due |
| Reply due to Performer | Reply due to Customer |
| Completion due by Performer | Completion requested by Customer |
| Reply due by Performer | Reply due by Customer |

Not all dates are returned, depending on the present state of the workflow the relevant dates are returned

AWSTAVAILABLEBP

Description

This function returns a list of BP Names.

Syntax

VOID FAR PASCAL AWSTAVAILABLEBP(STRING szParticipantName, BOOL cDialog, INT iBPStatus, LPINT lpiCount, BOOL bFileOrMemory, LPBPINFO lpBPInfo, STRING szFileName, LPERRCODE lpError)

| Parameters | | |
|---|---|---|
| Name | Type | Description |
| szParticipantName | STRING | The participant for which the list of BPs is returned. |
| cDialog | BOOL | If cDialog is TRUE, then a dialog box is presented to the user to select a specific BP. In this case, the list of BPs returned by this function will be the selected one. If cDialog is FALSE, then no dialog box is presented and all available BPs are returned. |
| iBPStatus | INT | Indicate the iBPStatus required. ACTIVE_BPS select only active BPs. The flag INACTIVE selects all BPs in the definition database. |
| lpiCount | LPINT | The number of BPs returned. |
| bFileOrMemory | BOOL | Flag to indicate file or memory mode of receipt of data from the API. |
| lpBPInfo | LPBPINFO | A pointer to an array of BPINFO structures that contain the business process name and Id. |
| szFileName | STRING | File name where the API should deposit the results of the call if the flag bFileOrMemory is ITS_FILE. |
| lpError | LPERRCODE | Error code returned by the server. |

Return Value lpiCount, the number of workflows in the list.

BPListPtr points to a linked list of BPINFO structures that contain the Business Process Name & Id.

AWSTACTHISTORY

Description

This call returns a list of Acts taken in the specified business process for a specific workflow. If workflow name is NULL, then the history of the entire business process, i.e., list of all acts taken of all workflows is returned.

Syntax

VOID FAR PASCAL AWSTACTHISTORY(STRING szParticipantName, BPTID lBPTid, STRING szWFName, LPINT lpiCount, BOOL bFileOrMemory, STRING szFileName, LPACTSTAKENLIST lpActsList, LPERRCODE lpError)

| Parameters | | |
|---|---|---|
| Name | Type | Description |
| szParticipantName | STRING | The participant for which the list of Acts taken is returned. |
| lBPTid | BPTID | Business Process id |
| szWFName | STRING | The workflow name for which the list of acts taken is returned. If no name is specified, i.e., the string is null, then the act history for the entire Business Process is returned. |
| lpiCount | LPINT | Pointer to an integer. The function returns number of Acts returned. |
| bFileOrMemory | BOOL | Flag to indicate file or memory mode of receipt of data from the API. |
| szFileName | STRING | File name where the API should deposit the results of the call if the flag bFileOrMemory is ITS_FILE. |
| lpActsList | LPACTSTAKENLIST | Pointer to ACTSTAKENLIST |
| lpError | LPERRCODE | Error code returned by the server. |

Return Value lpiCount, the number of Acts in the list.

lpActsList points to a list of ACTSTAKEN structures that contain Business Process Name & id, Workflow Name & id, Act Name & id, Act Date and the ParticipantName who took the act.

AWSTGETNSTRING

Description

The notification string for the event is retrieved. If no such string is present for the workflow then default string associated with the Business Process is retrieved. If no default string is present then a null string is returned.

Syntax

VOID FAR PASCAL AWSTGETNSTRING(BPTID lBPTid, STRING szWFName, EVENT NotificationEvent, STRING szNotificationString, LPERRCODE lpError)

| Parameters | | |
|---|---|---|
| Name | Type | Description |
| lBPTid | BPTID | Business Process id |
| szWFName | STRING | Workflow name. |
| NotificationEvent | EVENT | This parameter specifies the event |
| szNotificationString | STRING | The notification string returned. |
| lpError | LPERRCODE | Error code returned by the server. |

| Notification Events | |
|---|---|
| Event | Notification Type |
| Performer Response past due | Follow-up |
| Performer Completion past due | Follow-up |
| Performer Completion coming due | Reminder |
| Customer Response past due | Follow-up |
| Act taken | Act |

Return Value szNotificationString will contain the notification string

AWSTPOLLSTFQUEUE

Description

This call returns the notification event to the STF Processor. If the notification event is "Act Taken", then the parameter lpTxId will contain the transaction Id of the Act.

Syntax

VOID FAR PASCAL AWSTPOLLSTFQUEUE(STRING szSTFProcessorName, LPIDEN lpBPTid, STRING szWFName, LPINT lpEvent, LPIDEN lpTxId, STRING szParticipantName, DATETIMESTRING szCompletionTime, DATETIMESTRING szNotificationTime, LPERRCODE lpError)

| Parameters | | |
|---|---|---|
| Name | Type | Description |
| szSTFProcessorName | STRING | STF Processor Name |
| lpBPTid | LPIDEN | BPTid of the BP instance which has some notification to be sent to the application. |
| szWFName | STRING | WFName of the WF instance |
| lpEvent | LPINT | The Event Id is returned here. |
| lpTxId | LPIDEN | TxId of the Act if Event is "Act Taken" |
| szParticipantName | STRING | The participant's name is returned. |
| szCompletionTime | DATETIMESTRING | Completion date & time is returned. This is the date and time when the event was due. For example, the instance when Performer Response is due. |
| szNotificationTime | DATETIMESTRING | Notification date & time is returned. This is the instant when this notification was placed in the STF queue. |
| lpError | LPERRCODE | Error code returned by the server. |

| Notification Events | |
|---|---|
| Event | Notification Type |
| Performer Response past due | Follow-up |
| Performer Completion past due | Follow-up |
| Performer Completion coming due | Reminder |
| Customer Response past due | Follow-up |
| Act taken | Act |

Return Value

AWSTNUMAVAILABLEACTS

Description

Returns number of available acts in the specified workflow for the role that the identity has in the workflow.

Syntax

VOID FAR PASCAL AWSTNUMAVAILABLEACTS (BPTID lBPTid, STRING szWFName, WFROLE WFRole, STRING szParticipantName, LPINT lpiCountPtr, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The name of the workflow whose status is desired |
| WFRole | WFROLE | The workflow role of the identity. |
| szParticipantName | STRING | The participant for which the list of available acts is returned. |
| lpiCountPtr | LPINT | Number of acts returned in the structure |
| lpError | LPERRCODE | Error code returned by the server. |

Return Value lpiCount is updated with the number of possible acts the Identity can take in the current workflow.

AWSTGETNUMAPPDATA

Description

Number of data fields are returned corresponding to the data fields bound to a workflow instance.

Syntax

VOID FAR PASCAL AWSTGETNUMAPPDATA (BPTID lBPTid, STRING szWFTName, WFROLE WFRole, STRING szParticipantName, LPINT lpiFieldsPtr, LPERRCODE lpError)

| Parameters | | |
|---|---|---|
| Name | Type | Description |
| lBPTid | BPTID | Business Process Transaction Id. The Id of a previously instantiated BP. |
| szWFName | STRING | The name of the workflow from which to retrieve bound data. The transaction id should be null to retrieve business process bound data. |
| WFRole | WFROLE | The WFRole of the Identity |
| szParticipantName | STRING | The name of the person or identity requesting Application Data associated with the workflow. |
| lpiFieldsPtr | LPINT | The number of bound data field retrieved. |
| lpError | LPERRCODE | Error code returned by the server. |

Return Value lpiFields contains the number of fields retrieved.

AWSTNUMAVAILABLEBP

Description

This function returns the number of BPs that satisfy a query.

Syntax

VOID FAR PASCAL AWSTNUMAVAILABLEBP (STRING szParticipantName, INT iBPStatus, LPINT lpiCount, LPERRCODE lpError)

| Parameters | | |
|---|---|---|
| Name | Type | Description |
| szParticipantName | STRING | The participant for which the list of BPs is returned. |
| iBPStatus | INT | Indicate the iBPStatus required. ACTIVE_BPS only can be selected or all BPs in the definition could be selected. |
| lpiCount | LPINT | The number of BPs returned. |
| lpError | LPERRCODE | Error code returned by the server. |

Return Value lpiCount, the number of workflows in the list.

AWSTNUMACTHISTORY

Description

This call returns the number of Acts taken in the specified business process for a specific workflow. If workflow Id is NULL, then the history of the entire business process, i.e., the number of all acts taken of all workflows is returned.

Syntax

VOID FAR PASCAL AWSTNUMACTHISTORY(STRING szParticipantName, BPTID lBPTid, STRING szWFName, LPINT lpiCount, LPERRCODE lpError)

| Parameters | | |
|---|---|---|
| Name | Type | Description |
| szParticipantName | STRING | The participant for which the list of Acts taken is returned. |
| lBPTid | BPTID | Business Process id |
| szWFName | STRING | The workflow name for which the list of acts taken is returned. If no name is specified, i.e., the string is null, then the act history for the entire Business Process is returned. |
| lpiCount | LPINT | Pointer to an integer. The function returns number of Acts returned. |
| lpError | LPERRCODE | Error code returned by the server. |

Return Value lpiCount, the number of Acts in the list.

AWSTNUMQUERYWF

Description

This function returns number of workflows that a participant is a member of as a specific Organization Role.

Syntax

VOID FAR PASCAL AWSTNUMQUERYWF(STRING szParticipantName, STRING szOrgRole, STRING szBPName, STRING szStartDate, STRING szEndDate, BOOL bpending, LPINT lpiCount, LPERRCODE lpError)

| Parameters | | |
|---|---|---|
| Name | Type | Description |
| szParticipantName | STRING | The participant for which the list of workflows is returned. |
| szOrgRole | STRING | The organization role of the participants. Only workflows that have this specific OrgRole are selected. If OrgRole is specified as NULL then all workflows are selected regardless of the role |
| szBPName | STRING | The workflows are selected only for the specified BPName. If BPName is NULL, then relevant workflows are selected regardless of the business process. |
| szStartDate | DATETIMESTRING | StartDate for query list. |
| szEndDate | DATETIMESTRING | End Date for query list. These dates specify a date range of due dates for which the list is constructed. If StartDate is NULL then the list includes all relevant workflows. |
| bPending | BOOL | If Pending is TRUE then the list workflows includes only those workflows where action is pending. The workflows which needs to be initiated are also included. Otherwise it includes workflows where action is not pending. |
| lpiCount | LPINT | Returns the count of workflows selected. |
| ipWFSnapShot | LPWFSNAPSHOT | Pointer to a list of selected workflows. Each workflow includes Business Process name & Id, Workflow name & Id, CustomerId, PerformerId, Completion and Reply Dates, Status and form name |
| ipError | LPERRCODE | Error code returned by the server. |

Return Value lpiCount, the number of workflows in the list.

| Customer | Performer |
|---|---|
| Completion requested | Completion due |
| Reply due to Performer | Reply due to Customer |
| Completion due by Performer | Completion requested by Customer |
| Reply due by Performer | Reply due by Customer |

Not all dates are returned, depending on the present state of the workflow the relevant dates are returned.

AWSTSETCOS

Description

This function specifies the Conditions of Satisfaction (COS) associated with a workflow of a Business Process Instance. The COS is inserted as a series of memory blocks. This function requires the Business Process context and workflow to be setup before execution.

Syntax

VOID FAR PASCAL AWSTSETCOS (IDEN lBPTid, STRING sztJFName, LPMEM lpCOS, LPINT lpiMemBlockSize, INT iPositionNotify, LPERROR-
CODE lpError)

Parameters

| Name | Type | Description |
| --- | --- | --- |
| lBPTid | BPTID | Business Process Transaction Id. The Id of a previously instantiated BP. |
| szWFName | STRING | The name of the workflow. |
| lpCOS | LPMEM | Pointer to a memory chunk which stores COS (BLOB). |
| lpiMemBlockSize | LPINT | Memory allocated for storing COS in bytes. |
| iPositionNotify | INT | This variable identifies the first COS buffer, subsequent COS buffers and the last one. It should be set to 0 to identify first buffer, 1 to identify subsequent buffers. |
| lpError | LPERRORCODE | Error code returned. |

Return Value
AWSTGETCOS
Description

The function gets the COS associated with the specified workflow of a Business Process. The COS is returned as a series of memory blocks. The memory block pointer and the block size allocated is passed to this function and the number of bytes actually written in the memory block is returned. For the first call, the contents of the variable pOffset must be set to zero (0). This indicates the start of the memory block transfers. The caller will be notified with a negative value in the Offset variable to indicate end of the block transfers.

Syntax
VOID FAR PASCAL AWSTGETCOS (IDEN lBPTid, STRING szWFName, LPMEM lpCOS, LPINT lpiMemBlockSize, LPLONG lpOffset, LPERRORCODE lpError)

Parameters

| Name | Type | Description |
| --- | --- | --- |
| lBPTid | BPTID | Business Process Transaction Id. The Id of a previously instantiated BP. |
| szWFName | STRING | The name of the workflow. |
| lpCOS | LPMEM | Pointer to a memory chunk which stores COS (BLOB). |
| lpiMemBlockSize | LPINT | Memory allocated for storing COS in bytes. |
| lpOffset | LPLONG | Initially, the caller must set this to zero. Each block transfer changes the value contained in this variable and the caller can only check the value returned here. This will be negative if end is reached. |
| lpError | LPERRORCODE | Error code returned. |

Return Value
Number of bytes actually written.
Description

This function returns the workflow transaction id of a workflow in a business process instance.

Syntax
VOID FAR PASCAL AWSTGETWFTID (IDEN lBPTid, STRING szWFName, LPIDEN lpWFTid, LPERROR-
CODE lpError)

Parameters

| Name | Type | Description |
| --- | --- | --- |
| lBPTid | BPTID | Business Process Transaction Id. The Id of a previously instantiated BP. |
| szWFName | STRING | The workflow name for which the transaction id is required |
| lpWFTid | LPIDEN | The Transaction Id of the workflow is returned. |
| lpError | LPERRCODE | Error code returned. |

Return Value
Workflow Definitions API
AWSDBEGINBP
Description

This call creates a new Business Process. The Business Process name is specified as a parameter. The Business Process name should be unique. If a Business Process with the same name is present, the current definition is overwritten as a new version. This takes place only if there are no active instances of the current business processes. The version number is maintained internally by the server.

The AWSDBeginBP should be the first call when defining a business process and no other AWSDBeginBP call should be in progress. Every AWSDBeginBP has to be closed by a AWSDEndBP call. The AWSDEndBP should be the last call and ends the definition of a business process.

AWSDBeginBP sets up a context for the business process and all subsequent calls require this context. The AWS-DEndBP closes this context.

Syntax
VOID FAR PASCAL AWSDBEGINBP(STRING szBPName, IDEN lBPAdmin, LPERRCODE lpError)

Parameters

| Name | Type | Description |
| --- | --- | --- |
| szBPName | STRING | The Business Process name. This name should be unique. If a business process with the same name is present, the current definition is over written as a new version. There should be no active instances of the current definition for this to occur. |
| lBPAdmin | IDEN | The Identity of the person creating this business process. The Identity should have the rights to create business processes. |
| lpError | LPERRCODE | Error code returned. |

Return Value
Error code is returned.
AWSDENDBP
Description

Close the currently open business process. A call to AWSDENDBP should be preceded by a call to AWSDBE-GINBP.

AWSDENDBP should be the last call peahen defining a business process. Every AWSDBEGINBP has to be closed by a AWSDENDBP. The AWSDENDBP should be the last call and ends the definition of a business process. The AWSDENDBP closes the context set up by AWSDBE-GINBP.

Note: AWSDENDBP should be called only after a AWSDENDWF call has been made.

Syntax

VOID FAR PASCAL AWSDENDBP(LPERRCODE lpError)

| Parameters | | |
|---|---|---|
| Name | Type | Description |
| lpError | LPERRCODE | Error code returned. |

Return Value

Error code is returned.

AWSDDELETEBP

Description

Deletes a Business Process. The delete is successful only if the Business Process has no active instances in the activity database. This function is used to remove business processes no longer in use. This function is called only if the business process is not in progress.

Syntax

VOID FAR PASCAL AWSDDELETEBP(STRING szBPName, IDEN lBPAdmin, LPERRCODE lpError)

| Parameters | | |
|---|---|---|
| Name | Type | Description |
| szBPName | STRING | The name of the business process to delete. There should be no active instances for this BPName. |
| lBPAdmin | IDEN | The Identity of the person deleting this business process. The Identity should have the rights to delete this business processes. |
| lpError | LPERRCODE | Error code returned. |

Return Value

Error code is returned.

AWSDSETBPBOUNDDATA

Description

Define the list of bound data fields associated with the business process. The field name, type, size, attributes and initial value, if any, are specified.

Syntax

VOID FAR PASCAL AWSDSETBPBOUNDDATA(INT iFields, LPBDFIELDSTRUCT lpBDFieldStructPtr, LPERRCODE lpError)

| Parameters | | |
|---|---|---|
| Name | Type | Description |
| iFields | INT | The number of fields to attach with the business process. |
| lpBDFieldStructPtr | LPBDFIELDSTRUCT | A pointer to an array of structures containing field name, type, size, attributes and initial value, if any. |
| lpError | LPERRCODE | Error code returned. |

Return Value

Error code is returned.

AWSDBEGINWF

Description

Creates a new workflow in a Business Process. The workflow name is specified as a parameter. The workflow name should be unique. If a workflow with the same name is present, then the context for this workflow is set up.

The AWSDBEGINWF should be the first call when defining a workflow and no other AWSDBEGINWF call should be in progress. Every AWSDBEGINWF has to be closed by a AWSDENDWF call.

AWSDBEGINWF sets up a context for the workflow and all subsequent workflow calls require this context. The AWSDENDWF closes this context.

Syntax

VOID FAR PASCAL AWSDBEGINWF(STRING szWFName, LPERRCODE lpError)

| Parameters | | |
|---|---|---|
| Name | Type | Description |
| szWFName | STRING | The workflow name. This name should be unique. |
| lpError | LPERRCODE | Error code returned. |

Return Value

Error code is returned.

AWSDENDWF

Description

Close the currently open workflow. A call to AWSDENDWF should be preceded by a call to AWSDBEGINWF.

The AWSDENDWF should be the last call when defining a workflow. Every AWSDBEGINWF has to be closed by a AWSDENDWF call. The AWSDENDWF should be the last call and ends the definition of a workflow. The AWSDENDWF closes the context set up by AWSDBEGINWF.

Syntax

VOID FAR PASCAL AWSDENDWF(LPERRCODE lpError)

| Parameters | | |
|---|---|---|
| Name | Type | Description |
| lpError | LPERRCODE | Error Code returned. |

Return Value

Error code is returned.

AWSDSETWFINFO

Description

Specify workflow information. The workflow type, the organization role for the customer and performer, the time offsets for completion and reply are specified. This call must be made only after AWSDBEGINWF is called.

Syntax

VOID FAR PASCAL AWSDSETWFINFO(WFTYPE WFType, BOOL bCentralWF, IDEN lCustomer, IDEN lPerformer, LPERRCODE lpError)

| Parameters | | |
|---|---|---|
| Name | Type | Description |
| WFType | WFTYPE | This specifies the type of workflow, i.e., Request or Offer or Note. |
| bCentralWF | BOOL | Flag to indicate if this workflow is the central workflow of the Business Process. This flag is TRUE if it is the central workflow, FALSE otherwise. |
| lCustomer | ORGROLEID | The Organization Role of the Customer. |
| lPerformer | ORGROLEID | The Organization Role of the Performer. |
| lpError | LPERRCODE | Error code returned. |

Return Value
Error code is returned.
AWSDSETWFCYCLETIME
Description
Set the various cycle times associated with the workflow. Depending on the workflow type—Request or Offer, the response time for each act of the workflow may be specified. The table below enumerates the various times that can be stored.

Read table below as:

| | <OrgRole1> must <Action1> [after <OrgRole2> <Action2>]within time <time> | | | |
|---|---|---|---|---|
| S1. | OrgRole1 | Action1 | OrgRole2 | Action2 |
| | For Request type workflow: | | | |
| 1 | Customer | Request | | |
| 2 | Performer | Respond | Customer | Request |
| 3 | Performer | Complete | Customer | Request |
| 4 | Customer | Respond | Performer | Declares completion |
| | For Offer type workflow: | | | |
| 1 | Performer | Offer | | |
| 2 | Customer | Respond | Performer | Offer |
| 3 | Performer | Complete | Customer | Agreement |
| 4 | Customer | Respond | Performer | Declares completion |

Note: The call must be made only after function AWSDSETWFINFO is called.

Syntax
VOID FAR PASCAL AWSDSETCYCLETIME (LPCYCLETIME lpCycleTime, LPERRCODE lpError)

| Parameters | | |
|---|---|---|
| Name | Type | Description |
| lpCycleTime | LPCYCLETIME | Pointer to an array of time offsets. Depending on the workflow type the array elements refer to different times are listed in the tables above. Since the number of cycle times for each workflow type is known, the count is not required. |
| lpError | LPERRCODE | Error Code returned. |

Return Value
Error code is returned.
AWSDDISABLEWFACT
Description
Disable a set of workflow acts for a specific workflow role. By default all acts are enabled for a workflow. This call facilitates disabling specific acts. This call must be made only after a call to AWSDBEGINWF.
Syntax
VOID FAR PASCAL AWSDDISABLEWFACT(WFROLE WFRole, INT iCount, LPACTINFO ActPtr, LPERRCODE lpError)

| Parameters | | |
|---|---|---|
| Name | Type | Description |
| WFRole | WFROLE | The Workflow Role for which the acts are to be disabled. |
| iCount | INT | The number of acts to disable. |
| ActPtr | LPACTINFO | A pointer to an array of structures which contains the list of acts to disable. The number of acts is specified by parameter nCount |
| lpError | LPERRCODE | Error code returned. |

Return Value
Error code is returned.
AWSDSETACTUSERDEFINEDNAME
Description
Set the user-defined description for the workflow Acts. The list of acts and the equivalent user-defined names are provided. This call must be made only after a call to AWSDBEGINWF.
Syntax
VOID FAR PASCAL AWSDSETACTUSERDEFINEDNAME(INT iCount, LPACTINFO ActPtr, LPERRCODE lpError)

| Parameters | | |
|---|---|---|
| Name | Type | Description |
| iCount | INT | The number of acts for which the user-defined name has been provided. |
| ActPtr | LPACTINFO | A pointer to an array of structures which contains the list of acts, i.e., Act Names and user-defined Names for the acts. |
| lpError | LPERRCODE | Error code returned. |

Return Value
Error code is returned.
AWSDSETSTATEUSERDEFINEDNAME
Description
Set the User-defined description for the workflow states. The list of states and the equivalent user-defined names are provided. This call must be made only after a call to AWSDBEGINWF.
Syntax
VOID FAR PASCAL AWSDSETSTATEUSERDEFINEDNAME(INT iCount, LPSTATEINFO StatePtr, LPERRCODE lpError)

| Parameters | | |
|---|---|---|
| Name | Type | Description |
| iCount | INT | The number of states for which the user-defined name has been provided. |
| StatePtr | LPSTATEINFO | A pointer to an array of structures which contains the list of states, i.e., State Names and user-defined names for the states. |
| lpError | LPERRCODE | Error code returned. |

Return Value
  Error code is returned.
AWSDSETACTSCRIPT
Description
  Set the workflow script for an Act. The act and the script text are the parameters to this function. This call must be made only after a call to AWSDBEGINWF.
Syntax
VOID FAR PASCAL AWSDSETACTSCRIPT(ACT Act, LPMEM lpActScript, BOOL bScriptType, LPINT lpiMemBlockSize, INT iPositionNotify, ERRORCODE &Error)

| Parameters | | |
|---|---|---|
| Name | Type | Description |
| Act | ACT | The type of act, e.g., Request, Agree, etc. |
| lpActScript | LPMEM | The workflow script associated with the act. The script is executed when the corresponding act in the workflow is executed. |
| bScriptType | BOOL | Script Type is a Boolean flag which indicates whether the script is System generated or user generated. |
| lpiMemBlockSize | LPINT | Size of the memory block in bytes. |
| iPositionNotify | INT | This variable identifies the first script buffer, subsequent buffers and the last one. It should be set to 0 to identify first map buffer, 1 to identify subsequent map buffers and to 2 to indicate last buffer. |
| lpError | LPERRCODE | Error code returned. |

Return Value
  Error code is returned.
  Act script added to the workflow.
AWSDSETSTATESCRIPT
Description
  Set the workflow script for a State. The state and the script text are the parameters to this function. This call must be made only after a call to AWSDBEGINWF.
Syntax
VOID FAR PASCAL AWSDSETACTSCRIPT(STATE State, LPMEM lpStateScript, BOOL bScriptType, LPINT lpiMemBlockSize, INT iPositionNotify, LPERRORCODE lpError)

| Parameters | | |
|---|---|---|
| Name | Type | Description |
| State | STATE | The type of state, e.g., Initiate, Negotiation, Completing, Satisfied, etc. |
| lpStateScript | LPMEM | The workflow script associated with the state. The script is executed when the workflow transits to the specified state. |
| bScriptType | BOOL | Script Type is a Boolean flag which indicates whether the script is System generated or user generated. |
| lpiMemBlockSize | LPINT | Size of the memory block in bytes. |
| iPositionNotify | INT | This variable identifies the first script buffer, subsequent buffers and the last one. It should be set to 0 to identify first map buffer, 1 to identify subsequent map buffers and to 2 to indicate last buffer. |
| lpError | LPERRCODE | Error code returned. |

Return Value
  Error code is returned.
  State script added to the workflow.
AWSDSETWFBOUNDDATAFIELDS
Description
  Define the list of bound data fields associated with the workflow. The field name, type, size, default attributes and initial value, if any, are specified.
Syntax
VOID FAR PASCAL AWSDSETWFBOUNDDATAFIELDS(INT iFields, LPBDFIELDSTRUCT lpBDFieldStructPtr, LPERRCODE lpError)

| Parameters | | |
|---|---|---|
| Name | Type | Description |
| iFields | INT | The number of fields to attach with the workflow. |
| lpBDFieldStructPtr | LPBDFIELDSTRUCT | A pointer to an array of structures containing field name, type, size, default attributes and initial value, if any. |
| lpError | LPERRCODE | Error code returned. |

Return Value
  The bound data fields are attached to the workflow.
  Error code is returned.
AWSDSETWFBDFIELDATTRIBUTE
Description
  Define the field attributes of bound data fields associated with the workflow. The field attributes, Read-only, Editable, Hidden and MustFill, may be specified for each Act and/or State for a specific workflow role.
  A call to AWSDSETWFBDFIELDATTRIBUTE must be made only after calling AWSDSetWFBoundDataFields.
Syntax
VOID FAR PASCAL AWSDSETWFBDFIELDATTRIBUTE(INT iFields, LPWFMOMENTBDFIELDSTRUCT lpWFMomentBDFieldStruct, LPERRCODE lpError)

| Parameters | | |
|---|---|---|
| Name | Type | Description |
| iFields | INT | The number of fields to attach with the workflow. |
| lpWFMomentBDFieldStruct | LPWFMOMENTBDFIELDSTRUCT | A pointer to an array of structures containing field name, Act or State, Workflow Role and attributes. The attributes are: Read-only, Editable, Hidden and MustFill. |
| lpError | LPERRCODE | Error code returned. |

Return Value
 Error code is returned.
 The attributes of the bound data fields are attached to the workflow.

AWSDSETFORMINFO
Description
 Specify workflow form names for Customer, Performer and Observer.
Syntax
VOID FAR PASCAL AWSDSETFORMINFO(STRING szCusForm, STRING szPerForm, STRING szObsForm, STRING szInitForm, LPERRCODE lpError)

| Parameters | | |
|---|---|---|
| Name | Type | Description |
| szCusForm | STRING | Form name for Customer of workflow |
| szPerForm | STRING | Form name for Performer of workflow |
| szObsForm | STRING | Form name for Observer of workflow |
| szInitForm | STRING | Init form name of the workflow |
| lpError | LPERRCODE | Error code returned. |

Return Value
 Error code is returned.
 Form names attached to the workflow

AWSDSETFOLLOWUP
Description
 Set up follow-up information associated with the workflow. The follow-up time offsets for Completion, Reply and Reminder are specified.
 A follow-up is sent after the Completion is past due. It is sent at the specified time interval after it is past due. If the recurring flag for Completion is set, then till Completion, follow-up messages are sent at every time interval specified. The maximum number of times a follow-up notification is sent could be set using this call.
 A follow-up is sent after the Reply is past due. It is sent at the specified time interval after it is past due. If the recurring flag for Reply is set, then till Reply has been sent, follow-up messages are sent at every time interval specified. The maximum number of times a follow-up notification is sent could be set using this call.
 A reminder may be sent before Completion or Reply is due. The reminder is sent at a time interval specified before the event is due. Reminders may be disabled. A reminder is sent only once.
Syntax
VOID FAR PASCAL AWSDSETFOLLOWUP(BOOL bPCFUFlag, TIMEOFFSET PCFUOffset, BOOL bPCFURecur, INT iPCFUCount, BOOL bPRFUFlag, TIMEOFFSET PRFUOffset, BOOL bPRFURecur, INT iPRFUCount, BOOL bCRFUFlag, TIMEOFFSET CRFUOffset, BOOL bCRFURecur, INT iCRFUCount, TIMEOFFSET PCRemOffset, BOOL bPCRemFlag, BOOL bActNotifyFlag, LPERRCODE lpError)

| Parameters | | |
|---|---|---|
| Name | Type | Description |
| bPCFUFlag | BOOL | Performer completion follow-up flag. |
| PCFUOffset | TIMEOFFSET | A follow-up message is sent at an interval, specified by PCFUOffset, after performer completion is past due. |
| bPCFURecur | BOOL | If enabled, recurring notifications are sent at every PCFUOffset interval as many as PCFUCount times. |
| iPCFUCount | INT | Number of times the follow-up notifications should be sent after performer completion is past due. If this parameter is not specified, and PCFUFlag is set, then notifications are sent till performer completes. |
| bPRFUFlag | BOOL | Performer response follow-up flag |
| PRFUOffset | TIMEOFFSET | A follow-up message is sent at an interval, specified by this parameter after Performer reply is past due. |
| bPRFURecur | BOOL | If enabled, recurring notifications are sent at every PRFUOffset interval as many as PRFUCount times. If PRFUFlag is set TRUE and PRFUCount is not specified, then follow-up messages are sent until performer replies. |
| iPRFUCount | INT | Number of times the follow-up notifications should be sent after performer Completion is |

-continued

| Parameters | | |
|---|---|---|
| Name | Type | Description |
| | | past due. If this parameter is not specified, and PRFUFlag is set, then notifications are sent till performer completes. |
| bCRFUFlag | BOOL | Customer response follow-up flag |
| CRFUOffset | TIMEOFFSET | A follow-up message is sent at an interval, specified by this parameter after customer reply is past due. |
| bCRFURecur | BOOL | If enabled, recurring notifications are sent at every CRFUOffset interval as many as CRFUCount times. |
| iCRFUCount | INT | Number of times the follow-up notifications should be sent after Customer Completion is past due. If this parameter is not specified, and CRFUFlag is set, then notifications are sent till customer replies. |
| PCRemOffset | TIMEOFFSET | A reminder is sent at an interval PCRemOffset before Completion or Reply is due. |
| bPCRemFlag | BOOL | If this flag is enabled, reminders are sent. If disabled, no reminders are sent. |
| bActNotifyFlag | BOOL | Indicates notification status. If set to TRUE, notification is enabled else if set to FALSE, it is disabled. |
| lpError | LPERRCODE | Error code returned. |

Return Value
  Error code is returned.
  Follow-up information attached to the workflow
AWSDSETLINK
Description
  Specify a in coming link to a workflow. For each link, the source workflow name, triggering and triggered information is provided. Triggering information constitutes whether the link is anchored at an act or state and the act/state name. Triggered information constitutes whether the link terminates at an act or state and the act/state name.
  Note: AWSDSETLINK must be called only after all workflows have been created using AWSDBEGINBP.
Syntax
VOID FAR PASCAL AWSDSETLINK(STRING szFWFName, BOOL bFActOrState, ACTSTATEID FActState, STRING szTWFName, BOOL bTActOrState, ACTSTATEID TActState, LPERRCODE lpError)

| Parameters | | |
|---|---|---|
| Name | Type | Description |
| szFWFName | STRING | The source or "from" workflow name. The name of the workflow where a link is anchored. |
| bFActOrState | BOOL | Flag to indicate if it is an Act or State link at source. |
| FActState | ACTSTATEID | The act or state from where the link starts. |
| szTWFName | STRING | The destination or "to" workflow name. The name of the workflow to which the link is targeted. |
| bTActOrState | BOOL | Flag to indicate if it is an Act or State link at destination. |
| TActState | ACTSTATE | The act or state where the link ends. |
| lpError | LPERRCODE | Error code returned. |

Return Value
  Link information attached to the workflow
  Error code is returned.
AWSDPUTMAP
Description
  Associates a map file with the specified Business Process. The map file is inserted as a series of memory blocks. This function requires the business process context to be setup before execution.
Syntax
VOID FAR PASCAL AWSDPUTMAP (LPMEM lpMapMemPtr, LPINT lpiMemBlockSize, INT iPositionNotify, LPERRCODE lpError)

| Parameters | | |
|---|---|---|
| Name | Type | Description |
| lpMapMemPtr | LPMEM | Pointer to a memory block containing map. |
| lpiMemBlockSize | LPINT | Size of the memory block in bytes. |
| iPositionNotify | INT | This variable identifies the first map buffer, subsequent map buffers and the last one. It should be set to 0 to identify first map buffer, 1 to identify subsequent map buffers. |
| lpError | LPERRCODE | Error code returned. |

Return Value
  Error code is returned.
AWSDGETMAP
Description
  Get the map file associated with the specified Business Process. The map file is returned as a series of memory blocks. The memory block pointer and the block size allocated is passed to this function and the number of bytes actually written in the memory block is returned. Initially, the caller must pass a zero in the Offset variable to indicate start of the block transfers. The caller will be notified with a negative value in the Offset variable to indicate end of the block transfers.
Syntax
VOID FAR PASCAL AWSDGETMAP (STRING szBPName, LPMEM lpMapMemPtr, LPINT lpiMemBlockSize, LPLONG lpOffset, LPERRCODE lpError)

Parameters

| Name | Type | Description |
| --- | --- | --- |
| szBPName | STRING | Business Process Name with which to associate the map. |
| lpMapMemPtr | LPMEM | Pointer to a memory block where map can be returned. |
| lpiMemBlockSize | LPINT | Size of the memory block in bytes. |
| lpOffset | LPLONG | Initially, the caller must set this to zero. Each block transfer changes the value contained in this variable and the caller can only check the value returned here. This will be negative if end is reached. |
| lpError | LPERRCODE | Error code returned. |

Return Value
  Number of bytes actually written.
  Error code is returned.

AWSDBPADDROLEASSIGNMENT

Description
  Sets the Organization Role to Identity mapping at the Business Process level.

Syntax
void FAR PASCAL AWSDBPADDROLEASSIGNMENT (IDEN lIdentity, IDEN lOrgRoleId, LPERRCODE lpError)

Parameters

| Name | Type | Description |
| --- | --- | --- |
| lIdentity | IDEN | Organization Role id. |
| lOrgRoleId | IDEN | Identity Id to be mapped with OrgRole |
| lpError | LPERRCODE | Error code returned. |

Return Value

AWSDWFADDROLEASSIGNMENT

Description
  Sets the Organization Role to Identity mapping at the workflow level.

Syntax
void FAR PASCAL AWSDWFADDROLEASSIGNMENT (IDEN lIdentity, IDEN lOrgRoleId, WFROLE WFRole, LPERRCODE lpError)

Parameters

| Name | Type | Description |
| --- | --- | --- |
| lIdentity | IDEN | Identity Id to be mapped with OrgRole. |
| lOrgRoleId | IDEN | Organization Role id. |
| WFRole | WFROLE | Workflow role of the identity. |
| lpError | LPERRCODE | Error code returned. |

Return Value

AWSDGETBPVERSION

Description
  Get the current BP Version for the specified BP name. The function returns the Business Process Version.

Syntax
VOID FAR PASCAL AWSDGETBPVERSION (IDEN lIdentity, STRING szBPName, LPINT lpiVersion, LPERRCODE lpError)

Parameters

| Name | Type | Description |
| --- | --- | --- |
| lIdentity | IDEN | Identity Id to be mapped with OrgRole. |
| szBPName | STRING | The name of the BP for which the version number is requested |
| lpiVersion | LPINT | Pointer to an integer which holds the version number of BP |
| lpError | LPERRCODE | Error code returned. |

Return Value

AWSDGETLASTMODIFIEDDATE

Description
  This function returns the last modified date of the Business Process specified.

Syntax
VOID FAR PASCAL AWSDGETLASTMODIFIEDDATE (STRING szBPName, LPDATETIME pdtLastModified, LPERRCODE lpError)

Parameters

| Name | Type | Description |
| --- | --- | --- |
| szBPName | STRING | The name of the BP for which the last modified date is requested |
| lpdtLastModified | LPDATETIME | The pointer to the DATETIME type which holds the last modified date of the Business Process. |
| lpError | LPERRCODE | Error code returned. |

Return Value

AWSDSETBPNOTIFICATION

Description
  The notification string for the event is set with respect to the current BP context.

Syntax
void FAR PASCAL AWSDSETBPNOTIFICATION (EVENT NotificationEvent, STRING szNotificationString, LPERRCODE lpError)

Parameters

| Name | Type | Description |
| --- | --- | --- |
| NotificationEvent | EVENT | This parameter notifies the event |
| szNotificationString | STRING | The notification string. |
| lpError | LPERRCODE | Error code returned. |

Notification Events

| Event | Notification Type |
| --- | --- |
| Performer Response past due | Follow-up |
| Performer Completion past due | Follow-up |
| Performer Completion coming due | Reminder |
| Customer Response past due | Follow-up |
| Act taken | Act |

Return Value
AWSDSETWFNOTIFICATION
Description
The notification string for the event is set with respect to the current WF context.
Syntax
void FAR PASCAL AWSDSETWFNOTIFICATION (EVENT NotificationEvent, STRING szNotificationString, LPERRCODE lpError)

Parameters

| Name | Type | Description |
| --- | --- | --- |
| NotificationEvent | EVENT | This parameter notifies the event |
| szNotificationString | STRING | The notification string. |
| lpError | LPERRCODE | Error code returned. |

Notification Events

| Event | Notification Type |
| --- | --- |
| Performer Response past due | Follow-up |
| Performer Completion past due | Follow-up |
| Performer Completion coming due | Reminder |
| Customer Response past due | Follow-up |
| Act taken | Act |

Return Value
AWSDSETCOS
Description
This function specifies COS associated with a workflow of a Business Process. The COS is inserted as a series of memory blocks. This function requires the Business Process context and workflow to be setup before execution.
Syntax
VOID FAR PASCAL AWSDSETCOS (LPMEM lpCOS, LPINT lpiMemBlockSize, INT iPositionNotify, LPERRORCODE lpError)

Parameters

| Name | Type | Description |
| --- | --- | --- |
| lpCOS | LPMEM | Pointer to a memory chunk which stores COS (BLOB). |
| lpiMemBlockSize | LPINT | Memory allocated for storing COS in bytes. |
| iPositionNotify | INT | This variable identifies the first COS buffer, subsequent COS buffers and the last one. It should be set to 0 to identify first buffer, 1 to identify subsequent buffers and to 2 to indicate last buffer; |
| lpError | LPERRORCODE | Error code returned. |

Return Value
AWSDGETCOS
Description
The function gets the COS associated with the specified workflow of a Business Process. The COS is returned as a series of memory blocks. The memory block pointer and the block size allocated is passed to this function and the number of bytes actually written in the memory block is returned. For the first call, the contents of the variable pOffset must be set to zero (0). This indicates the start of the memory block transfers. The caller will be notified with a negative value in the Offset variable to indicate end of the block transfers.

Syntax
VOID FAR PASCAL AWSDGETCOS (STRING szBPName, STRING szWFName, LPMEM lpCOS, LPINT lpiMemBlockSize, LPLONG lpOffset, LPERRORCODE lpError)

Parameters

| Name | Type | Description |
| --- | --- | --- |
| szBPName | STRING | Business Process Name |
| szWFName | STRING | Workflow Name |
| lpCOS | LPMEM | Pointer to a memory chunk which stores COS (BLOB). |
| lpiMemBlockSize | LPINT | Memory allocated for storing COS in bytes. |
| lpOffset | LPLONG | Initially, the caller must set this to zero. Each block transfer changes the value contained in this variable and the caller can only check the value returned here. This will be negative if end is reached. |
| lpError | LPERRCODE | Error code returned. |

Return Value
Number of bytes actually written.
AWSDWFADDOBSROLE
Description
Sets the Observer Organization Role(s) at the workflow level.
Syntax
VOID FAR PASCAL AWSDWFADDOBSROLE (IDEN lOrgRoleId, LPERRCODE lpError)

Parameters

| Name | Type | Description |
| --- | --- | --- |
| lOrgRoleId | IDEN | Organization Role id. |
| lpError | LPERRCODE | Error code returned. |

Return Value
AWSDWFDELETEOBSROLE
Description
Deletes the Observer Organization Role(s) at the workflow level.
Syntax
VOID FAR PASCAL AWSDWFDELETEOBSROLE (IDEN lOrgRoleId, LPERRCODE lpError)

Parameters

| Name | Type | Description |
| --- | --- | --- |
| lOrgRoleId | IDEN | Organization Role id. |
| lpError | LPERRCODE | Error code returned. |

Return Value
Names and Routings API
AWSNADDORGROLE
Description
Add a new Organization Role name to the server. This name should be unique. The Organization Role Id is returned.
Syntax
VOID FAR PASCAL AWSNADDORGROLE(STRING szOrgRoleName, LPIDEN lpOrgRoleId, IDEN lAuthorizeIdentity, LPERRCODE lpError)

| Parameters | | |
|---|---|---|
| Name | Type | Description |
| szOrgRoleName | STRING | The Organization Role name to add to the server. The name should be unique. |
| lpOrgRoleId | LPIDEN | The OrgRoleId is returned on successful addition of Organization role name to the server. |
| lAuthorizeIdentity | IDEN | Identity of the person adding the name to the server. The Identity must be authorized to add names. |
| lpError | LPERRCODE | This is set to a non-zero value on error |

Return Value

The Organization Role Id, OrgRoleId is returned by the function.

AWSNINQUIREORGROLE

Description

Inquire if a specified Organization Role is present in the server database. If present, the Organization Role Id is returned.

Syntax

VOID FAR PASCAL AWSNINQUIREORGROLE (STRING szOrgRoleName, LPIDEN lpOrgRoleId, IDEN lAuthorizeIdentity, LPERRCODE lpError)

| Parameters | | |
|---|---|---|
| Name | Type | Description |
| szOrgRoleName | STRING | The Organization Role name that needs to be searched. If present, the Id associated with the name is returned. |
| lpOrgRoleId | LPIDEN | The OrgRoleId is returned. |
| lAuthorizeIdentity | IDEN | Identity of the person inquiring the presence of the name in the server database. The Identity must be authorized to Inquire. |
| lpError | LPERRCODE | This is set to a non-zero value on error |

Return Value

The Organization Role Id, OrgRoleId, is returned by the function.

AWSNDELETEORGROLE

Description

Delete an Organization Role name from the server.

Syntax

VOID FAR PASCAL AWSNDELETEORGROLE(IDEN lOrgRoleId, IDEN lAuthorizeIdentity, LPERRCODE lpError)

| Parameters | | |
|---|---|---|
| Name | Type | Description |
| lOrgRoleId | ORGROLEID | The Organization Role Id that needs to be deleted from the Sever database. |
| lAuthorizeIdentity | IDEN | Identity of the person removing the name from the server database. The Identity must be authorized to delete names. |
| lpError | LPERRCODE | This is set to a non-zero value on error |

Return Value
    Organization Role deleted from the server database.
AWSNADDIDENTITY
Description Add a new Identity to the server. The Identity name should be unique. The Identity Id is returned. Along with the name, Net Address, Postal Address, Phone, Fax, Department, Title, Location and comments may be specified.

Syntax

VOID FAR PASCAL AWSNADDIDENTITY(STRING szIdentityName, STRING szNetAddress, STRING szPostalAddress, STRING szphone, STRING szFax, STRING szDent, STRING szTitle, STRING szLocation, STRING szComment, BOOL bNotify, IDEN lSTFProcId, LPIDEN lpIdentity, IDEN lAuthorizeIdentity, LPERRCODE lpError)

| Parameters | | |
|---|---|---|
| Name | Type | Description |
| szIdentityName | STRING | The name of the person to add to the server database. The name should be unique. |
| szNetAddress | STRING | The complete network address of the Identity being added. |
| szPostalAddress | STRING | The Mailing address of the Identity being added |
| szPhone | STRING | The Phone number of the Identity being added. |
| szFax | STRING | The Fax number of the Identity being added. |
| szDept | STRING | The Department name of the Identity being added. |
| szTitle | STRING | The Official title (designation) of the Identity being added. |
| szLocation | STRING | The Location of the Identity. |
| szComment | STRING | Miscellaneous information associated with the Identity. |
| bNotify | BOOL | Notify via STF Processor |
| lSTFProcessor | IDEN | The STF Processor to use |
| lpIdentity | LPIDEN | Identity Id is returned. |
| lAuthorizeIdentity | IDEN | Identity of the person adding the name to the server. The Identity must be authorized to add names. |
| lpError | LPERRCODE | This is set to a non-zero value on error |

Return Value
    The Identity Id of the person added is returned.
AWSNINQUIREIDENTITY
Description Inquire if the specified Identity is present in the server database. If present, the Identity Id is returned by the function.

Syntax

VOID FAR PASCAL AWSNINQUIREIDENTITY (STRING szIdentityName, LPIDEN lpIdentity, IDEN lAuthorizeIdentity, LPERRCODE lpError)

| Parameters | | |
|---|---|---|
| Name | Type | Description |
| szIdentityName | STRING | The IdentityName that needs to be searched. If present, the Id associated with the name is returned. |
| lpIdentity | LPIDEN | Identity Id is returned. |
| lAuthorizeIdentity | IDEN | Identity of the person inquiring the presence of the name in the server database. The Identity must be authorized to inquire. |
| lpError | LPERRCODE | This is set to a non-zero value on error |

Return Value

The Identity Id, is returned by the function.

AWSNDELETEIDENTITY

Description

Delete an Identity name from the server database.

Syntax

VOID FAR PASCAL AWSNDELETEIDENTITY(IDEN lIdentityId, IDEN lAuthorizeIdentity, LPERRCODE lpError)

| Parameters | | |
|---|---|---|
| Name | Type | Description |
| lIdentityId | IDEN | The Identity Id that needs to be deleted from the Sever database. |
| lAuthorizeIdentity | IDEN | Identity of the person removing the name from the server database. The Identity must be authorized to delete names. |
| lpError | LPERRCODE | This is set to a non-zero value on error |

Return Value lIdentity deleted from the server database.

AWSNADDGROUP

Description

Add a new Group to the server. The Group name should be unique. The Group id is returned.

Syntax

VOID FAR PASCAL AWSNADDGROUP(STRING szGroupName, LPIDEN lpGroupId, IDEN lAuthorizeIdentity, LPERRCODE lpError)

| Parameters | | |
|---|---|---|
| Name | Type | Description |
| szGroupName | STRING | The name of the Group to add to the server database. The name should be unique. |
| lpGroupId | LPIDEN | The group Id is returned. |
| lAuthorizeIdentity | IDEN | lIdentity of the person adding the groups to the server. The Identity must be authorized to add groups. |
| lpError | LPERRCODE | This is set to a non-zero value on error |

Return Value

The Group Id added is returned.

AWSNINQUIREGROUP

Description

Inquire if the specified Group is present in the server database. If present, the Group Id is returned by the function.

Syntax

VOID FAR PASCAL AWSNINQUIREGROUP(STRING szGroupName, LPIDEN lpGroupId, IDEN lAuthorizeIdentity, LPERRCODE lpError)

| Parameters | | |
|---|---|---|
| Name | Type | Description |
| szGroupName | STRING | The GroupName to search. If present, the Id associated with the name is returned. |
| lpGroupId | LPIDEN | The group Id is returned. |
| lAuthorizeIdentity | IDEN | Identity of the person inquiring the presence of the Group name in the server database. The Identity must be authorized to inquire. |
| lpError | LPERRCODE | This is set to a non-zero value on error |

Return Value

The Group Id, is returned by the function.

AWSNDELETEGROUP

Description

Delete a Group from the server database.

Syntax

VOID FAR PASCAL AWSNDELETEGROUP(IDEN lGroupId, IDEN lAuthorizeIdentity, LPERRCODE lpError)

| Parameters | | |
|---|---|---|
| Name | Type | Description |
| lGroupId | IDEN | The Group Id that needs to be deleted from the Sever database |
| lAuthorizeIdentity | IDEN | Identity of the person removing the name from the server database. The Identity must be authorized to delete names. |
| lpError | LPERRCODE | This is set to a non-zero value on error |

Return Value
   Group deleted from the server database.
AWSNADDGROUPASSIGNMENT
Description
   Add an Identity to a Group. An Identity may be a member of several groups. To each group the Identity has to be assigned separately. The Identity inherits the rights a Group has.
Syntax
VOID FAR PASCAL AWSNADDGROUPASSIGNMENT (IDEN lGroupId, IDEN lGroupMemberId, IDEN lAuthorizeIdentity, LPERRCODE lpError)

Parameters

| Name | Type | Description |
| --- | --- | --- |
| lGroupId | IDEN | The Group Id of the group, the GroupMember wishes to be a member of. |
| lGroupMemberId | IDEN | The Identity of the person being assigned to the Group, identified by GroupId. |
| lAuthorizeIdentity | IDEN | The Identity of the person assigning GroupMember to Group. The person must have the authority to make this assignment. |
| lpError | LPERRCODE | This is set to a non-zero value on error |

Return Value
   GroupMember added to Group.
AWSNINQUIREGROUPASSIGNMENT
Description
   Verify if an identity is a member of a group.
Syntax
BOOL FAR PASCAL AWSNINQUIREGROUPASSIGNMENT(IDEN lGroupId, IDEN lGroupMember, IDEN lAuthorizeIdentity, LPERRCODE lpError)

Parameters

| Name | Type | Description |
| --- | --- | --- |
| lGroupId | IDEN | The GroupId of the group to verify if GroupMember a member of. |
| lGroupMember | IDEN | The Identity of the person being verified if member of the group, identified by GroupId. |
| lAuthorizeIdentity | IDEN | The Identity of the person inquiring. The person must have the authority to inquire. |
| lpError | LPERRCODE | This is set to a non-zero value on error |

Return Value
   The function returns TRUE if the Identity is a member of the group.
AWSNDELETEGROUPASSIGNMENT
Description
   Remove an identity from the membership of a group. The identity ceases to be a member of the specified group.
Syntax
VOID FAR PASCAL AWSNDELETEGROUPASSIGNMENT(IDEN lGroupId, IDEN lGroupMemberId, IDEN lAuthorizeIdentity, LPERRCODE lpError)

Parameters

| Name | Type | Description |
| --- | --- | --- |
| lGroupId | IDEN | The GroupId of the group from which to remove GroupMember. |
| lGroupMemberId | IDEN | The Identity of the person being removed from the Group, identified by GroupId. |
| lAuthorizeIdentity | IDEN | The Identity of the person deleting. The person must have the authority to delete. |
| lpError | LPERRCODE | This is set to a non-zero value on error |

Return Value
   The Identity is removed from the group.
AWSNGETGROUPLIST
Description
   Determine the list of groups an Identity is a member of. This function returns a list and a count.
Syntax
VOID FAR PASCAL AWSNGETGROUPLIST(IDEN lGroupMemberId, LPINT lpiCount, BOOL bFileOrMemory, LPGENERALINFO lpGroupInfoArray, STRING szFileName, IDEN lAuthorizeIdentity, LPERRCODE lpError)

Parameters

| Name | Type | Description |
| --- | --- | --- |
| lGroupMemberId | IDEN | The Identity of the person being assigned to the Group, identified by GroupId. |
| lpiCount | LPINT | Pointer to a counter. The number of groups GroupMember is a member of. This value is returned. |
| bFileOrMemory | BOOL | Flag to indicate File or Memory mode of receipt of data from the API. |
| lpGroupInfoArray | LPGENERALINFO | The list of groups GroupMember is a member of. For each group, the Group Id and Group Name are returned. A pointer to an array of Group Ids and Group Names is returned |
| szFileName | STRING | File name where the API should deposit the results of the call if the flag bFileorMemory is ITS_FILE. |
| lAuthorizeIdentity | IDEN | The Identity of the person Inquiring. The person must have the authority to Inquire. |
| lpError | LPERRCODE | This is set to a non-zero value on error |

Return Value
   The count of groups and a list of GroupId and GroupName returned.
AWSNGETGROUPMEMBERS
Description
   Get the list of all members in a group. The Identity of each member in a group is returned. The IdentityName is also returned.

Syntax void FAR PASCAL AWSNGETGROUPMEMBERS(IDEN lGroupId, LPINT lpiCount, BOOL bFileOrMemory, LPGENERALINFO lpMemberInfoArray, STRING szFileName, IDEN lAuthorizeIdentity, LPERRCODE lpError)

| Parameters | | |
|---|---|---|
| Name | Type | Description |
| lGroupId | IDEN | The GroupId of the group from which to retrieve list of members. |
| lpiCount | LPINT | Pointer to nCount, the number of members in the Group. |
| bFileOrMemory | BOOL | Flag to indicate File or Memory mode of receipt of data from the API. |
| lpGeneralInfoArray | LPGENERALINFO | A list of members in the group is returned. The list contains the IdentityId and IdentityName of each member. lpGeneralInfoArray is a pointer to an array. |
| szFileName | STRING | File name where the API should deposit the results of the call if the flag bFileOrMemory is ITS_FILE. |
| lAuthorizeIdentity | IDEN | The Identity of the person inquiring. The person must have the authority to inquire. |
| lpError | LPERRCODE | This is set to a non-zero value on error |

Return Value

List of members returned.

AWSNADDROLEASSIGNMENT

Description

Assign an Identity or a Group to an Organization Role. The Identity or all members of the group are assigned the specific Organization Role. Follow-up flags to enable/disable Reminders and Follow-up messages may be specified here. If an assignment is already present then the new Follow-up flags are assigned.

Syntax

VOID FAR PASCAL AWSNADDROLEASSIGNMENT (BOOL bGroupOrIdentity, IDEN lAssigneeId, IDEN lOrgRoleId, IDEN lAuthorizeIdentity, LPERRCODE lpError)

| Parameters | | |
|---|---|---|
| Name | Type | Description |
| bGroupOrIdentity | BOOL | Flag to indicate if Assignee is an identity or a Group. If GroupOrIdentity is TRUE, then Assignee contains a GroupId, otherwise it is an Identity. |
| lAssignee | IDEN/IDEN | The id of the Identity or Group being assigned the Organization Role. If a Group is being assigned, then all members of the group inherit the Role |
| lOrgRoleId | ORGROLEID | The Organization Role the Identity or Group will be assigned. |
| lAuthorizeIdentity | IDEN | The Identity of the person assigning role. The person must have the authority to make this assignment. |
| lpError | LPERRCODE | This is set to a non-zero value on error |

Return Value

Identity/Group assigned Organization Role.

AWSNINQUIREROLEASSIGNMENT

Description

Verify if a specific Identity is associated with an Organization Role. The function returns a flag. The Identity is first checked if it is associated with the Organization Role. If no association is found, then a check is made if an association exists with any of the groups Identity is a member of.

Syntax

BOOL FAR PASCAL AWSNINQUIREROLEASSIGNMENTEXTENDED (BOOL bGroupO rIdentity, IDEN lAssignee, IDEN lOrgRoleId, IDEN lAuthorizeIdentity, LPERRCODE lpError)

| Parameters | | |
|---|---|---|
| Name | Type | Description |
| bGroupOrIdentity | BOOL | Flag to indicate if Assignee is an identity or a Group. If GroupOrIdentity is TRUE, then Assignee contains a GroupId, otherwise it is an Identity. |
| lAssignee | IDEN | The id of the Identity being inquired. |
| lOrgRoleId | IDEN | The Organization Role being verified for the Assignee. |
| lAuthorizeIdentity | IDEN | The Identity of the person inquiring the association. The person must have the authority to inquire. |
| lpError | LPERRCODE | This is set to a non-zero value on error |

Return Value

The function returns a TRUE if the association is present, FALSE otherwise. If the association exists then the Follow-up flags are also returned.

AWSNDELETEROLEASSIGNMENT

Description

Disassociate an Identity or Group from a specific Organization Role. The Identity or all members of the group cease to be associated with the Organization Role.

Syntax

VOID FAR PASCAL AWSNDELETEROLEASSIGNMENT(BOOL bGroupOrIdentity, IDEN lAssignee, IDEN lAuthorizeIdentity, LPERRCODE lpError)

| Parameters | | |
|---|---|---|
| Name | Type | Description |
| bGroupOrIdentity | BOOL | Flag to indicate if Assignee is an Identity or a Group. If GroupOrIdentity is TRUE, then Assignee contains a GroupId, otherwise it is an Identity. |
| lAssignee | IDEN | The id of the Identity or Group being disassociated. |
| lAuthorizeIdentity | IDEN | The Identity of the person deleting the association. The person must have the authority to delete. |
| lpError | LPERRCODE | This is set to a non-zero value on error |

Return Value
AWSNGETROLELIST
Description
Determine the list of Roles that are assigned to a specific Identity or Group. This function returns a list of Organization Roles and a count.
Syntax
VOID FAR PASCAL AWSNGETROLELIST(BOOL bGroupOrIdentity, IDEN lAssignee, LPINT lpiCount, BOOL bFileOrMemory, LPGENERALINFO lpOrgRoleInfoArray, STRING szFileName, IDEN lAuthorizeIdentity, LPERRCODE lpError)

| Parameters | | |
|---|---|---|
| Name | Type | Description |
| bGroupOrIdentity | BOOL | Flag to indicate if Assignee is a Identity or a Group. If GroupOrIdentity is TRUE, then Assignee contains a GroupId, otherwise it is |
| lAssignee | IDEN | The id of the Identity or Group being inquired. |
| lpiCount | LPINT | Pointer to a counter. The number of Organization Roles an Identity/Group is assigned. |
| bFileOrMemory | BOOL | Flag to indicate File or Memory mode of receipt of data from the API. |
| lpOrgRoleInfoArray | LPGENERALINFO | The list of Organization Roles Assignee is assigned to. For each Role, the OrgRole, Follow-up flags and the description are returned. A pointer to a list of OrgRoles and description is returned. |
| szFileName | STRING | File name where the API should deposit the results of the call if the flag bFileOrMemory is ITS_FILE. |
| lAuthorizeIdentity | IDEN | The Identity of the person Inquiring. The person must have the authority to Inquire. |
| lpError | LPERRCODE | This is set to a non-zero value on error |

Return Value
List and Count returned.
AWSNGETIDENASSIGNEELIST
Description
Determine the list of Identities that are assigned to a specific Organization Role. This function returns a list of Identities and their names.
Syntax
VOID FAR PASCAL AWSNGETIDENASSIGNEELIST (IDEN lOrgRoleId, LPINT lpiCount, BOOL bFileOrMemory, LPASSIGNEE lpIdenInfoArray, STRING szFileName, IDEN lAuthorizeIdentity, LPERRCODE lpError)

| Parameters | | |
|---|---|---|
| Name | Type | Description |
| lOrgRoleId | IDEN | The Organization Role for which list of Assignees is being returned. |
| lpiCountPtr | LPINT | Pointer to a counter. The number of Assignees (Identities or Groups) associated with the Organization Role OrgRole |
| bFileOrMemory | BOOL | Flag to indicate File or Memory mode of receipt of data from the API. |
| lpIdenInfoArray | LPASSIGNEE | List of identities who are associated with a specific organization role. The bNotify flag associated with the Identity is also returned. A pointer to a list is returned. |
| szFileName | STRING | File name where the API should deposit the results of the call if the flag bFileOrMemory is ITS_FILE. |
| lAuthorizeIdentity | IDEN | The Identity of the person requesting the list. The person must have the authority to inquire. |
| lpError | LPERRCODE | This is set to a non-zero value on error |

Return Value
List and Count returned.
AWSNGETGROUPASSIGNEELIST
Description
Determine the list of Identities and Groups that are assigned to a specific Organization Role. This function returns a list of Identities and Group and their names.
Syntax
VOID FAR PASCAL AWSNGETGROUPASSIGNEELIST (IDEN lOrgRoleId, LPINT lpiCount, BOOL bFileOrMemory, LPGENERALINFO lpGroupInfoArray, STRING szFileName, IDEN lAuthorizeIdentity, LPERRCODE lpError)

| Parameters | | |
|---|---|---|
| Name | Type | Description |
| lOrgRoleId | ORGROLEID | The Organization Role for which list of Assignees is being returned. |
| lpiCountPtr | LPINT | Pointer to a counter. The number of Assignees (Identities or Groups) associated with the Organization Role OrgRole |

-continued

| Parameters | | |
|---|---|---|
| Name | Type | Description |
| bFileOrMemory | BOOL | Flag to indicate File or Memory mode of receipt of data from the API. |
| lpGroupInfoArray | LPGENERALINFO | List of groups who are associated with a specific organization role. A pointer to a list is returned. |
| szFileName | STRING | File name where the API should deposit the results of the call if the flag bFileOrMemory is ITS_FILE. |
| lAuthorizeIdentity | IDEN | The Identity of the person requesting the list. The person must have the authority to inquire. |
| lpError | LPERRCODE | This is set to a non-zero value on error |

Return Value
  List and Count returned.
AWSNCREATESTFDEFN
Description
  Create an entry in the STF Processor table. The processor name and the network address is maintained. The STF Processor Id is returned.
Syntax
VOID FAR PASCAL AWSNCREATESTFDEFN(STRING szSTFProcName, STRING szNetAddress, LPIDEN lpSTFProcId, IDEN lAuthorizeIdentity, LPERRCODE lpError)

| Parameters | | |
|---|---|---|
| Name | Type | Description |
| szSTFProcName | STRING | The name of the STF Processor. |
| szNetAddress | STRING | The network address of the location of the STF Processor. The processor must exist for this call to return successfully. |
| lpSTFProcId | LPIDEN | The STFProc Id is returned. |
| lAuthorizeIdentity | IDEN | The Identity of the person Creating the STF definition. The identity must be authorized to create STF definition. |
| lpError | LPERRCODE | This is set to a non-zero value on error |

Return Value
  STFProcessorId returned.
AWSNGETSTFDEFN
Description
  Get the STF definition from the STF Processor table for a specific STF Processor Id. The processor name and the network address are returned.
Syntax
VOID FAR PASCAL AWSNGETSTFDEFN(IDEN lSTFProcId, STRING szSTFProcName, STRING szNetAddress, IDEN lAuthorizeIdentity, LPERRCODE lpError)

| Parameters | | |
|---|---|---|
| Name | Type | Description |
| lSTFProcId | IDEN | The STF Processor Id. |
| szSTFProcName | STRING | The name of the STF Processor is returned. |
| szNetAddress | STRING | The network address of the location of the STF Processor is returned. |
| lAuthorizeIdentity | IDEN | The Identity of the person inquiring the STF definition. The identity must be authorized to inquire. |
| lpError | LPERRCODE | This is set to a non-zero value on error |

Return Value
  STFProcessor name and net address returned.
AWSNDELETESTFDEFN
Description
  Delete the STF definition from the STF Processor table for a specific STF Processor Id.
Syntax
VOID FAR PASCAL AWSNDELETESTFDEFN(IDEN STFProcId, IDEN lAuthorizeIdentity, LPERRCODE lpError)

| Parameters | | |
|---|---|---|
| Name | Type | Description |
| STFProcId | IDEN | The STF Processor Id. |
| lAuthorizeIdentity | IDEN | The Identity of the person deleting the STF definition. The identity must be authorized to delete. |
| lpError | LPERRCODE | This is set to a non-zero value on error |

Return Value
  STFProcessor name and net address returned.
AWSNGETNUMGROUPLIST
Description
  Determine the number of groups an Identity is a member of. This function returns a count.
Syntax
VOID FAR PASCAL AWSNGETNUMGROUPLIST(IDEN lGroupMemberId, LPINT lpiCount, BOOL bFileOrMemory, LPGENERALINFO lpGroupInfoArray, IDEN lAuthorizeIdentity, LPERRCODE lpError)

| Parameters | | |
|---|---|---|
| Name | Type | Description |
| lGroupMemberId | IDEN | The Identity of the person being assigned to the Group, identified by GroupId. |
| lpiCount | LPINT | Pointer to a counter. The number of groups GroupMember is a member of. This value is returned. |
| bFileOrMemory | BOOL | Flag to indicate File or Memory mode of receipt of |

-continued

Parameters

| Name | Type | Description |
|---|---|---|
| lpGroupInfoArray | LPGENERALINFO | data from the API. The list of groups GroupMember is a member of. For each group, the Group Id and Group Name are returned. A pointer to an array of Group Ids and Group Names is returned |
| szFileName | STRING | File name where the API should deposit the results of the call if the flag bFileOrMemory is ITS_FILE. |
| lAuthorizeIdentity | IDEN | The Identity of the person Inquiring. The person must have the authority to Inquire. |
| lpError | LPERRCODE | This is set to a non-zero value on error |

Return Value
 The count of groups is returned.
AWSNGETNUMGROUPMEMBERS
Description
 Get the number of all members in a group.
Syntax
void FAR PASCAL AWSNGETNUMGROUPMEMBERS (IDEN lGroupId, LPINT lpiCount, IDEN lAuthorizeIdentity, LPERRCODE lpError)

Parameters

| Name | Type | Description |
|---|---|---|
| lGroupId | IDEN | The GroupId of the group from which to retrieve list of members. |
| lpiCount | LPINT | Pointer to nCount, the number of members in the Group. |
| lAuthorizeIdentity | IDEN | The Identity of the person inquiring. The person must have the authority to inquire. |
| lpError | LPERRCODE | This is set to a non-zero value on error |

Return Value
 Number of members returned.
AWSNGETNUMROLELIST
Description
 Determine the number of Roles that are assigned to a specific Identity or Group.
Syntax
VOID FAR PASCAL AWSNGETNUMROLELIST(BOOL bGroupOrIdentity, IDEN lAssignee, LPINT lpiCount, IDEN lAuthorizeIdentity, LPERRCODE lpError)

Parameters

| Name | Type | Description |
|---|---|---|
| bGroupOrIdentity | BOOL | Flag to indicate if Assignee is a Identity or a Group. It |

-continued

Parameters

| Name | Type | Description |
|---|---|---|
| | | GroupOrIdentity is TRUE, then Assignee contains a GroupId, otherwise it is |
| lAssignee | IDEN | The id of the Identity or Group being inquired. |
| lpiCount | LPINT | Pointer to a counter. The number of Organization Roles an Identity/Group is assigned. |
| lAuthorizeIdentity | IDEN | The Identity of the person Inquiring. The person must have the authority to Inquire. |
| lpError | LPERRCODE | This is set to a non-zero value on error |

Return Value
AWSNGETNUMIDENASSIGNEELIST
Description
 Determine the number of Identities that are assigned to a specific Organization Role.
Syntax
VOID FAR PASCAL AWSNGETIDENASSIGNEELIST (IDEN lOrgRoleId, LPINT lpiCount, IDEN lAuthorizeIdentity, LPERRCODE lpError)

Parameters

| Name | Type | Description |
|---|---|---|
| lOrgRoleId | IDEN | The Organization Role for which list of Assignees is being returned. |
| lpiCountPtr | LPINT | Pointer to a counter. The number of Assignees (Identities or Groups) associated with the Organization Role OrgRole |
| lAuthorizeIdentity | IDEN | The Identity of the person requesting the list. The person must have the authority to inquire. |
| lpError | LPERRCODE | This is set to a non-zero value on error |

Return Value
AWSNGETNUMGROUPASSIGNEELIST
Description
 Determine the list of Identities and Groups that are assigned to a specific Organization Role. This function returns a list of Identities and Group and their names.
Syntax
VOID FAR PASCAL AWSNGETNUMGROUPASSIGNEELIST(IDEN lOrgRoleId, LPINT lpiCount, IDEN lAuthorizeIdentity, LPERRCODE lpError)

Parameters

| Name | Type | Description |
|---|---|---|
| lOrgRoleId | ORGROLEID | The Organization Role for which list of Assignees is |

-continued

| Parameters | | |
|---|---|---|
| Name | Type | Description |
| lpiCountPtr | LPINT | being returned. Pointer to a counter. The number of Assignees (Identities or Groups) associated with the Organization Role OrgRole |
| lAuthorizeIdentity | IDEN | The Identity of the person requesting the list. The person must have the authority to inquire. |
| lpError | LPERRCODE | This is set to a non-zero value on error |

Return Value
Schedule API
The following is a description of the functions performed by the components of the Schedule API for implementation of the Schedule API.
AWSSPUTBPSCHEDULE
Description
The schedule information associated with a business process is stored in the server. The time when the business process needs to be initiated and recurrence information are stored.
Syntax
VOID FAR PASCAL AWSSPUTBPSCHEDULE(STRING szBPName, DATETIMET lInitTime, DATETIMET lRecurPeriod, IDEN lAuthorizeIdentity, LPERRCODE lpError)

| Parameters | | |
|---|---|---|
| Name | Type | Description |
| szBPName | STRING | Business Process name. The business process for which schedule information needs to be attached. |
| lInitTime | DATETIMET | The first time when the business process is initiated. If this is not specified, then the business process is not initiated by the Scheduler. |
| lRecurPeriod | DATETIMET | If specified, the business process is initiated at every RecPeriod interval. |
| lAuthorizeIdentity | IDENTITY | Identity of the person placing scheduler request. |
| lpError | LPERRCODE | This is set to a non-zero value on error |

Return Value
Schedule information stored in the server.
AWSSGETBPSCHEDULE
Description
The schedule information associated with a business process is returned. The initiation time and recurrence information are returned.
Syntax
VOID FAR PASCAL AWSSGETBPSCHEDULE(STRING szBPName, IDEN lAuthorizeIdentity, LPERRCODE lpError)

| Parameters | | |
|---|---|---|
| Name | Type | Description |
| szBPName | STRING | Business Process Name. The business process for which schedule information is returned. |
| lAuthorizeIdentity | IDEN | Identity of the person requesting scheduler information. |
| lpError | LPERRCODE | This is set to a non-zero value on error |

Return Value
Schedule information, initiation time and recurring period returned.
AWSSDELETEBPSCHEDULE
Description
The schedule information associated with a business process is removed. However, currently active instances of the business process remain unaffected.
Syntax
VOID FAR PASCAL AWSSDELETEBPSCHEDULE (STRING szBPName, IDEN lAuthorizeIdentity, LPERRCODE lpError)

| Parameters | | |
|---|---|---|
| Name | Type | Description |
| szBPName | STRING | Business Process Name. The business process for which schedule information has to be deleted. |
| lAuthorizeIdentity | IDEN | Identity of the person deleting scheduler information |
| lpError | LPERRCODE | This is set to a non-zero value on error |

Return Value
Schedule information deleted.
Server Administration API
The following details the methods of workflow server manager (WSM) classes, which are also the internal APIs that are used to achieve the functionality of the workflow server manager.
AWS StartServer
This call starts the workflow server reading the configuration information from a parameter file. The server can be shutdown by issuing AWSStopServer call. The API establishes a session of the workflow server with the underlying database server and starts the workflow server operations.
Syntax
void FAR PASCAL AWSStartServer
Parameters
None.
Return Value
Success—AWSError=0
Failure—AWSError<>0
AWSStopServer
This call stops the workflow server operations. The transaction manager No requests from client applications are processed after this call is made.

Syntax void FAR PASCAL AWSStopServer

Parameters

None.

Return Value

Success—AWSError=0

Failure—AWSError<>0

AWSGrant

This call grants the specified privileges to the user by creating an authorization record for the user, object and the action in the privileges table. The granted privileges can be revoked by calling AWSRevoke function.

Syntax void FAR PASCAL AWSGrant(IDENUserId, eObject, eAction)

| Parameters | | |
|---|---|---|
| Name | Type | Description |
| IDENUserId | IDENTITY | Id of the user who is being granted with the privilege. |
| eObject | OBJECT | Object on which privilege is being granted. |
| eAction | ACTION | Action for which the privileges are being granted. |

Return Value

Success—AWSError=0

Failure—AWSError<>0

AWSRevoke

This call revokes the privileges granted to the user with a previous call to AWSGrant by deleting the record for user, object, and action form authorization table.

Syntax void FAR PASCAL AWSRevokePrivilege(IDENUserName, eObject, eAction)

| Parameters | | |
|---|---|---|
| Name | Type | Description |
| IDENUserName | IDENTITY | Id of the user whose privilege is being revoked. |
| eObject | OBJECT | Object on which privilege is being revoked. |
| eAction | ACTION | Action for which the privileges are being revoked. |

Return Value

Success—AWSError=0

Failure—AWSError<>0

AWSAbortBP

This call marks specified business process instance in transaction database as aborted by changing the status of BP Transaction instance class (TxBPInstance).

Syntax void FAR PASCAL AWSAbortBP(lpszBPTId)

| Parameters | | |
|---|---|---|
| Name | Type | Description |
| lpszBPTId | STRING | Instance of the Business Process that has to be aborted. |

Return Value

Success—AWSError=0

Failure—AWSError<>0

AWSDeleteBP

This call deletes specified business process instance from transaction database.

Syntax void FAR PASCAL AWSDeleteBP(lpszBPTId)

| Parameters | | |
|---|---|---|
| Name | Type | Description |
| lpszBPTId | STRING | Instance of the Business Process that has to be deleted from Transaction database. |

Return Value

Success—AWSError=0

Failure—AWSError<>0

AWSSuspendBP

This call suspends the execution of specified business process instance by changing the status of BP transaction instance class (TxBPInstance). No transactions can take place on the business process till it is restarted again by a call to AWSRestartBP.

Syntax void FAR PASCAL AWSSuspendBP(lpszBPTId)

| Parameters | | |
|---|---|---|
| Name | Type | Description |
| lpszBPTId | STRING | Instance of the Business Process that has to be suspended. |

Return Value

Success—AWSError=0

Failure—AWSError<>0

AWSResumeBP

This call restarts specified business process instance in transaction database, suspended previously by a call to AWSSuspendBP.

Syntax void FAR PASCAL AWSResumeBP(lpszBPTId)

| Parameters | | |
|---|---|---|
| Name | Type | Description |
| lpszBPTId | STRING | Instance of the Business Process that has to be restarted. |

Return Value
   Success—AWSError=0
   Failure—AWSError<>0

AWSArchiveBP

This call archives a business process or all completed business processes on the specified media. The archived business processes are deleted from the database. This function will in turn use AWSBackup function for backing up the data on a different media.

Syntax
void FAR PASCAL AWSArchiveBP(lpszBPName, eArchiveMedia, ArchiveTime, ArchiveDate)
Parameters
   None.

| Name | Type | Description |
|---|---|---|
| lpszBPName | STRING | The Business Process name. This name should be unique. If a business process with the same name is present, the current definition is over written as a new version. There should be no active instances of the current definition for this to occur. |
| eArchiveMedia | ENUM | The media to which the business process is to be archived. |
| ArchiveDate | TIME | The date on which archiving is done. |
| AcrhiveTime | TIME | The time on which archiving is done. |

Return Value
   Success—AWSError=0
   Failure—AWSError<>0

AWSListAvailBPs

This call lists all the business processes by running through the definitions database to find out all instances of BP definition class (DfBP).

Syntax
void FAR PASCAL AWSListAvailBPs
Parameters
   None.
Return Value
   Success AWSError=0
   Failure—AWSError<>0

AWSListActiveBPs

This call lists all the active business processes by running through the transactions database and finding out all instances of TxBPInstances that have status as 'Active'.

Syntax
void FAR PASCAL AWSListActiveBPs
Parameters
   None.
Return Value
   Success—AWSError=0
   Failure—AWSError<>0

AWSDeleteBPDefinition

This call deletes the definition of specified business process from the definitions database by using VDB method DeleteBP of class DfBP.

Syntax
void FAR PASCAL AWSDeleteBPDefinition(lpszBPDId)

| Parameters | | |
|---|---|---|
| Name | Type | Description |
| lpszBPDId | STRING | Id of the Business Process that has to be deleted from definitions database. |

Return Value
   Success—AWSError=0
   Failure—AWSError<>0

AWSListActiveWF

This call lists all active workflows in the specified business process by using VDB method ListBP of class TxBPInstance.

Syntax
void FAR PASCAL AWSListActiveWF(lpszBPName)

| Parameters | | |
|---|---|---|
| Name | Type | Description |
| lpszBPName | STRING | Name of the Business Process whose active workflows are to be listed. |

Return Value
   Success—AWSError=0
   Failure—AWSError<>0

AWSRegister

This call registers the new STF Processor name in the Names and Routing database by using VDB method CreateSTFDefn.

Syntax
void FAR PASCAL AWSRegister(lpszSTFProcessorName)

| Parameters | | |
|---|---|---|
| Name | Type | Description |
| lpszSTFProcessorName | STRING | The STF Processor name. |

Return Value
   Success—AWSError=0
   Failure—AWSError<>0

AWSDeregister

This call deregisters an STF Processor name from the server Names and Routing database, previously registered by AWSRegister call.

Syntax
void FAR PASCAL AWSDeregister(lpszSTFProcessorName)

| Parameters | | |
|---|---|---|
| Name | Type | Description |
| lpszSTFProcessorName | STRING | The STF Processor name. |

Return Value
    Success—AWSError=0
    Failure—AWSError<>0
AWSCheck
This call checks a particular workflow server database for consistency and integrity. The API will in turn use appropriate database APIs to provide the functionality.
Syntax
void FAR PASCAL AWSCheck
Parameters
    None.
Return Value
    Success—AWSError=0
    Failure—AWSError<>0
AWSIndex
This call reindexes a particular workflow server database. The API will in turn use appropriate database APIs to achieve the functionality.
Syntax
void FAR PASCAL AWSIndex
Parameters
    None.
Return Value
    Success—AWSError=0
    Failure—AWSError<>0
AWSReorganize
This call reorganizes a particular workflow server database, to permanently remove the records marked for deletion. The API will in turn use appropriate database APIs to achieve the functionality.
Syntax
void FAR PASCAL AWSReorganize
Parameters
    None.
Return Value
    Success—AWSError=0
    Failure—AWSError<>0
AWSSetConfiguration
This call updates the configuration information in the parameter file. The information can later be retrieved by making a call to AWSGetConfiguration.
Syntax
void FAR PASCAL AWSSetConfigInfo(iMaxBPCount, pszVersion, lpszLogFileName, lpszLogFilePath)

| Parameters | | |
|---|---|---|
| Name | Type | Description |
| iMaxBPCount | INT | Maximum number of active business processes on the server. |
| lpszVersion | STRING | Version number. |
| lpszLogFileName | STRING | Transaction log file name. |
| lpszLogFilePath | STRING | Path where transaction log file will be written. |

Return Value
    Success—AWSError=0
    Failure—AWSError<>0
AWSGetConfiguration
This call reads the configuration information from the parameter file, earlier written by calling AWSSetConfigInfo.
Syntax
void FAR PASCAL AWSGetConfiguration(iMaxBPCount, lpszVersion, lpszLogFileName, lpszLogFilePath)

| Parameters | | |
|---|---|---|
| Name | Type | Description |
| iMaxBPCount | INT | Maximum number of active business processes on the server. |
| lpszVersion | STRING | Version number. |
| lpszLogFileName | STRING | Transaction log file name. |
| lpszLogFilePath | STRING | Path where transaction log file will be written. |

Return Value
    Success—AWSError=0
    Failure—AWSError<>0
AWSWriteToLog
This call causes transaction information to be written to the workflow server log file.
Syntax
void FAR PASCAL AWSWriteToLog(lpszTransInfo)

| Parameters | | |
|---|---|---|
| Name | Type | Description |
| lpszTransInfo | STRING | Transaction information to be written to log. |

Return Value
    Success—AWSError=0
    Failure—AWSError<>0
Reporter API
    Get all the BP Names
    Input Parameters:
        None
    Output Parameters:
        Array of BP Names and their versions existing in the database
    Get BP information using BP name
    Input Parameters:
        BP Name
        BP Version
    Output Parameters:
        BP Owner
        BP Administrator
        Primary Workflow Name
        Projected cycle time
    Get BP Instance ids of a BP
    Input Parameters:
        BP name
    Output Parameters:
        Array of BP instance ids.
    Get Workflow Names of a BP
    Input Parameters:
        BP name
    Output Parameters:
        List of workflow names
    Get BP Instance data Input Parameters:
  BP instance id
Output Parameters:
  BP instance status
  BP name
  Primary workflow instance id
  List of workflow instance ids.
  Get Workflow Instance Ids of a Workflow
Input Parameters:
  Workflow name
Output Parameters:
  List of workflow instance ids along with its BP instance ids.
  Get Workflow Definitional Data
Input Parameters:
  BP name
  Workflow name
Output Parameters:
  Workflow computed cycle time
  Workflow type
  Customer's organization role
  Performer's organization role
  Observers' organization roles
  Customer's default identity
  Performer's default identity
  Observers' default identities
  time1 (Customer request cycle time)
  time2 (Performer response cycle time)
  time3 (Performer completion cycle time)
  time4 (Customer declare satisfaction cycle time)
  Conditions of satisfaction
  Get Workflow Instance Data
Input Parameters:
  BP instance id.
  Workflow instance id.
Output Parameters:
  The current workflow state
  Workflow name
  Customer identity
  Performer identity
  Observer identities
  Workflow starting time
  User specified completion time
  Workflow actual completion time
  User specified cycle time of phase1
  User specified cycle time of phase2
  User specified cycle time of phase3
  User specified cycle time of phase4
  Actual cycle time of phase1
  Actual cycle time of phase2
  Actual cycle time of phase3
  Actual cycle time of phase4
  Get Workflow Summary Historical Data
Input Parameters:
  BP name
  Workflow name
Output Parameters:
  Average completion time of a workflow
  Best completion time of a workflow
  Worst completion time of a workflow
  Average cycle time for the customer request of a workflow
  Best cycle time for the customer request of a workflow
  Worst cycle time for the customer request of a workflow
  Average cycle time for the performer response of a workflow
  Best cycle time for the performer response of a workflow
  Worst cycle time for the performer response of a workflow
  Average cycle time for the performer completion of a workflow
  Best cycle time for the performer completion of a workflow
  Worst cycle time for the performer completion of a workflow
  Average cycle time for the customer declare-satisfaction of a workflow
  Best cycle time for the customer declare-satisfaction of a workflow
  Worst cycle time for the customer declare-satisfaction of the workflow
  Total number of instances of a workflow
  Number of workflow instances which were delayed
  Average delay of delayed workflow instances
  Maximum delay of the workflow
  Number of workflow instances which were canceled
  Number of workflow instances which were revoked
  Number of workflow instances which were declined
  Number of workflow instances with customer request phase delayed
  Average delay in customer request phase
  Maximum delay in customer request phase
  Number of workflow instances with performer response phase delayed
  Average delay in performer response phase
  Maximum delay in performer response phase
  Number of workflow instances with performer completion phase delayed
  Average delay in performer completion phase
  Maximum delay in performer completion phase
  Number of workflow instances with customer declare-satisfaction phase delayed
  Average delay in customer declare-satisfaction phase
  Maximum delay in customer declare-satisfaction phase
  Get Acts Taken in a Workflow instance
Input Parameters:
  BP instance id
  Workflow instance id
Output Parameters:
  The following details of acts taken:
  Act Taken
  Identity who took the act
  When the act was registered
  Complete by time of the act
  Respond by time of the act
  When the act was performed
  Get BP Names of a BP Collection
Input Parameters:
  Selection criteria based on (refer BP Collection query dialog box in section 6.3.1):
  BP Name
  Customer, performer and observer organizational roles
  Customer, performer and observer default identities
  Check primary/all workflow(s) flag
  Include all/latest version(s) flag
Output Parameters:
  The following details of selected BPs:
  BP Name
  BP Version
  BP Owner
  BP Administrator Primary Workflow Name
Get BP Instance ids of a BP
Input Parameters:
  BP name
  Selection criteria based on (refer BP Instance Selection dialog box in section 6.3.5):
  From and To Dates
  Customer, performer, observer identities
  Check primary/all workflow(s) flag
  Include exceptions(Delay/Cancel/Revoke/Decline/Normal) flag
Output Parameters:
  Array of BP instance ids.

C. WORKFLOW SERVER MANAGER (WSM)

The following is a description of the workflow server manager (WSM) component of the workflow system. The WSM uses the workflow APIs to implement the functions and services it provides to users. The WSM is a component of the workflow system that provides a user interface for specific services of the workflow server such as:

Server Management
  Authorization Maintenance
  Business Process Maintenance
  Workflow Maintenance
  STF Processor Maintenance
  Configuration
  Transaction Log Maintenance
  Business Process Scheduling and Organizational Calendar Through the use of the WSM, a user selects the scheduling function which provides the user interface to specify the recurrent scheduling of business processes as well as the specification of the organizational calendar as specified by the schedule manager.

Workflow Server Manager classes

The following is a description of the WSM classes with their attributes and methods.

Server Management

Server

This class handles server management activities, such as server startup, shutdown, etc. Startup establishes a workflow server session with the underlying database server and starts up transaction manager activities.

| Attributes | |
|---|---|
| lpszServerID | string |
| Methods | |
| AWSStartServer | The method starts the server operations by opening a session with the underlying database server and starts Transaction Manager operations. |
| AWSStopServer | The method notifies all active users about the shutdown, disconnects from database server, and shuts down the Transaction Manager operations. |

Authorization Maintenance

Object

This class provides methods to create objects.

| Attributes | |
|---|---|
| ObjectId | ref(BP) or ref(WF) |
| eObjectType | objecttype |
| | Enumerations of Objects are |
| | Business Processes |
| | Workflows |

Authorization

This class provides methods to grant/revoke authorities to users to act on objects.

| Attributes | |
|---|---|
| IDENUser | ref (NRDFIdentity) |
| ObjectId | ref(Object) |
| eAction | actions |
| | Enumerations for Actions are |
| |   Create |
| |   Delete |
| |   Modify |
| |   Instantiate |
| |   View |
| bGrantOption | bool |
| Methods | |
| AWSGrant | The method grants authority to a user to make the specified act on the specified object. |
| AWSRevoke | The method revokes a previously granted authority form the user. |
| AWSInquire | The method is used to inquire whether user has authority to make specified act on the specified object. |

Business Process Maintenance

BPMaint

This class provides methods to maintain business processes in definitions and transactions databases. It provides methods for archiving all completed business processes.

| Methods | |
|---|---|
| AWSAbortBP | The method aborts a BP instance. |
| AWSDeleteBP | The method deletes the specified BP instance from the transaction database. |
| AWSSuspendBP | The method suspends the operations of a BP instance temporarily. |
| AWSResumeBP | The method resumes a BP instance previously suspended. |
| AWSArchiveBP | The method archives a BP instance or all completed BPs. |
| AWSListAvailBPs | The method lists all BPs available in definitions database. |

| Methods | |
|---|---|
| AWSListActiveBPs | The method lists all BPs active in transactions database. |
| AWSDeleteBPDefinition | The method deletes a BP definition from definitions database. |

Workflow Maintenance
WFMaint
This class handles housekeeping of workflows in a business process.

| Methods | |
|---|---|
| AWSListActiveWF | The method lists all active workflows for a BP instance. |

STF Processor Maintenance
STFProcessor
This class handles registration and deregistration of STF Processors in Names and Routing database.

| Methods | |
|---|---|
| AWSRegister | The method registers an STF Processor in Names and Routing database. |
| AWSDeregister | The method deregisters an STF Processor from Names and Routing database. |

Database Management
DBMgmt
This class handles various database management functions, such as checking a particular workflow server database for integrity, reindexing the database, and reorganizing the database.

| Methods | |
|---|---|
| AWSCheck | The method checks the database for consistency and coherency. |
| AWSIndex | The method reindexes the database. |
| AWSReorganize | The method reorganizes the database. |

Configuration
Config
This class provides methods to set and inquire various configurable parameters.

| Attributes | |
|---|---|
| iMaxOpenBps | int |
| lpszVersion | string |
| lpszLogFileName | string |
| lpszLogFilePath | string |

| Methods | |
|---|---|
| AWSSetConfiguration | The method set the configuration parameters to specified value. |
| AWSGetConfiguration | The method retrieves configuration parameters from the file. |

Transaction Log Maintenance
TransLog
This class provides methods to maintain transaction log. The workflow processor uses this method to write all changes in the workflow status to the log.

| Methods | |
|---|---|
| AWSWriteToLog | The method writes the specified string to the transaction log. |

We claim:

1. A computer system for managing a plurality of business processes, each business process having a business process definition with a plurality of linked workflows, each workflow having a corresponding workflow definition, said workflow definition representing commitments that a user having a predetermined role makes and completes to satisfy a customer of the workflow comprising:
   a) workflow server means for providing services to workflow enabled applications that allow users to act taking one of a plurality of available acts defined in one of said business processes, said workflow server means including a transaction manager providing for each of said business processes:
   transaction services for
      1. receiving instructions to initiate and initiating workflows of said business processes;
      2. taking actions in said workflow initiated business processes;
      3. updating and maintaining workflow status after each act is taken in each of said initiated workflows of said business process and keeping track of pending workflow activities, wherein said taken act is one of an act of a user and an act automatically taken by the transaction manager based on said business process definition and said workflow definition of a predetermined one of said workflows of said business process, wherein said workflow status represents all acts that are pending for said user having a predetermined role in said initiated workflow;
      4. making available to said workflow enabled applications available business processes that a predetermined one of said workflow enabled applications can initiate and specifying available acts that a user of said predetermined workflow enabled application can take in each of the initiated workflows of each of the available business processes;
   b) database means for storing records of business process transactions.

2. The system defined by claim 1 wherein said database means is for storing records of the date and time when a business process must be initiated.

3. The system defined by claim 1 wherein said database means is for storing configuration information used by the workflow server means.

4. The system defined by claim 1 wherein said database means is for storing notifications to be sent to users that interact with the workflow system through a standard transaction format processor interface.

5. The system defined by claim 1 further comprising application program interface means for providing an interface to the server means to enable workflow enabled applications to obtain access to the services provided by the server means.

6. The system defined by claim 1 wherein said workflow server means provides transaction services for binding application specific data to a workflow transaction.

7. The system defined by claim 1 wherein said business process includes a plurality of workflows with workflow links coupling predetermined ones of said plurality of workflows and said workflow server means provides definitions services for defining elements of a business process, its workflows and workflow links.

8. The system defined by claim 1 wherein said workflow server means provides definitions services for defining structures for the workflows of a business process.

9. The system defined by claim 1 wherein said workflow server means provides names and routing services for defining roles, defining assignments, defining identities and defining the assignment of identities to roles.

10. The system defined by claim 1 wherein said workflow server means provides configuration services for defining a network configuration of the workflow system, the version of the server means, registering standard transaction format processors, defining users and roles, specifying a log database and a level of logging required.

11. The system defined by claim 1 wherein said workflow server means provides scheduling services for allowing an authorized user to create, modify and delete records of scheduled business processes.

12. The system defined by claim 1 further comprising means for updating the workflow server databases as an interface to the server means to enable workflow enabled applications to obtain access to services provided by the server means.

13. The system defined by claim 1 wherein a predetermined workflow script is executed when at least one of i) an act is taken by an individual; ii) an act is taken by the system; and iii) a workflow entering a predetermined state occurs,
said predetermined workflow script being part of said business process definition.

14. A computer system for managing business processes, each business process including a plurality of linked workflows, by providing services that allow designers to analyze and design business processes and applications comprising:
   a) workflow server means for providing:
   i) definitions services for:
      1. defining elements of a business process, its workflows and workflow links;
      2. defining structures for the workflows of the business process;
   ii) names and routing services for:
      1. defining at least two roles associated with each of the workflows;
      2. defining identities associated with said defined roles;
   b) database means for storing records of:
   i) definitions of an organization, business processes of the organization, workflows of the business processes, said roles and acts associated with the workflows;
   ii) the defined roles and defined identities within an organization utilizing the workflow system.

15. A computer system for managing business processes, each business process including a plurality of linked workflows, comprising:
   a) workflow server means for providing services to workflow enabled applications that allow users to act and participate in said business processes, said workflow server means including a transaction manager, said transaction manager providing:
   transaction services for
      1. receiving requests for new workflows and initiating the requested new workflows;
      2. taking actions in workflows initiated by said transaction services of said workflow server means;
      3. updating and maintaining workflow status after each act of a user is taken in a predetermined one of said initiated workflows and keeping track of pending workflow activities;
      4. making available to said workflow enabled applications available business processes that a predetermined one of said workflow enabled applications can initiate;
   b) database means for storing records of:
   i) definitions of an organization, business processes of the organization, workflows of the business processes, roles and acts associated with the workflows, said workflow definitions representing commitments that users having predetermined roles make and complete to satisfy customers of the workflows;
   ii) workflow transactions;
   iii) the defined roles and defined identities of customers, performers and observers utilizing the workflow system.

16. The system defined by claim 15 wherein said database means is further for storing records of incompletions.

17. A computer implemented method for managing a plurality of business processes, each business process having a business process definition with a plurality of linked workflows, each workflow having a corresponding workflow definition, said workflow definition representing commitments that a user having a predetermined role makes and completes to satisfy a customer of the workflow, said method comprising the steps of:
   a) providing services to workflow enabled applications that allow users to act taking one of a plurality of available acts defined in one of said business processes, said workflow server means including a transaction manager providing for each of said business processes transaction services for
      1. receiving instructions to initiate and initiating workflows of said business processes;
      2. taking actions in said workflow initiated business processes;
      3. updating and maintaining workflow status after each act is taken in each of said initiated workflows of said business process and keeping track of pending workflow activities, wherein said taken act is one of an act of a user and an act automatically taken by the transaction manager based on said business process definition and said workflow definition of a predetermined one of said workflows of said business process, wherein said workflow status represents all acts that are pending for said user having a predetermined role in said initiated workflow;
      4. making available to said workflow enabled applications available business processes that a predetermined one of said workflow enabled applications can initiate and specifying available acts that a user of said predetermined workflow enabled application can take in each of the initiated workflows of each of the available business processes;

b) storing records of business process transactions.

18. The system defined by claim 1 further comprising a schedule manager providing schedule services for 1. determining which business processes are due to be initiated;

2. sending instructions to said transaction manager to initiate said determined business processes.

19. The system defined by claim 1 further comprising a follow-up manager providing follow-up services for:

1. determining when follow-up or reminder notifications are to be sent to a user;

2. sending said notifications.

* * * * *